United States Patent
Wang et al.

(10) Patent No.: US 9,820,259 B2
(45) Date of Patent: Nov. 14, 2017

(54) SMOOTH TRANSITION BETWEEN MULTIMEDIA BROADCAST MULTICAST SERVICE (MBMS) AND UNICAST SERVICE BY DEMAND

(71) Applicant: QUALCOMM Incorporated, San Diego, CA (US)

(72) Inventors: Jun Wang, San Diego, CA (US); George Cherian, San Diego, CA (US); Nagaraju Naik, San Diego, CA (US); Xiaoxia Zhang, San Diego, CA (US); Edward Robert Hall, Bristol (GB); Arungundram Chandrasekaran Mahendran, San Diego, CA (US); Gordon Kent Walker, Poway, CA (US); Charles N. Lo, San Diego, CA (US); Carlos Marcelo Dias Pazos, Carlsbad, CA (US); Kuo-Chun Lee, San Diego, CA (US); Jack Shyh-Hurng Shauh, San Diego, CA (US); Gang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 13/886,246

(22) Filed: May 2, 2013

(65) Prior Publication Data
US 2013/0294321 A1 Nov. 7, 2013

Related U.S. Application Data

(60) Provisional application No. 61/643,128, filed on May 4, 2012, provisional application No. 61/661,764, filed
(Continued)

(51) Int. Cl.
*H04W 72/04* (2009.01)
*H04W 4/06* (2009.01)
(Continued)

(52) U.S. Cl.
CPC .......... *H04W 72/005* (2013.01); *H04W 4/06* (2013.01); *H04W 28/16* (2013.01); *H04W 4/02* (2013.01); *H04W 72/048* (2013.01)

(58) Field of Classification Search
None
See application file for complete search history.

(56) References Cited

U.S. PATENT DOCUMENTS 7,184,421 B1 2/2007 Liu et al.
8,340,011 B2 * 12/2012 Kenagy .................. 370/312
(Continued)

FOREIGN PATENT DOCUMENTS

| EP | 2362705 A1 | 8/2011 |
| EP | 2365713 A1 | 9/2011 |
| WO | 2007068290 A1 | 6/2007 |

OTHER PUBLICATIONS

3GPP, TS 126.247, "Transparent end-to-end Packet-switched Streaming Service (PSS); Progressive Download and Dynamic Adaptive Streaming over HTTP (3GP-DASH)", Jun. 2011. http://www.etsi.org/deliver/etsi_ts/126200_126299/126247/10.00.00_60/ts_126247v100000p.pdf.*
(Continued)

Primary Examiner — Ayaz Sheikh
Assistant Examiner — Tarell Hampton
(74) Attorney, Agent, or Firm — Anthony R. Morris

(57) ABSTRACT

Techniques are provided for smooth transition between broadcast/multicast transmission and unicast transmission. A method for managing unicast and multicast services switching in a multi-band/multi-frequency wireless commu-
(Continued)

nications system (WCS) capable of both unicast and multicast signaling includes determining whether an aggregate demand for a content provided via dedicated unicast transmissions exceeds a threshold. The method includes switching transmission of the content from the dedicated unicast transmissions on one frequency to a multicast transmission on a second or more frequencies in response to determining that the aggregate demand exceeds the threshold.

58 Claims, 63 Drawing Sheets

Related U.S. Application Data on Jun. 19, 2012, provisional application No. 61/801,279, filed on Mar. 15, 2013.

(51) Int. Cl.
  *H04W 28/16*  (2009.01)
  *H04W 4/02*  (2009.01)
  *H04W 72/00*  (2009.01)

(56) References Cited

U.S. PATENT DOCUMENTS

| | | | |
|---|---|---|---|
| 2003/0207696 A1* | 11/2003 | Willenegger | H04W 52/40 455/522 |
| 2004/0184438 A1* | 9/2004 | Terry | 370/349 |
| 2005/0090278 A1* | 4/2005 | Jeong et al. | 455/525 |
| 2006/0203756 A1* | 9/2006 | Hu | H04W 72/005 370/312 |
| 2007/0156807 A1* | 7/2007 | Ma | H04L 67/26 709/203 |
| 2007/0165551 A1* | 7/2007 | Proctor | H04L 29/06 370/312 |
| 2007/0172068 A1 | 7/2007 | Herrmann | |
| 2008/0318558 A1 | 12/2008 | Bouazizi et al. | |
| 2009/0019509 A1* | 1/2009 | Horn et al. | 725/118 |
| 2009/0238099 A1* | 9/2009 | Ahmavaara | 370/254 |
| 2010/0029266 A1* | 2/2010 | van Gassel et al. | 455/424 |
| 2010/0128649 A1* | 5/2010 | Gonsa et al. | 370/312 |
| 2010/0169504 A1* | 7/2010 | Gabin et al. | 709/231 |
| 2010/0216454 A1* | 8/2010 | Ishida | H04W 72/005 455/424 |
| 2011/0274097 A1 | 11/2011 | Zhang et al. | |
| 2011/0306305 A1* | 12/2011 | Huang | 455/67.11 |
| 2012/0020273 A1* | 1/2012 | Mori | 370/312 |
| 2012/0263089 A1 | 10/2012 | Gupta et al. | |
| 2013/0007814 A1 | 1/2013 | Cherian et al. | |
| 2013/0024582 A1 | 1/2013 | Rodrigues | |
| 2013/0028118 A1 | 1/2013 | Cherian et al. | |
| 2013/0132986 A1* | 5/2013 | Mack et al. | 725/14 |
| 2013/0142072 A1* | 6/2013 | Xu et al. | 370/252 |
| 2013/0182643 A1 | 7/2013 | Pazos et al. | |
| 2013/0229974 A1* | 9/2013 | Xu et al. | 370/312 |
| 2014/0201323 A1 | 7/2014 | Fall et al. | |
| 2014/0372624 A1 | 12/2014 | Wang et al. | |
| 2015/0012584 A1 | 1/2015 | Lo et al. | |

OTHER PUBLICATIONS

NEC: "DISC on MBMS service activation/deactivation further to counting", 3GPP DRAFT; R2-106488, 3rd Generation Partnership Project (3GPP), Mobile Competence Centre; 650, Route Des Lucioles; F-06921 Sophia-Antipolis Cedex; France, vol. RAN WG2, No. Jacksonville, USA, Nov. 8, 2010, XP050466202, [retrieved on Nov. 8, 2010].

Nokia: "Providing integrity to counting IDLE mode UE", 3GPP DRAFT; Inegrtity for Idle Mode Counting, 3rd Generation Partnership Project (3GPP), Mobile Competence Centre; 650, Route Des Lucioles; F-06921 Sophia-Antipolis Cedex; France, vol. RAN WG2, No. Sophia Antipolis, France; Feb. 14, 2003, Feb. 14, 2003 (Feb. 14, 2003), XP050122830, [retrieved on Feb. 14, 2003] p. 2, lines 22-23; figure 2 p. 4, lines 1-2.

Partial International Search Report—PCT/US2013/039520—ISA/EPO—Sep. 27, 2013.

Philips: "On the issue of switching between p2p and p2m—channels in MBMS", 3GPP DRAFT; R2-030078, 3rd Generation Partnership Project (3GPP), Mobile Competence Centre; 650, Route Des Lucioles; F-06921 Sophia-Antipolis Cedex; France, vol. RAN WG2, No. UK, Jan. 13, 2003, XP050141520, [retrieved on Jan. 13, 2003].

Intel: "Hybrid PSS/MBMS Download Delivery of DASH-Formatted Content", 3GPP DRAFT; S4-120493, CR26346-0220_REL9, 3rd Generation Partnership Project (3GPP), Mobile Competence Centre; 650, Route Des Lucioles; F-06921 Sophia-Antipolis Cedex; France, vol. SA WG4, No. Kyoto, Japan; Apr. 16-20, 2012, Apr. 19, 2012 (Apr. 19, 2012), XP050639168, pp. 1-3.

International Search Report and Written Opinion—PCT/US2013/039520—ISAEPO—Feb. 10, 2014.

Qualcomm Incorporated: "MPD Profiling to Support DASH over MBMS", 3GPP DRAFT; S4-120448 CR 26.346-0249 REV 1 MPD Changes to Support DASH Over MBMS (Release 11), 3rd Generation Partnership Project (3GPP), Mobile Competence Centre; 650, Route Des Lucioles; F-06921 Sophia-Antipolis Cedex; France, vol. SA WG4, No. Tokyo, Japan; Apr. 16-20, 2012, Apr. 11, 2012 (Apr. 11, 2012), XP050639091, pp. 1-8.

\* cited by examiner (Option 1: HRPD may be co-located in P-GW)

(Option 2: HRPD may be co-located in BM-SC)

1600

|  | Option 1 | Option 2 |
|---|---|---|
| Standard Impact | * Should specify the interface between BM-SC and P-GW<br>* Should specify signaling from P-GW to UE or modify HTTP-REDIRECT to indicate switch from UC to BC | * Should modify HTTP-REDIRECT to indicate UE to switch from UC to BC |
| P-GW Impact | * HARD is located in P-GW<br>* Should interact with BM-SC<br>* Can support general UC to BC transition by demand if HARD performs DPI for all packets | * No impact to P-GW |
| BM-SC Impact | * DASH Proxy is located in BM-SC<br>* Should interact with P-GW<br>* Not loaded with UC traffic | * Both HARD and DASH Proxy are located in BM-SC<br>* May be overloaded with UC traffic that may potentially be switched to BC |
| UE Impact | * Should support enhanced PCO signaling or HTTP Redirect | * Should support HTTP Redirect |

*FIG. 16*

(Option 3: HARD is collocated in content Server)

(Option 4: HARD is a separate entity)

*(Option 5: Simplified HRPD is collocated in BM-SC)*

SMOOTH TRANSITION BETWEEN MULTIMEDIA BROADCAST MULTICAST SERVICE (MBMS) AND UNICAST SERVICE BY DEMAND

CROSS-REFERENCE TO RELATED APPLICATIONS

The present application for patent claims priority to Provisional Application No. 61/643,128, filed May 4, 2012, entitled "SMOOTH TRANSITION BETWEEN MULTIMEDIA BROADCAST MULTICAST SERVICE AND UNICAST SERVICE BY DEMAND", Provisional Application No. 61/661,764, filed Jun. 19, 2012, entitled "SMOOTH TRANSITION BETWEEN MULTIMEDIA BROADCAST MULTICAST SERVICE (MBMS) AND UNICAST SERVICE BY DEMAND", and Provisional Application No. 61/801,279, filed Mar. 15, 2013, entitled "SMOOTH TRANSITION BETWEEN MULTIMEDIA BROADCAST MULTICAST SERVICE (MBMS) AND UNICAST SERVICE BY DEMAND" which are assigned to the assignee hereof, and are hereby expressly incorporated in their entirety by reference herein.

BACKGROUND

Field

Aspects of the present disclosure relate generally to wireless communication systems, and more particularly, to managing demand-based Multimedia Broadcast Multicast Service in a wireless communications network.

Background

Wireless communication networks are widely deployed to provide various communication services such as voice, video, packet data, messaging, broadcast (BC), etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNodeB (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast (UC) operation, each eNB is controlled so as to transmit signals carrying information directed to one or more particular subscriber UEs. The specificity of unicast signaling enables person-to-person services such as, for example, voice calling, text messaging, or video calling.

In broadcast operation, several eNBs in a broadcast area broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. As the demand and system capability for event-related multimedia and other broadcast services has increased, system operators have shown increasing interest in making use of broadcast operation in 3GPP networks. In the past, 3GPP LTE technology has been primarily used for unicast service, leaving opportunities for improvements and enhancements related to broadcast signaling.

In LTE, an eMBMS application may provide schedule based eMBMS applications. In the schedule based eMBMS application, a system operator on the network side controls transmission of eMBMS content, which occurs at a scheduled time. A mobile entity may subscribe to the scheduled transmission and thereby receive content of interest for the mobile user. Content offerings available to UEs via eMBMS transmission, however, generally are limited to the operator's scheduled eMBMS offerings. Such scheduled content offerings do not address requests for content based on demand such as breaking news, traffic alerts, and movie downloads, which the UE may receive through a dedicated transmission. Therefore, there is a need for transmission method providing transitions between the dedicated transmission and broadcast transmission of the content.

SUMMARY

Methods and apparatus for assigning aggregated component carriers to timing advance groups are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method is for managing unicast and multicast services switching in a multi-band/multi-frequency wireless communications system (WCS) capable of both unicast and multicast signaling. The method includes determining whether an aggregate demand for a content provided via dedicated unicast transmissions exceeds a threshold. The method includes switching transmission of the content from the dedicated unicast transmissions on one frequency to a multicast transmission on a second or more frequencies in response to determining that the aggregate demand exceeds the threshold.

In another aspect, an apparatus is for managing unicast and multicast services switching in a multi-band/multi-frequency wireless communications system (WCS) capable of both unicast and multicast signaling. The apparatus includes at least one processor configured to determine whether an aggregate demand for a content provided via dedicated unicast transmissions exceeds a threshold, and switch transmission of the content from the dedicated unicast transmissions on one frequency to a multicast transmission on a second or more frequencies in response to determining that the aggregate demand exceeds the threshold. The apparatus includes a memory coupled to the at least one processor for storing data.

In another aspect, an apparatus is for managing unicast and multicast services switching in a multi-band/multi-frequency wireless communications system (WCS) capable of both unicast and multicast signaling. The apparatus includes means for determining whether an aggregate demand for a content provided via dedicated unicast transmissions exceeds a threshold. The apparatus includes means for switching transmission of the content from the dedicated unicast transmissions on one frequency to a multicast transmission on a second or more frequencies in response to determining that the aggregate demand exceeds the threshold.

In another aspect, computer program product includes a computer-readable medium storing code for causing at least one computer to: determine whether an aggregate demand for a content provided via dedicated unicast transmissions exceeds a threshold; and switch transmission of the content from the dedicated unicast transmissions on one frequency to a multicast transmission on a second or more frequencies in response to determining that the aggregate demand exceeds the threshold.

In another aspect, a method is for managing unicast and multicast services switching in a wireless mobile entity capable of both unicast and multicast signaling. The method includes receiving a content via multicast transmission. The method includes determining whether to switch from receiving the content via the multicast transmission to receiving the content via dedicated unicast transmission. The method includes switching receiving the content via multicast transmission to dedicated unicast transmission based in response to determining to switch.

In another aspect, an apparatus is capable of both unicast and multicast signaling for managing unicast and multicast services switching. The apparatus includes at least one processor configured to receive a content via multicast transmission, determine whether transmission of the content received via the multicast transmission is about to end or is no longer available on one or more frequencies, and switch receiving of the content via the multicast transmission to dedicated unicast transmissions. The apparatus includes a memory coupled to the at least one processor for storing data.

In another aspect, an apparatus is capable of both unicast and multicast signaling for managing unicast and multicast services switching. The apparatus includes means for receiving a content via multicast transmission. The apparatus includes means for determining whether transmission of the content received via the multicast transmission is about to end or is no longer available on one or more frequencies. The apparatus includes means for switching receiving of the content via the multicast transmission to dedicated unicast transmissions.

In another aspect, computer program product includes a computer-readable medium storing code for causing at least one computer to: receive a content via multicast transmission; determine whether transmission of the content received via the multicast transmission is about to end or is no longer available on one or more frequencies; and switch receiving of the content via the multicast transmission to dedicated unicast transmissions.

In another aspect, a method is for managing unicast and multicast services switching in a wireless mobile entity capable of both unicast and multicast signaling. The method includes receiving a content via dedicated unicast transmission. The method includes determining whether to switch from receiving the content via the dedicated unicast transmission to receiving the content via multicast transmission. The method includes switching receiving the content via dedicated unicast transmission to multicast transmission in response to determining to switch.

In another aspect, an apparatus is capable of both unicast and multicast signaling for managing unicast and multicast services switching. The apparatus includes at least one processor configure to receive a content via dedicated unicast transmission, determine whether to switch from receiving the content via the dedicated unicast transmission to receiving the content via multicast transmission, and switching receiving the content via dedicated unicast transmission to multicast transmission in response to determining to switch. The apparatus includes a memory coupled to the at least one processor for storing data.

In another aspect, an apparatus is capable of both unicast and multicast signaling for managing unicast and multicast services switching. The apparatus includes means for receiving a content via dedicated unicast transmission. The apparatus includes means for determining whether to switch from receiving the content via the dedicated unicast transmission to receiving the content via multicast transmission. The apparatus includes means for switching receiving the content via dedicated unicast transmission to multicast transmission in response to determining to switch.

In another aspect, a computer program product includes a computer-readable medium storing code for causing at least one computer to: receive a content via dedicated unicast transmission; determine whether to switch from receiving the content via the dedicated unicast transmission to receiving the content via multicast transmission; and switch receiving the content via dedicated unicast transmission to multicast transmission in response to determining to switch.

In another aspect, a method is for managing unicast and multicast services switching in a wireless communications system (WCS) capable of both unicast and multicast signaling. The method includes determining whether an aggregate demand for a content provided via dedicated unicast transmissions exceeds a threshold based on indications received from mobile entities. The method includes switching transmission of the content from the dedicated unicast transmissions to a multicast transmission in response to determining that the aggregate demand exceeds the threshold.

In another aspect, an apparatus is for managing unicast and multicast services switching in a wireless communications system (WCS) capable of both unicast and multicast signaling, the apparatus comprising. The apparatus includes at least one processor configured to determine whether an aggregate demand for a content provided via dedicated unicast transmissions exceeds a threshold based on indications received from mobile entities, and switch transmission of the content from the dedicated unicast transmissions to a multicast transmission in response to determining that the aggregate demand exceeds the threshold. The apparatus includes a memory coupled to the at least one processor for storing data.

In another aspect, an apparatus is for managing unicast and multicast services switching in a wireless communications system (WCS) capable of both unicast and multicast signaling. The apparatus includes means for determining whether an aggregate demand for a content provided via dedicated unicast transmissions exceeds a threshold based on indications received from mobile entities. The apparatus includes means for switching transmission of the content from the dedicated unicast transmissions to a multicast transmission in response to determining that the aggregate demand exceeds the threshold.

In another aspect, a computer program product includes a computer-readable medium storing code for causing at least one computer to: determine whether an aggregate demand for a content provided via dedicated unicast transmissions exceeds a threshold based on indications received from mobile entities; and switch transmission of the content from the dedicated unicast transmissions to a multicast transmission in response to determining that the aggregate demand exceeds the threshold.

In another aspect, a method is for managing demand-based multicast services in a wireless communication system (WCS) capable of both unicast and multicast signaling. The method includes determining whether a content can be delivered via unicast transmission and multicast transmission. The method includes provisioning the unicast transmission and multicast transmission in response to determining the content can be delivered via unicast transmission and multicast transmission. The method includes switching between the unicast transmission and the multicast transmission.

In another aspect, an apparatus is for managing demand-based multicast services in a wireless communication system (WCS) capable of both unicast and multicast signaling. The apparatus includes at least one processor configured to (a) determine whether a content can be delivered via unicast transmission and multicast transmission, (b) provision the unicast transmission and multicast transmission in response to determining the content can be delivered via unicast transmission and multicast transmission, and (c) switch between the unicast transmission and the multicast transmission. The apparatus includes a memory coupled to the at least one processor for storing data.

In another aspect, an apparatus is for managing demand-based multicast services in a wireless communication system (WCS) capable of both unicast and multicast signaling. The apparatus includes means for determining whether a content can be delivered via unicast transmission and multicast transmission. The apparatus includes means for provisioning the unicast transmission and multicast transmission in response to determining the content can be delivered via unicast transmission and multicast transmission. The apparatus includes means for switching between the unicast transmission and the multicast transmission.

In another aspect, a computer program product includes a computer-readable medium storing code for causing at least one computer to: determine whether a content can be delivered via unicast transmission and multicast transmission; provision the unicast transmission and multicast transmission in response to determining the content can be delivered via unicast transmission and multicast transmission; and switch between the unicast transmission and the multicast transmission.

BRIEF DESCRIPTION OF THE DRAWINGS

FIG. 16 is a table illustrating a comparison between the methods illustrated in FIG. 10 (Option 1) and FIG. 13 (Option 2).

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
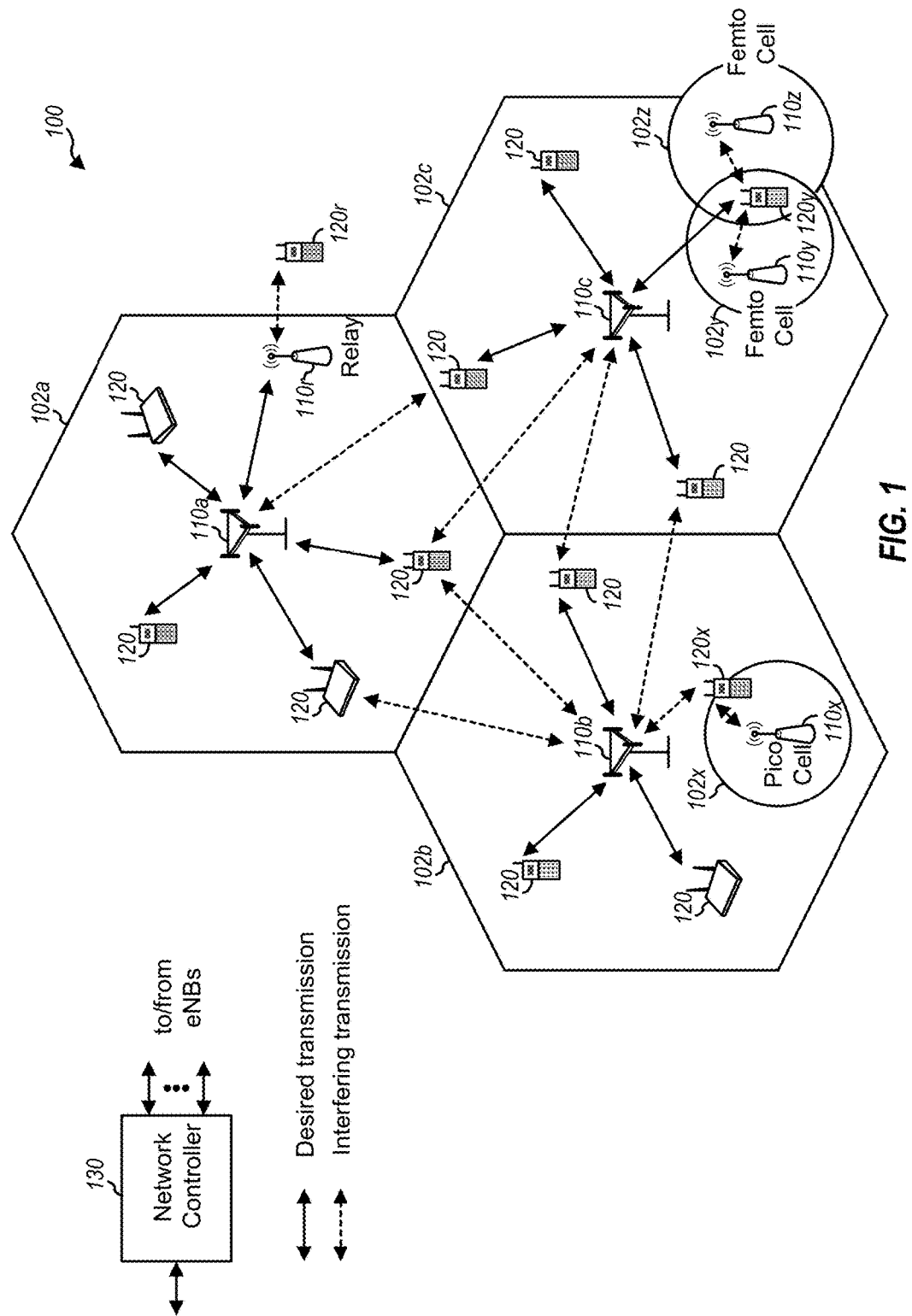
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, or other terminology.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, mobile entity, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or other terminology. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for system bandwidth of 1.25, 2.5, 5, 10 or 20 MHz, respectively.

Figure 2:
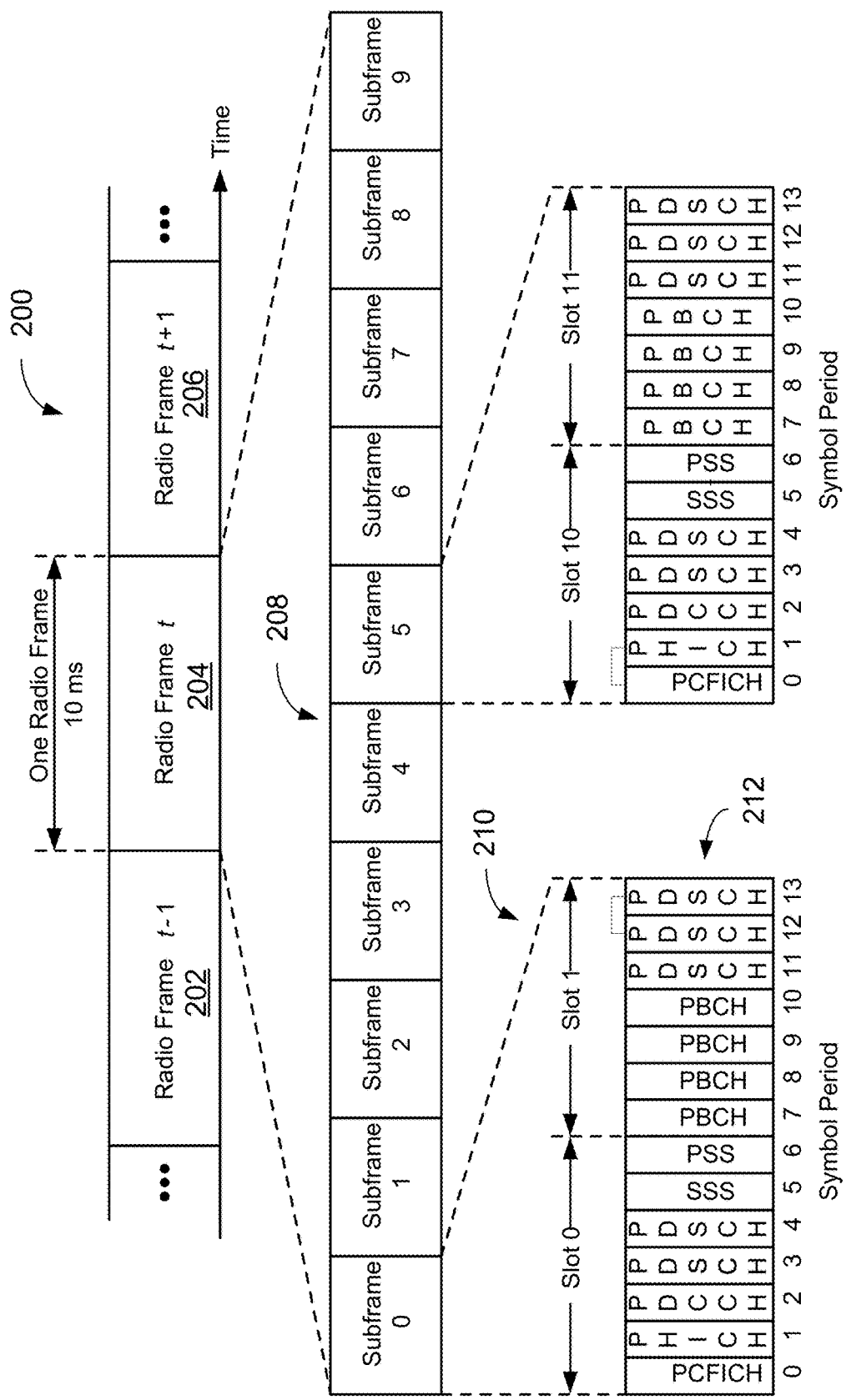
FIG. 2 is a block diagram conceptually illustrating an example of a down link frame structure in a telecommunications system.
Figure 6:
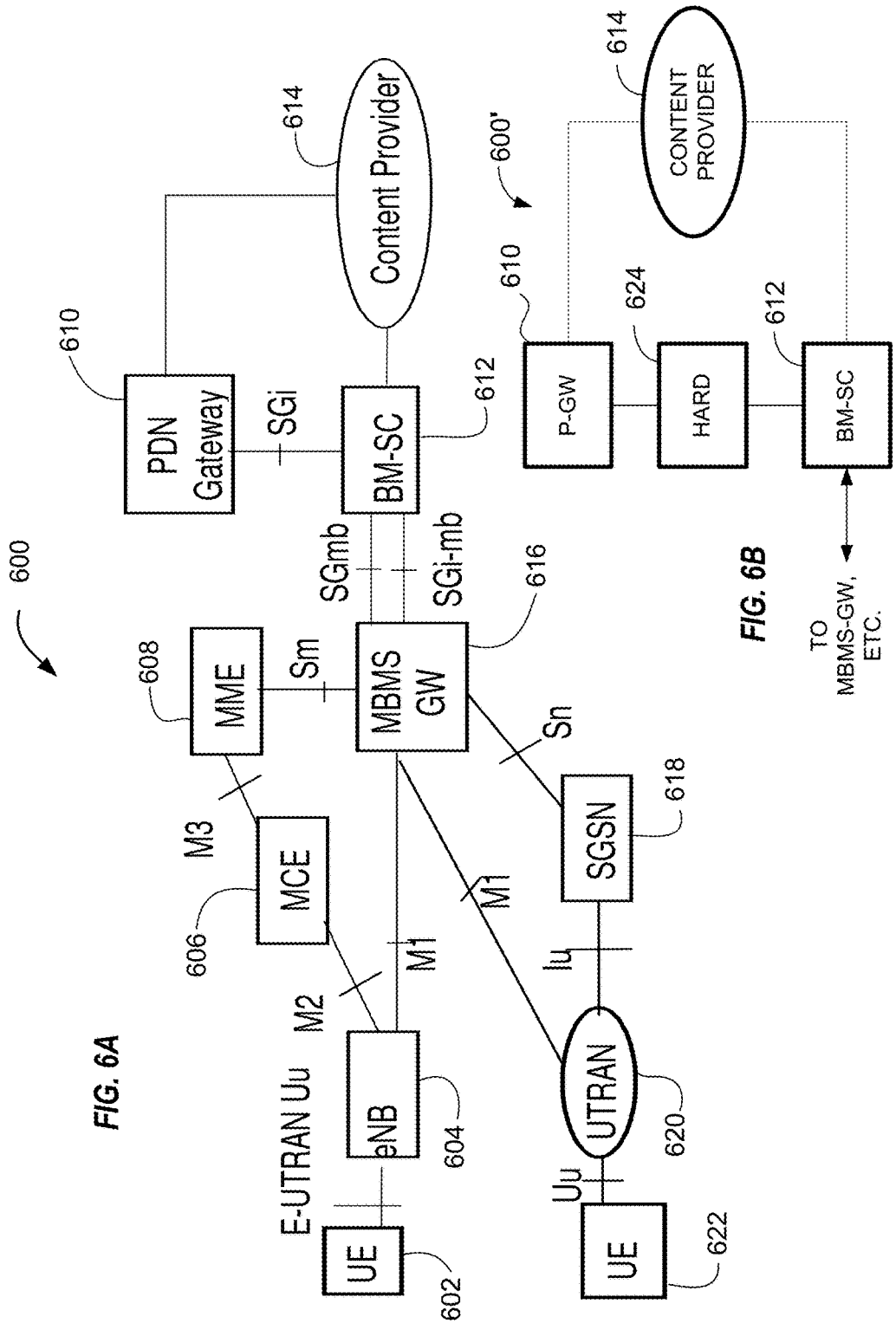
FIGS. 6A-B are block diagrams illustrating components of wireless communication systems for providing or supporting MBSFN service.

FIG. 2 shows a down link frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
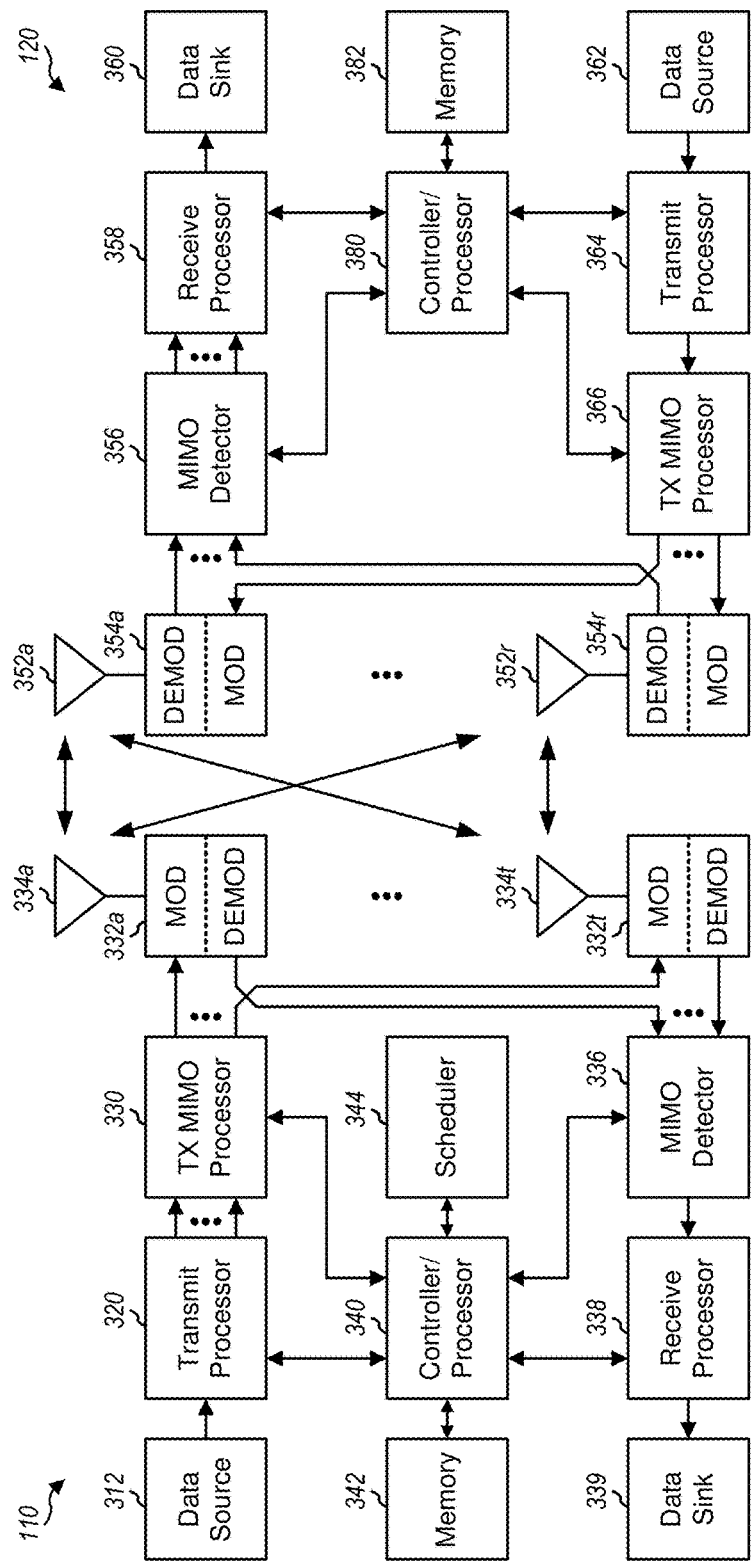
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, or other control channel. The data may be for the PDSCH, or other data channel. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODS) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. The processor 380 may also perform or direct the execution of the functional blocks illustrated in processes for performance by a UE according to the techniques described herein.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of various processes for the techniques described herein. The memories 342 and 382 may store data and program codes for the base station 110 and the UE 120, respectively. A scheduler 344 may schedule UEs for data transmission on the downlink and/or uplink. Other aspects of the techniques described herein may be performed by other network entities of a wireless communications system as described elsewhere herein.

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other at the receiver. In the context of eMBMS, the shared content is transmitted from multiple eNBs of an LTE network to multiple UEs. Therefore, within a given eMBMS area, a UE may receive eMBMS signals from any eNB (or eNBs) within radio range. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile entities, such as, for example, UEs.

With respect to a physical layer (PHY) of eMBMS for LTE Frequency Division Duplex (FDD), the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Figure 4:
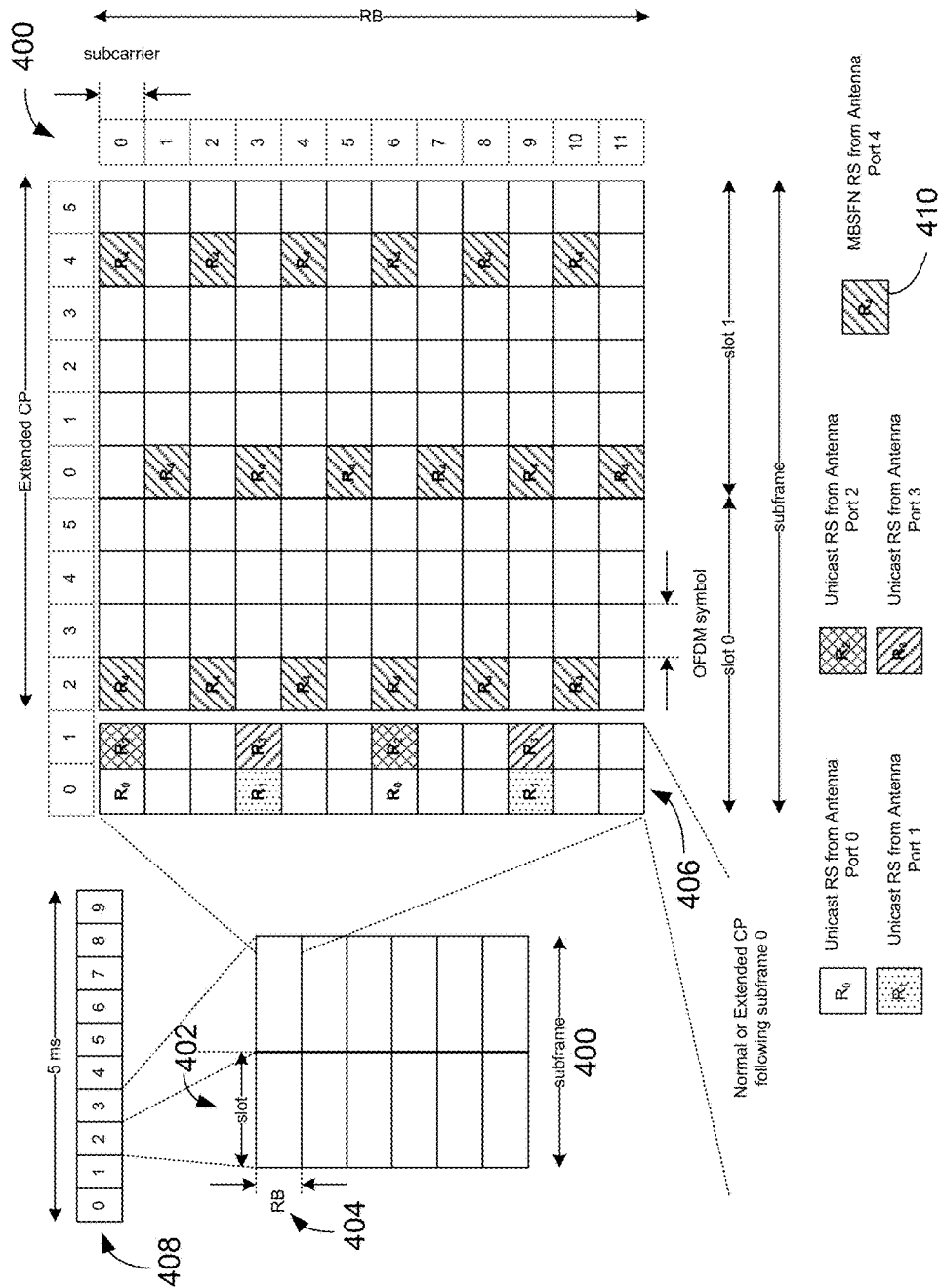
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes 400, for a single-carrier case. Components depicted in FIG. 4 correspond to those shown in FIG. 2, with FIG. 4 showing the individual subcarriers within each slot 402 and resource block (RB) 404. In 3GPP LTE, a RB 404 spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes 408 labeled 0, 1, 2, 3, 4, 5, 6, 7, 8, and 9, subframes 0, 4, 5, and 9 may be excluded from eMBMS in FDD. Subframes 0, 1, 5, and 6 may be excluded from eMBMS in time division duplex (TDD). More specifically, subframes 0, 4, 5, and 9 may be used for PSS/SSS/PBCH/paging/system information blocks (SIBS) and unicast service. Remaining subframes in the sequence, e.g., subframes 1, 2, 3, 6, 7, and 8 may be configured as eMBMS subframes.

With continued reference to FIG. 4, within each eMBMS subframe 400, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different in adjacent subframes. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe 400 includes MBSFN RSs 410 but not unicast RSs. The present technology is not limited to the particular frame allocation scheme illustrated by FIGS. 2 and 4, which are presented by way of example, and not by way of limitation. A multicast session (which may sometimes also be referred to as a multicast broadcast) may use any suitable frame allocation scheme. Multicast and broadcast may be used interchangeably in this disclosure.

Figure 5:
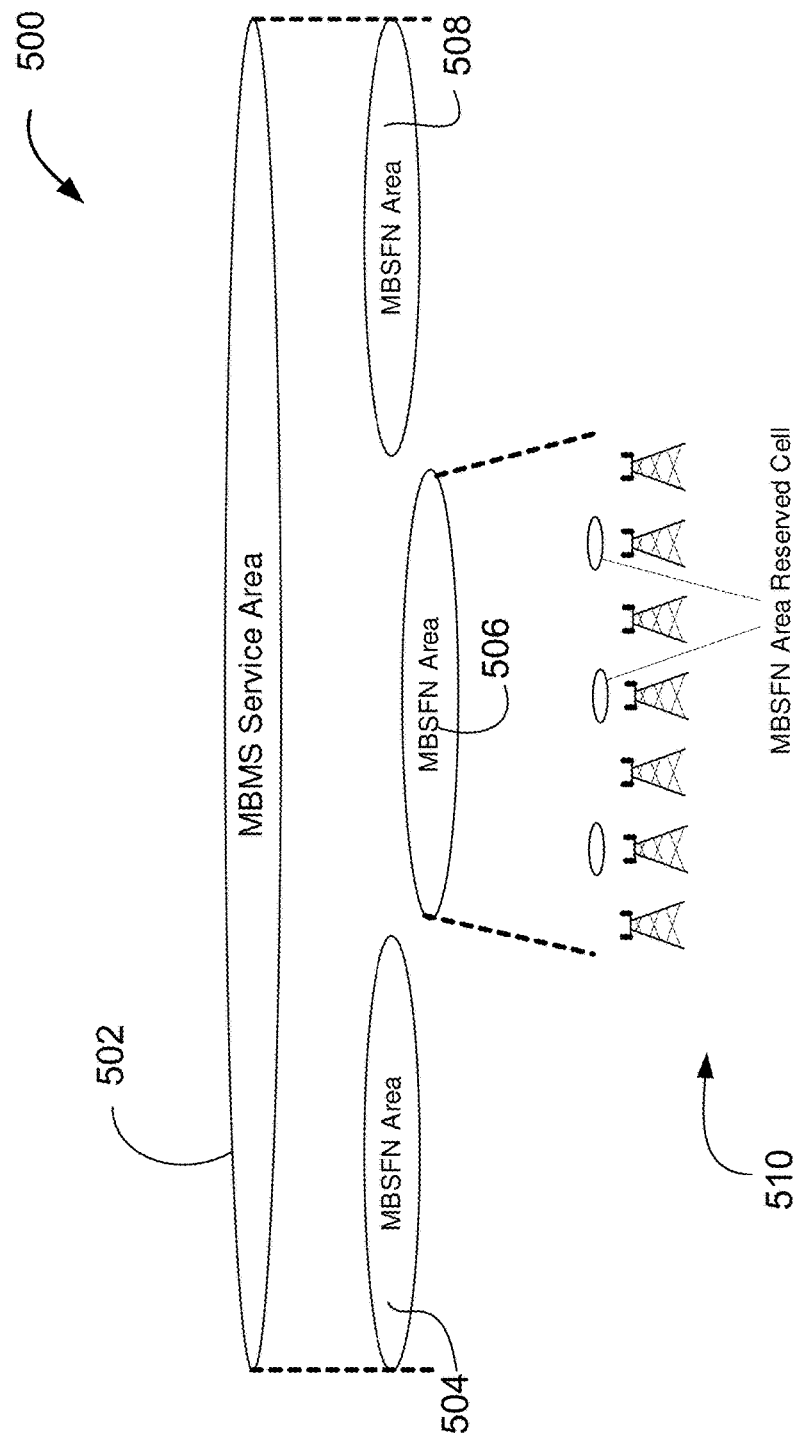
FIG. 5 is a diagram illustrating MBMS over a Single Frequency Network (MBSFN) areas within an MBSFN service area.

FIG. 5 illustrates a system 500 including an MBMS service area 502 encompassing multiple MBSFN areas 504, 506, 508, which themselves include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized manner using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

FIG. 6A illustrates functional entities of a wireless communication system 600 for providing or supporting MBSFN service. Regarding Quality of Service (QoS), the system 600 uses a Guaranteed Bit Rate (GBR) type MBMS bearer, wherein the Maximum Bit Rate (MBR) equals the GBR. These components are shown and described by way of example, and do not limit the inventive concepts described herein, which may be adapted to other architectures and functional distributions for delivering and controlling multicast transmissions.

The system 600 may include an MBMS Gate Way (MBMS GW) 616. The MBMS GW 616 controls Internet Protocol (IP) multicast distribution of MBMS user plane data to eNBs 604 via an M1 interface; one eNB 604 of many possible eNBs is shown, wherein "M1" refers to a logical interface as described by technical specifications for LTE and related specifications. In addition, the MBMS GW controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a UE 602 via an E-UTRAN Uu interface, wherein "Uu" refers to an air interface as described by technical specifications for LTE and related specifications. The RNC 620 may provide MBMS content to a UE 622 via a Uu interface. The MBMS GW 616 may further perform MBMS Session Control Signaling, for example MBMS session start and session stop, via the Mobility Management Entity (MME) 608 and Sm interface, wherein "Sm" refers to a logical interface as described by technical specifications for LTE and related specifications. The MBMS GW 616 may further provide an interface for entities using MBMS bearers through the SG-mb (user plane) reference point, and provide an interface for entities using MBMS bearers through the SGi-mb (control plane) reference point, wherein "SG-mb" and "SGi-mb" refer to logical interfaces as described by technical specifications for LTE and related specifications. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces.

The system 600 may further include a Multicast Coordinating Entity (MCE) 606. The MCE 606 may perform an admission control function for MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604, wherein "M2" and "M3" refer to logical interfaces as described by technical specifications for LTE and related specifications.

The system 600 may further include a Broadcast-Multicast Service Center (BM-SC) 612 in communication with a content provider server 614. The BM-SC 612 may handle intake of multicast content from one or more sources such as the content provider 614, and provide other higher-level management functions as described below. These functions may include, for example, a membership function, including authorization and initiation of MBMS services for an identified UE. The BM-SC 612 may further perform MBMS session and transmission functions, scheduling of live broadcasts, and delivery, including MBMS and associated delivery functions. The BM-SC 612 may further provide service advertisement and description, such as advertising content available for multicast. A separate Packet Data Protocol (PDP) context may be used to carry control messages between a UE and a BM-SC. The BM-SC may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 612 may indicate session start, update and stop to the MBMS-GW 616 including session attributes such as QoS and MBMS service area.

The system 600 may further include a Mobility Management Entity (MME) 608 in communication with the MCE 606 and MBMS-GW 616. The MME 608 may provide a control plane function for MBMS over E-UTRAN. In addition, the MME may provide the eNB 604 with multicast related information defined by the MBMS-GW 616. An Sm interface between the MME 608 and the MBMS-GW 616 may be used to carry MBMS control signaling, for example, session start and stop signals.

The system 600 may further include a Packet Data Network (PDN) Gate Way (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface.

An alternative system 600' as shown in FIG. 6B may utilize a network entity that may be referred to, for example, as a high attach rate detection (HARD) module 624. The system 600' is similar to system 600 shown in FIG. 6A, and uses the same reference numerals for corresponding elements. The HARD module 624 may be an additional distinct network entity, or it may be incorporated into, for example, the P-GW 610, the BM-SC 612 (e.g., as a logical entity), traffic detection function (TDF) (not shown in the figure), or the content provider 614. If the HARD module 624 is implemented as a distinct network entity, it may be located, for example, between the P-GW 610 and the BM-SC 612; however, other arrangements are also possible. Further details regarding the alternative system 600' are discussed in the disclosure below in connection with demand monitoring.

Figure 7:
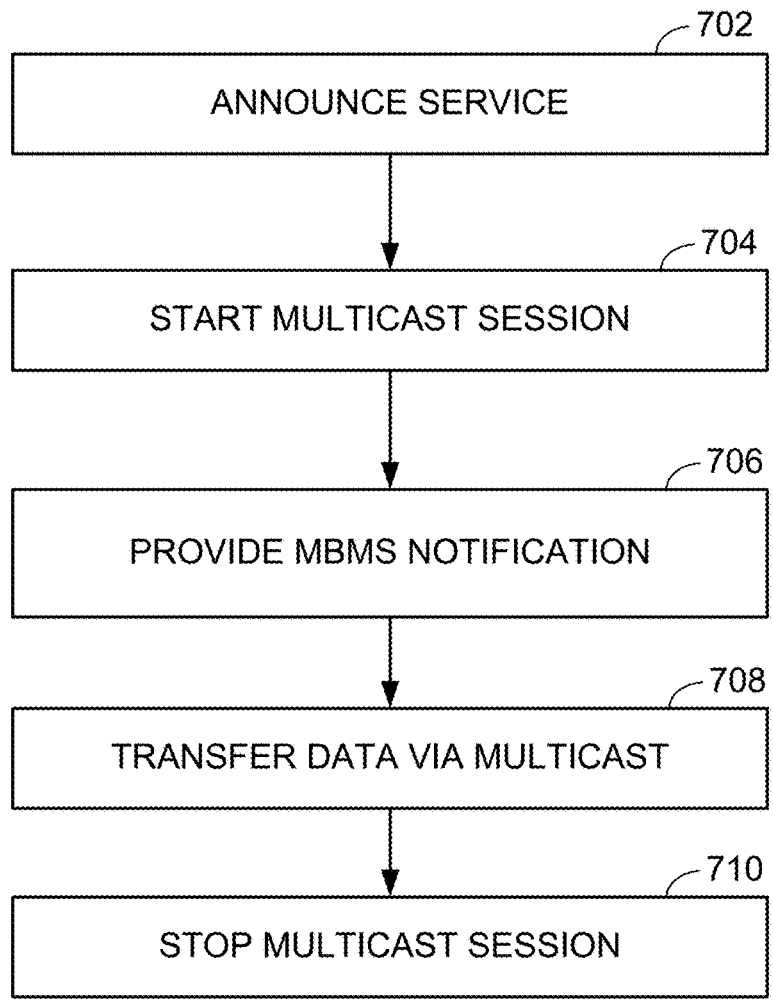
FIG. 7 illustrates an embodiment of a methodology for managing a multicast service in a wireless communications system.

Either of the systems 600 and 600' may be used to transmit an eMBMS or other multicast session in an MBMS area. As shown in FIG. 7, a method 700 for handling an MBMS session may include an initial operation 702 of announcing or advertising availability of a scheduled transmission. For example, an MBMS broadcast of a sporting event may be advertised in a specified area to begin at a certain date and time, for further example by using an Open Mobile Alliance (OMA) Mobile Broadcast Services Enabler Suite (BCAST) service guide. To obtain advertising, users may subscribe to a message service, download a program guide or listing, or take some other action. In the alternative, advertising may be pushed to mobile entities without requiring any action from the user. A service announcement may include, for example, a service identifier, service area identifier, schedule, applicable IP multicast address(es), and other information.

At 704, the system may initiate a multicast transmission at the advertised date and time, within the specified broadcast area. For example, a BM-SC may initiate an MBMS broadcast service using a session start procedure to establish an MBMS radio bearer.

At 706, the system may provide a notification of ongoing or forthcoming MBMS services to a mobile entity, such as, for example, by using an MCCH change notification transmitted to the mobile entity. At 708, the system transmits MBMS content for the advertised service, using the established MBMS radio bearer. At 710, once the eMBMS broadcast is completed, the system stops the multicast session and releases its associated radio bearer.

Figure 8:
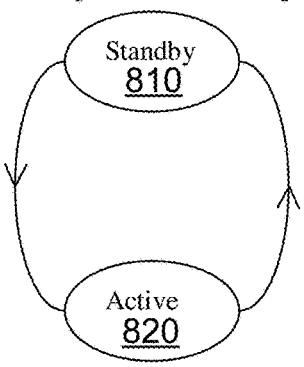
FIG. 8 is a state diagram illustrating active and inactive states of a multicast session.

An MBMS bearer context may be created in the MME, MBMS GW, SGSN and other elements of a Radio Access Network (RAN) upon initiation of an MBMS session. FIG. 8 illustrates a state cycle 800 between an active session state 820 and a standby state 810 of an MBMS bearer context. The MBMS bearer context itself may include an MBMS GW Tunnel Endpoint ID for Control plane (TEID-C) and a Temporary Mobile Group Identity (TMGI). A unique TMGI per MBMS bearer service may be allocated by the BM-SC, and used for MBMS notification purpose. The MBMS bearer context may further include a Flow Identifier; an MBMS GW IP Address for Control Plane in use; an MBMS GW IP Address for User Plane in use; and a Common Tunnel Endpoint ID (C-TEID) of the MBMS GW for the user plane. The MBMS bearer context may further include one or more QoS indicators or parameters, for example, a QoS Class Identifier (QCI), or MBR=GBR as mentioned above. The MBMS bearer context may further include an MBMS Service Area identifier; a list of downstream nodes; and an IP multicast and Source address for distribution, which may be selected by the MBMS GW. The foregoing MBMS bearer context components are provided by way of example only, and the present technology is not limited to a particular configuration of MBMS bearer context.

In LTE, an eMBMS application may be classified as schedule based eMBMS application or a demand based eMBMS application. In a schedule based eMBMS application, a system operator on the network side controls transmission of eMBMS content, which occurs at a scheduled time. A mobile entity may subscribe to the scheduled transmission and thereby receive content of interest to the mobile user. The Multi-Media Broadcast over a Single Frequency Network (MBSFN) is activated based on a pre-scheduled time slot. The service guide is made available for download by UEs prior to start of the service. Further, the UEs that are interested in the content tune to the designated eMBMS channel based on service schedule. Content offerings available to UEs via EMBMS transmission are limited to the operator's scheduled eMBMS offerings.

In a demand based eMBMS application, eMBMS content offerings are provided in response to demand monitoring. The network may switch delivery of content between unicast (UC) delivery and MBMS (or BC) mode of delivery based on user demand. When the network detects that demand for a content has a high attach rate (e.g., number of the UEs that are receiving a content from the same area exceeds a configurable threshold based on operator policy), the network may turn on MBMS mode, and switch content delivery from UC delivery to MBMS mode of content delivery. When the network detects demand for the content has a low attach rate (e.g., number of UEs that are receiving a content from the same area drops below a configurable threshold based on operator policy), the network may turn off the MBMS mode of content delivery, and the user may continue receiving the content through unicast delivery. For example, users may search and request content available over a wide-area network, such as the Internet. The system monitors demand levels for specific content from the same areas, and detects demand that exceeds a specified threshold. This threshold may float in response to current load levels or other parameters. In response to detecting demand in excess of the threshold, the system may provide the demanded content via an eMBMS session and, as necessary, transition mobile entities from separately controlled unicast sessions to a common eMBMS broadcast for the content within a specified network area, e.g., an MBMS service area, or MBSFN area. Available MBMS content is not limited to predetermined content selections broadcast by system operators on a schedule based basis. A much broader array of content may be available via eMBMS broadcasts to mobile entities interested in receiving the content. System operators may more efficiently utilize system resources by transmitting the most popular content, based on user demand, in an area via multicast.

In a demand based eMBMS, the MBSFN may be activated based on user interest. Demand-based eMBMS may require detection of the same content accessed by multiple unicast UEs, and activation of eMBMS to transmit the content, and seamlessly transition from unicast to multicast mode of transmission. Examples of content that are suitable for demand based eMBMS may include breaking news, traffic alerts due to abnormal events, which may cause a large number of users to tune to a news channel or traffic channel. Another example may be content/movie download via a cache, where many devices/users may request from a server download of some content, game, or movie during a certain sliding window time period of a predefined length. When the network detects the popularity of the content based on the requests, the network may decide to use MBMS mode via file download to send the content to the UEs. Dynamic Adaptive Streaming over HTTP (DASH) for streaming may be utilized to deliver content. The content is partitioned into one or more segments, or DASH segments, and delivered using HTTP. Segments of the content may be described in a media presentation description (MPD).

Demand based eMBMS may be further classified into two different types: (1) live broadcasting and (2) recorded on-demand broadcasting, for example on-demand streaming or file downloading. Streaming of television-like programming using IP (IP TV) and IP radio are examples of live broadcasting types of demand based eMBMS. A characteristic of live broadcasting is that the source streams identical content to one or more destination addresses at substantially the same time regardless of when a user initiates a streaming download, thereby emulating a broadcast of identical content to different receivers at the same time. Using a demand based methodology, mobile entities receiving or requesting to receive particular live broadcast content may be aggregated to receive the live content via multicast when located in the same MBSFN service area.

In comparison, a second type of demand based eMBMS—on-demand streaming or file downloading—may be characterized by the content being provided to different destinations at different times. The release of popular content may trigger concurrent or substantially concurrent streaming or downloading to different addresses. For example, the popularization of a video, or the release of a popularly anticipated application or application update, may cause many users to stream or download the content within a relatively narrow time window. Mobile entities receiving or requesting identical content within shared time window, for example, concurrent or overlapping downloading or streaming sessions, may partially or completely share bandwidth needed for the downloading or streaming using a demand-based eMBMS session. In this type of demand, the UE may cache the content locally and the content can be consumed by the user later per user's request.

Certain technical issues can arise in providing demand based eMBMS service, which may be resolved using different technological solutions. One of the issues to be resolved for demand based eMBMS may include transitioning between UC transmission and BC transmission modes so that user reception will be minimally impacted during the transition period between UC and BC transmission. Other technical issues may also include demand monitoring; that is, detecting mobile entities that are requesting specific content, either by receiving the content via a unicast session, requesting to receive the content, or both. Another technical issue may relate to establishing the demand based eMBMS service in the correct area to serve the common demand. Establishing the eMBMS service in the correct area may involve detecting locations of the mobile entities requesting common content. Another technical issue may relate to switching between unicast and multicast sessions when initiating or terminating a demand based eMBMS session. Another technical issue may relate to indicating to the UE the association of the content that may be sent via UC transmission or eMBMS transmission, or both, and indicating to the UE to switch between the UC transmission and BC transmission modes during a predefined time window. Another technical issue may relate to handling a mobile entity that requests content that is already being broadcast in an eMBMS session in the mobile entity's area. The present disclosure provides alternative technical solutions for addressing these and other issues related to providing demand based eMBMS in a wireless communications system.

Figure 9A:
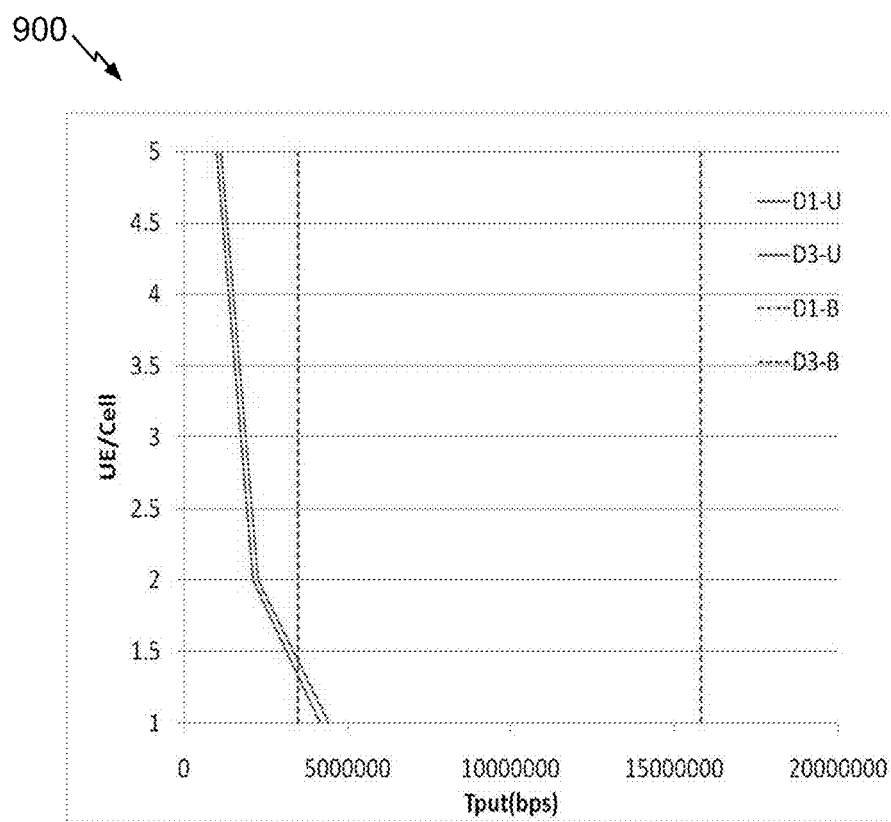
FIGS. 9A-B illustrate unicast and eMBMS capacity comparisons.
Figure 9B:
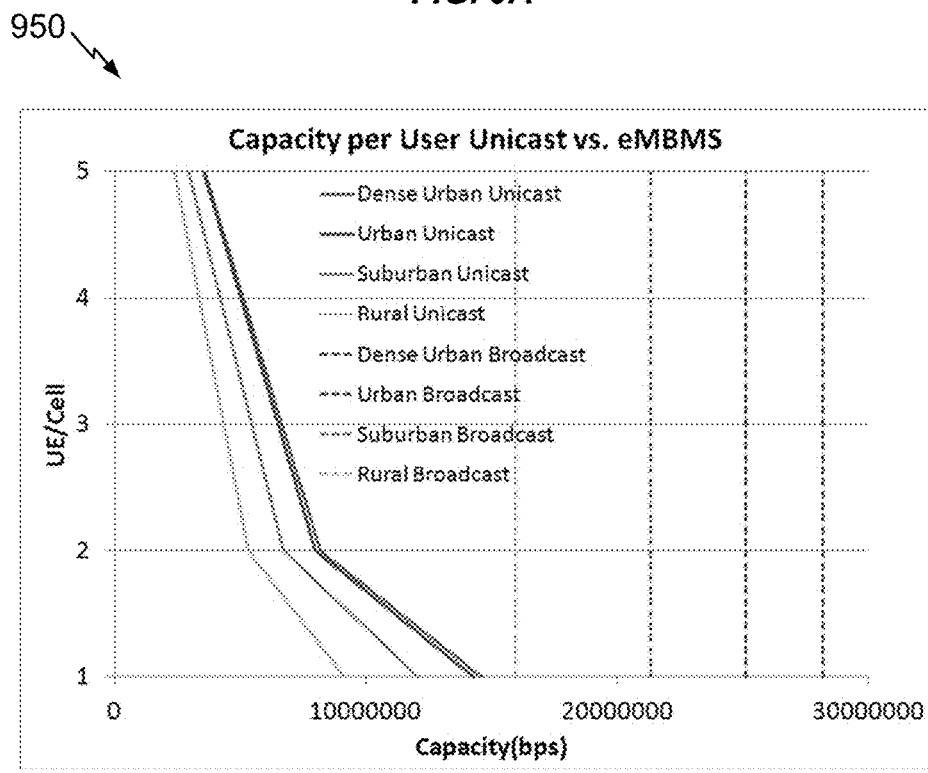

FIGS. 9A-B illustrate unicast and eMBMS capacity comparisons. FIGS. 9A-B show that eMBMS may offer higher capacity for content delivery that averages more than one user per cell in a large SFN area deployment. FIG. 9A shows a chart 900 comparing the number of UEs per cell versus data throughput in bits per second (bps) for multiple unicast transmission scenarios and multiple broadcast transmission scenarios using 3GPP D1 and D3 models. In unicast transmission, a piece of information or content may be sent from a transmitting entity to a receiving entity. There may only be one transmitting entity and one receiving entity. In broadcast transmission, a piece of information or content may be sent from a transmitting entity to multiple receiving entities. In this case, there may be one transmitting entity, but the piece of information or content may be received by the multiple receiving entities. In the two unicast transmission scenarios of FIG. 9A, as the UE/cell value increases, the throughput decreases because each UE requires a separate transmission of content. The separate transmissions of content reduce transmission efficiency due to extra overhead, scheduling requirements, etc. In the two multicast transmission scenarios of FIG. 9A, as the UE/cell value increases, the throughput per user remains fixed because the same transmission may be received by all the UEs. There is no loss of throughput for each additional UE in broadcast transmission. FIG. 9B shows a chart 950 comparing the number of UEs per cell versus capacity in bits per second (bps) for multiple unicast transmission scenarios and multiple broadcast transmission scenarios using other propagation models including dense urban, urban, suburban, and rural. eMBMS may be used for broadcast transmissions. In the scenarios of FIG. 9B, analogous to the unicast and broadcast scenarios of FIG. 9A, the capacity decreases as the UE/cell values increase in unicast transmission, but the capacity per user may remain fixed as the UE/cell values increase in broadcast transmission.

Figure 10:
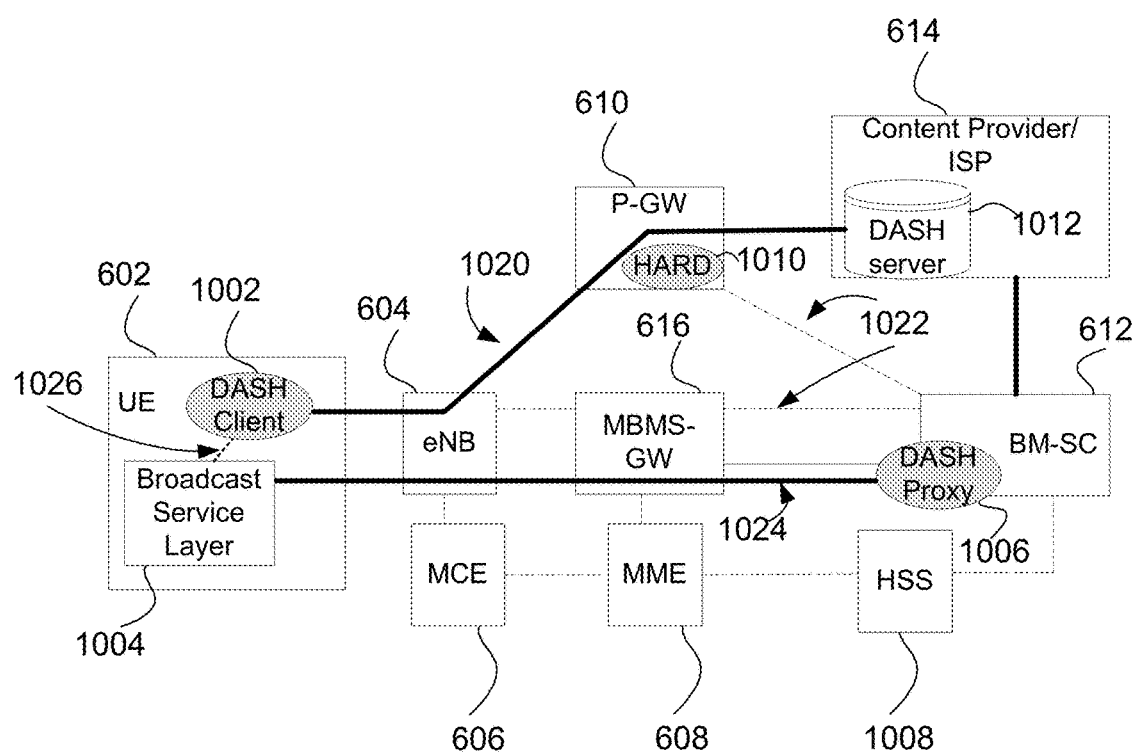
FIG. 10 is a block diagram illustrating components of a wireless communication system for providing or supporting seamless transition between MBMS and unicast service based on a demand for a content.

FIG. 10 is a block diagram illustrating components of a wireless communication system for providing or supporting seamless transition between MBMS and unicast service based on demand for a content. The HARD module 1010 may be co-located with the P-GW 610. The seamless transition is a transition of delivery of content to a mobile device from UC to BC or BC to UC without or with minimal service interruption. The content provider/internet service provider (ISP) 614 may include a DASH server 1012. The system may include a unicast DASH path 1020 for transmission of the DASH segments from the content provider/(ISP) 614 to the DASH client 1002 in the UE 602 via the P-GW 610. The system may include a broadcast DASH path 1024 for transmission of the DASH segments from the content provider/ISP 614 to the Broadcast service layer 1004 in the UE 602 via the DASH-proxy 1006 in the BM-SC 612, the MBMS-GW 616, and the eNB 604. A broadcast session management connection 1022 is shown in dashed line between the P-GW 610, BM-SC 612, MBMS-GW 616, eNB 604, MCE 606, MME 608, and HSS 1008. A broadcast service layer interface 1026 is shown between the broadcast service layer 1004 and DASH client 1002. The wireless communication system may include a High Attach Rate Detection (HARD) module 1010. The HARD module 1010 may be co-located with the P-GW 610 as illustrated in FIG. 10, or co-located with the content provider/ISP 614, or co-located with another network entity. For example, the HARD module 1010 may count the number of UEs accessing the same service or content via a unicast transmission from the same area to determine an aggregate demand. When the HARD module 1010 detects a high count of UEs accessing the same service/content ("high interest"), the HARD module 1010 may inform the DASH-proxy 1006. Thereafter, the HARD module 1010 may notify the UE once a broadcast service is available or where the content is switched from unicast delivery to broadcast delivery.

The DASH-proxy 1006 may be co-located with the BM-SC 612, a content delivery network (CDN), or may be a separate entity. Acting as the 'hub', the DASH-proxy 1006 serves only the broadcast data path. The DASH-proxy 1006 may inform the HARD module 1010 when the BC mode is started. The DASH-proxy 1006 may obtain a media presentation description (MPD) from the DASH server 1012 and send it to the UE (either through a service announcement, service discovery, or unicast MPD download). The DASH-proxy 1006 may interact with the BM-SC 612 to send the demand-based service on eMBMS. The UE may obtain the set of URLs that can be transitioned between Unicast and Broadcast mode from a web-server, or as provisioned information on the device, or through a service announcement. The UE may open a new PDN connection for those URLs that can be delivered on broadcast and Unicast.

The BM-SC 612 acts as the DASH-proxy 1006, and obtains content (from the DASH server 1012) for broadcast representations. The function of the DASH-proxy 1006 may include handling BC content upon a unicast to broadcast handoff trigger. The trigger may include receiving a message from the P-GW 610/HARD 1010 indicating a high rate attach event for the content. The function of the P-GW 610/HARD 1010 may include redirecting the UE to switch from UC reception to BC reception through a Protocol Configuration Options (PCO) message, or through a HTTP redirection message. The redirection signaling may also include the association or relationship between the unicast transmission and the MBMS transmission, such as the content URL and TMGI for the associated MBMS transmission. The UE may also use PCO to signal the UE's capability to the P-GW if the P-GW supports demand based eMBMS so that the HARD module 1010 may perform high attach rate detection only on the UEs capable of detecting the switch from UC to BC or BC to UC and being capable of switching reception modes. The function of the UE may include upon receiving an indication/redirection from the P-GW 610, initiating a procedure for receiving a service-announcement from the broadcast channel or service discovery procedure from the unicast channel. The UC to BC indication may speed up the transition from UC delivery to BC delivery. The frequency on which the UE is/was receiving the content via unicast channel may not support the BC transmission so that the UE may need to perform a service announcement on the broadcast channel of the BC transmission transmitted on another frequency. The unicast and broadcast services may or may not use the same MPD (called unified MPD).

Figure 11:
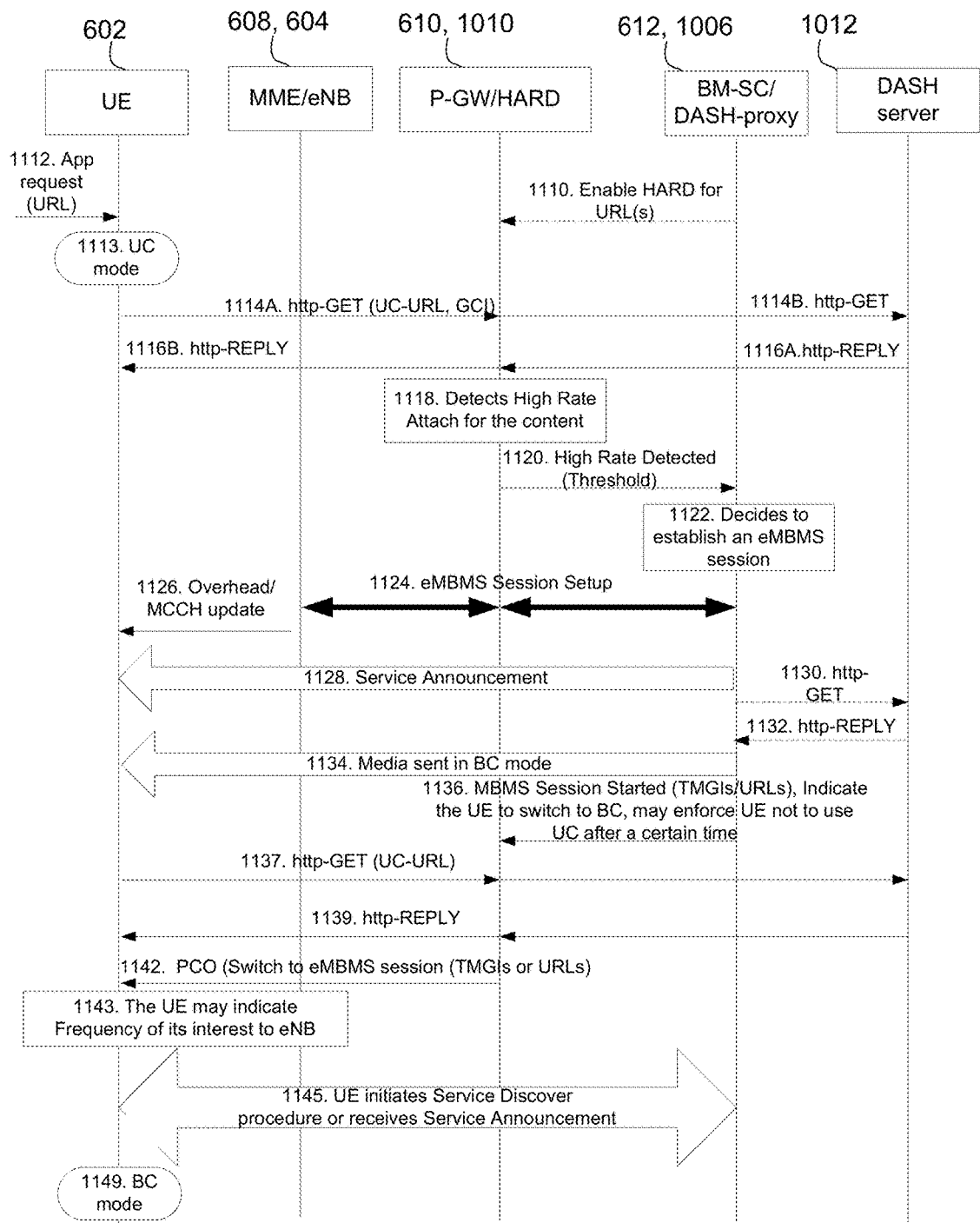
FIG. 11 is a sequence diagram illustrating activities by various components of a wireless communications system implementing or supporting a demand-based multicast service, according to embodiments implementing seamless transition from unicast to broadcast service.

FIG. 11 is a sequence diagram illustrating activities by various components of a wireless communications system implementing or supporting a demand-based multicast service, according to embodiments implementing a seamless transition from unicast to broadcast. At step 1110, the BM-SC 612 may send signaling to the P-GW 610 to enable the HARD function to monitor for specific URL(s) that may have high demand to detect high demand URL(s), where a high demand URL is a URL being requested by a number of users that exceeds a threshold. Alternatively, specific URL(s) that need to be processed by the HARD module 1010 may be preconfigured at the P-GW. For example, the P-GW may receive the specific URL(s) from an operator or from the BM-SC 612, e.g., the P-GW receives a URL of where a new download is available. The P-GW may receive another indication that gives a hint of the URL(s) that are likely to have high demand so that not all URLs need to be examined. For example, the P-GW may receive a list of online sites offering news, traffic, movies, and other content so that the P-GW needs to process only the URL(s) from the list of online sites offering the content. In yet another alternative, the P-GW/HARD may perform deep packet inspection (DPI) for all flows. This DPI inspection may be performed in a traffic detection function (TDF) entity. At step 1112, an application at the UE 602 requests content found at a URL. The UE requests the content via unicast mode, at step 1113. At step 1114A, the UE sends a request for the content by sending an http-GET including a unicast URL and UE location information, e.g., a Cell Global ID (CGI), to the P-GW 610. Real-time transport protocol (RTP) control protocol (RTCP) messages may be used in addition to or in lieu of HTTP messages. For example, at step 114A, the UE may alternatively or additionally send a request for the content by sending an RTCP message including either or both a URL and UE location information. The CGI indicates the cell where the UE is currently located at. Other position location information may also be included such as, for example, MBSFN Area ID, tracking area ID, etc. At step 1114B, the http-GET is forwarded from the P-GW to the DASH server. At steps 1116A-B, the DASH server 1012 responds (step 1116A) to the request with an http-REPLY message via the P-GW 610 (step 1116B) to the UE 602. At step 1118, the HARD module 1010 detects high demand for content by counting the number of UEs accessing the same content from the same area. The HARD module 1010 may check the URL(s) on all outgoing packets. Only the URLs of content/services that may be potentially transmitted over eMBMS may be counted. Further, only those UEs that have subscription for eMBMS or enabled for demand based eMBMS reception may be included in the High Attach Rate detection process. For example, the P-GW may obtain eMBMS capability information, including subscription information for UEs, from a home subscriber server (HSS), or get information from the UE via a PCO message during the PDN connection establishment. UE location information may be obtained through the following methods: 1) having the UE include CGI information in the HTTP-GET message; 2) having the UE include location information in an RTCP message; 3) retrieving the location information via a Network Provided Location Information (NetLoc) service (as described in 3GPP TR 23.842), which is a CGI-based method added in Rel-11; or 4) existing means such as counting, MBMS user service registration, secure user plane location (SUPL), etc. At step 1120, the HARD module 1010 may inform the DASH-proxy 1006 when the number of users accessing a service from an area crosses a pre-defined threshold. Threshold hysteresis may be configured to prevent ping-ponging between set up and tear down of the eMBMS session. The threshold values may be set based on a number of active users, number of cells, and/or a hysteresis range. For example, the number of UEs in an area may exceed a first threshold T1, and then delivery of the content is switched from UC delivery to BC delivery. Then, the number of UEs in the area may drop to less than a second threshold T2, where delivery of the content is switched from BC delivery to UC delivery. The first threshold T1 may be greater than the second threshold T2. For example, the first threshold T1 may be defined as 100, with T2 defined as 70 for a hysteresis range (T1-T2) of 30. At step 1122, based on the received number of users crossing the pre-defined threshold, the DASH-proxy 1006 may decide to establish an eMBMS session. Steps 1124 through 1134 illustrate signaling between the network and mobile components to establish the eMBMS session and broadcast the content. At step 1124, the eMBMS session setup is performed between the MME/eNB and the P-GW, and between the P-GW and BM-SC. After the eMBMS session setup is performed, the MME/eNB sends an MCCH update to the UE at step 1126. At step 1128, a service announce message is broadcast to the UE 602. Optionally in a 'pull' configuration, at step 1130, the BM-SC 612 may send an http-GET message to the DASH server for the broadcast content to pull content from the DASH server. At step 1132, the DASH server sends an http-REPLY to the BM-SC 612/DASH-proxy 1006. If the optional step 1130 is not performed, the DASH server may send the broadcast content in a 'push' configuration without an initial request from the BM-SC 612/DASH-proxy 1006. At step 1134, the content is sent in a broadcast transmission to the UE.

At step 1136, the BM-SC 612 may notify the HARD module 1010 to disable HARD functions when the MBMS session has been set up. The BM-SC 612 may also notify the P-GW 610 whether the UE 602 should not be served via the UC channel after a certain time. At step 1142, the P-GW 610 then notifies the UE 602 to switch from receiving content via UC transmission to receiving content via BC transmission. The switch in reception mode may be performed via signaling such as, for example, PCO or HTTP redirection. For single frequency deployment, the P-GW 610 may not need to notify the UE 602 to make the switch. For multiband, multi-frequency deployment, the signaling may trigger the UE to read overhead messages to determine on which frequency to tune to receive the service over BC mode. The UE may obtain frequency information from a SIB and/or a USD, or from switching redirection signaling received from the P-GW. The method may follow a Make before Break model where BC transmission is started before stopping UC transmission. In the Make before Break model, the DASH-proxy/BM SC 612, 1006 may start the eMBMS session, and once the BC transmission is started, then the HARD module 1010 may stop detection of URLs. The UE 602 may continue reception via the UC mode until it is ready to receive the service via the MBMS session. Then the unicast channel may be torn down; or the eNB may tear down the unicast channel based on detection of no data activities over the unicast channel for a configurable time period. If the UE continues to use the unicast channel to get service after the P-GW indicates a switch to BC mode, after the grace period, the P-GW may need to perform enforcement to make sure the UE is no longer using the unicast channel. The P-GW may trigger the resource release by releasing the PDN connection or the P-GW may drop the HTTP-GET received from the UE and not forward the HTTP-GET to the DASH server.

Figure 12:
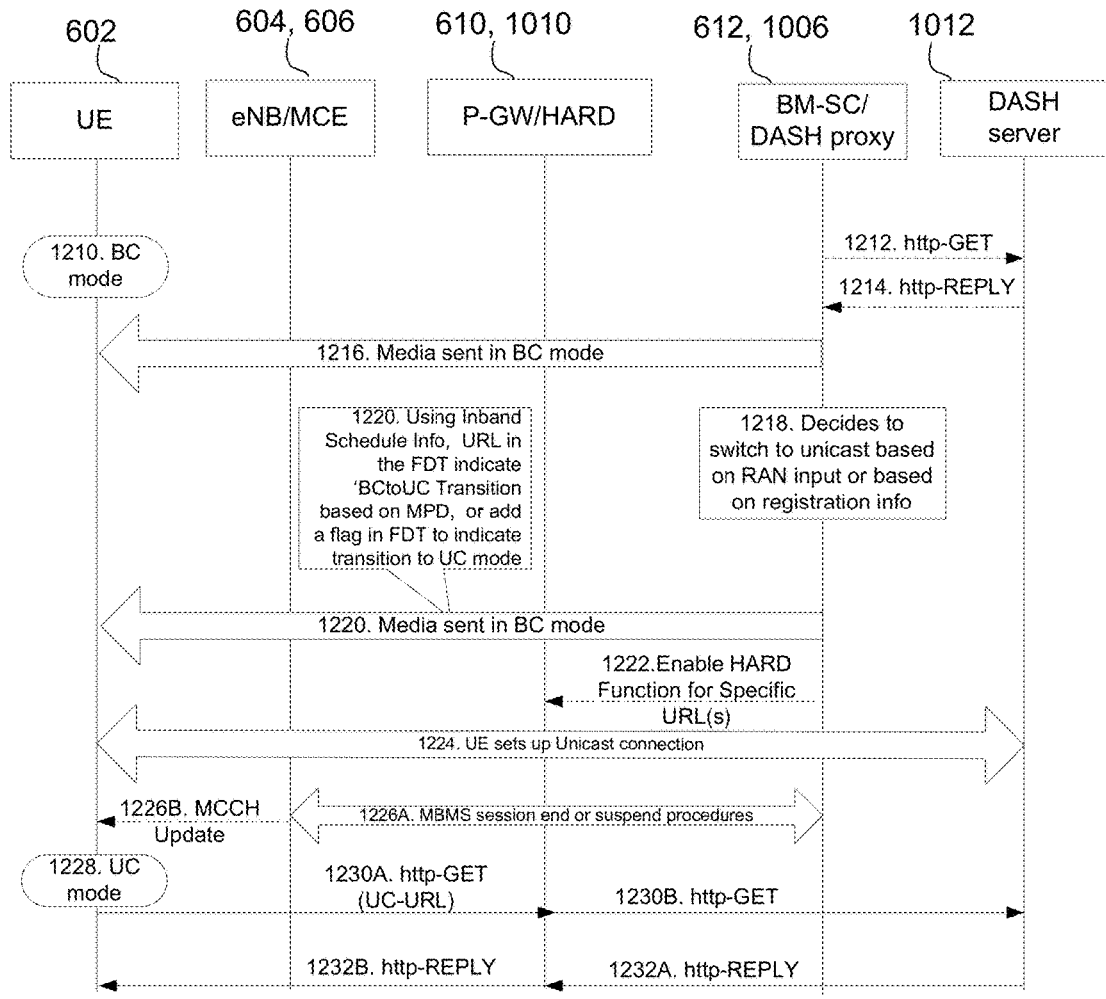
FIG. 12 is a sequence diagram illustrating activities by various components of a wireless communications system implementing or supporting a demand-based multicast service, according to embodiments implementing seamless transition from broadcast to unicast service.

FIG. 12 is a sequence diagram illustrating activities by various components of a wireless communications system implementing or supporting a demand-based multicast service, according to embodiments implementing seamless transition from broadcast to unicast. The function of the BM-SC 612/DASH-proxy 1006 may include deciding whether to switch to unicast based on MBMS counting. The BM-SC 612/DASH-proxy 1006 may make an indication to the UEs through in-band Schedule Fragment information or via a file delivery table (FDT) on a URL whose representation signals a BC to UC transition. The function of the UE 602 may include, upon receiving the in-band Schedule Information Fragment or the indication from the FDT, (1) continuing to receive the content from the BC channel, or (2) initiating unicast channel establishment. If the in-band Schedule Information Fragment is used at step 1220, the UE knows the BC transmission end time from the Schedule Information. Before BC transmission ends, the DASH client may start to query for DASH segments through the unicast transmission based on the MPD representation period. Alternatively, the MPD may use a BaseURL@serviceLocation to indicate a BC-to-UC-transition. The DASH segments identified by the URLs that are represented with a BC-to-UC transition are obtained through the broadcast channel. Both unicast and broadcast transmissions of the content may use the same MPD, which lists all URLs used for unicast and broadcast transmission.

Switching from broadcast delivery to unicast delivery may not cause a service interruption because the network may continue to deliver the content using eMBMS for a period of time to allow the UEs to switch to UC reception. To establish the broadcast to unicast handoff, the network may need to determine (e.g., count) how many users are interested in a certain broadcast service from a particular area. The procedure may use RAN-based counting as defined in the standards, or the procedure may be based on registration information. When the RAN (e.g., MCE) detects the number of UEs that are interested in a MBMS service is below a preconfigured threshold, the MCE may inform the BM-SC that the number of UEs interested in the service is below the threshold. Next, in a Make before Handoff procedure, the DASH-proxy 1006 may set up unicast delivery prior to stopping broadcast delivery or the UE may set up unicast reception prior to stopping broadcast reception to prevent service disruption as long as the UE switches to UC reception before the BC transmission end time. For example, in one aspect, the DASH-proxy 1006 may send in-band scheduling information to indicate a BC transmission end time. In another aspect, DASH-proxy 1006 may start using the representation (using FDT in FLUTE) that indicates 'broadcast to unicast transition'. In yet another aspect, DASH-proxy 1006 may continue with the MBMS session but indicate to the UE to transition to UC via FDT. If the in-band scheduling information is used for indicating a BC transmission end time, the DASH client may continue to query for the DASH segments through unicast based on the MPD representation period after the BC transmission ends. When the UE 602 obtains the URL whose representation signals a BC to UC transition (e.g., a 'broadcast to unicast transition' message) or receives the indication of the signal to transition from BC to UC from the FDT, the UE 602 may initiate a procedure to setup the unicast channel. The BM-SC 612 may indicate to the P-GW to start the HARD function upon making the decision to switch from BC to UC.

Figure 13:
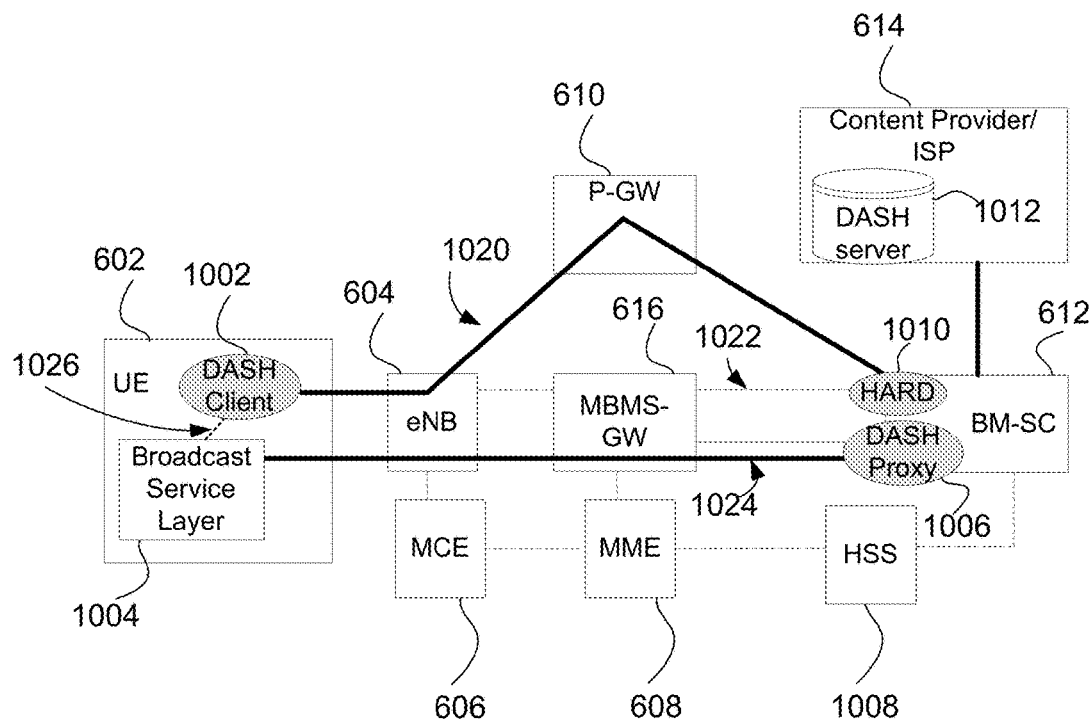
FIG. 13 is another block diagram illustrating components of another wireless communication system for providing or supporting seamless transition between MBMS and unicast service based on demand for a content.

FIG. 13 is another block diagram illustrating components of another wireless communication system for providing or supporting a demand based transition of content delivery between MBMS and unicast service. The HARD module 1010 may be co-located with the BM-SC 612. The HARD module 1010 may count the number of UEs accessing the same service from the same area. The DASH-proxy 1006 may be co-located with the BM-SC 612 or with the CDN, or may function as a separate entity. The DASH-proxy 1006 may act as the 'hub' for both UC & BC data paths and may act as the unicast socket-connection endpoint setup by the UE 602. Further, the DASH-proxy 1006 may obtain an MPD from the DASH server and send it to UE 602 (either through service announcement or service discovery or unicast MPD download). The DASH-proxy 1006 may interact with the BM-SC 612 to send demand-based services on eMBMS. The BM-SC 612 may act as a DASH client (now shown), and obtain content (from the DASH server 1012) for the broadcast representations.

Figure 14:
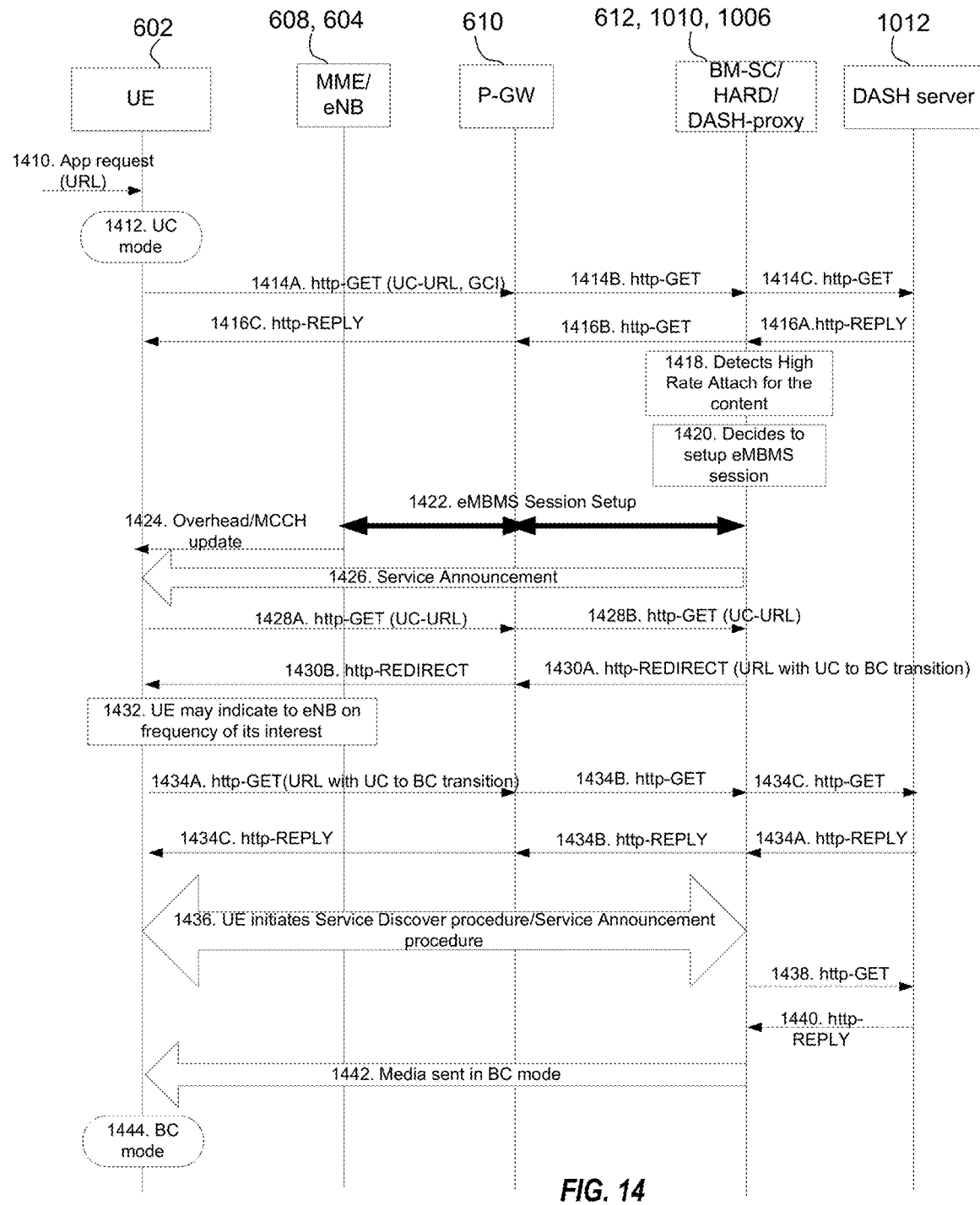
FIG. 14 is a sequence diagram illustrating activities by various components of the another wireless communications system implementing or supporting a demand-based multicast service, according to embodiments implementing seamless transition from unicast to broadcast service.

FIG. 14 is a sequence diagram illustrating activities by various components of another wireless communications system implementing or supporting a demand-based multicast service, according to embodiments implementing a transition from unicast to broadcast. The function of the DASH-proxy 1006 may include, in the unicast mode, forwarding the http-GET request (step 1414C) to the DASH server 1012, and forwarding the response (step 1416C) from DASH server 1012 back to the UE 602. Upon receiving a UC to BC handoff trigger, the DASH-proxy 1006 may start redirecting http GET requests for a UC-URL to a URL whose representation signals a UC to BC transition. The function of the UE 602 may include, upon receiving a redirection, the following: 1) getting the content from the re-directed URL; and 2) initiating a procedure for receiving a service-announcement. Using a URL representation to signal the UC to BC transition in the HTTP redirect may speed up the transition from UC delivery to BC delivery. Also, the UC frequency may not support BC so that the UE 602 may need to receive the service announcement on another frequency. The MPD may use BaseURL@serviceLocation to indicate a UC-to-BC-transition. The DASH segments identified by the URLs that are represented with a UC-to-BC transition are obtained through the unicast channel. Both unicast and broadcast transmissions may use the same MPD. In another implementation, the UC to BC transition may be indicated through a new field added to the http REPLY message or using an http reject message with a new error code to indicate that the UE should switch from UC to BC. If, after the grace period, the UE continues to use the unicast channel to get service after the DASH-proxy redirects the UE to BC mode, the DASH-proxy/BM-SC/HARD may need to perform enforcement to make sure the UE is no longer using the unicast channel. The DASH-proxy/BM-SC/HARD may drop the HTTP-GET received from the UE and not forward the HTTP-GET to the DASH server.

At steps 1414A-B, the P-GW may redirect http-GET requests from the UE to the DASH-proxy using the following alternatives: alternative 1) the UE 602 may be provided with the BM-SC 612/DASH-proxy 1006 address through the MPD for the content that may be switched to eMBMS; alternative 2) use a special access point name (APN) (e.g., a dedicated AP). At step 1418, the HARD module 1010 located in the BM-SC 612 detects high demand for content by counting the number of UEs accessing the same content from the same area. Then the HARD module 1010 may check URL(s) on all outgoing packets. UE location information may be obtained: 1) by having the UE include CGI information in the HTTP-GET message; 2) having the UE include location information in an RTCP message; 3) retrieving the location information via a Network Provided Location Information (NetLoc) service (as described in 3GPP TR 23.842), which is a CGI-based method added in Rel-11; or 4) via existing means such as accounting, MBMS user service registration, SUPL, etc. At step 1420, when the number of users accessing the service from an area crosses a pre-defined threshold, the BM-SC 612 may determine to switch delivery of content to an eMBMS session. Threshold hysteresis may be configured to prevent ping-ponging between set up and tear down of the eMBMS session. For example, the number of UEs in an area may exceed a first threshold T1, and then delivery of the content is switched from UC delivery to BC delivery. Then, the number of UEs in the area may drop to less than a second threshold T2, where delivery of the content is switched from BC delivery to UC delivery. The first threshold T1 may be greater than the second threshold T2.

Figure 15:
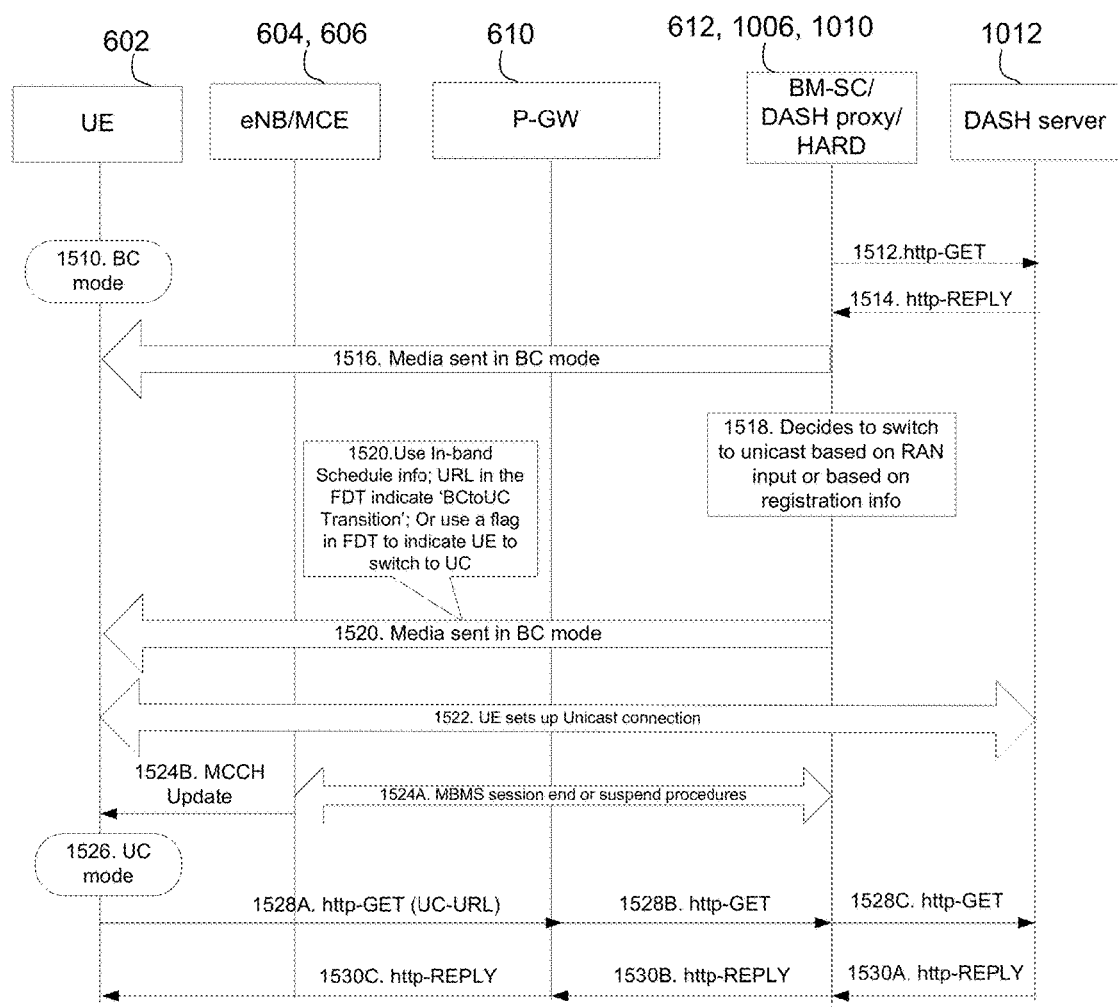
FIG. 15 is a sequence diagram illustrating activities by various components of the another wireless communications system implementing or supporting a demand-based multicast service, according to embodiments implementing seamless transition from broadcast to unicast service.

FIG. 15 is a sequence diagram illustrating activities by various components of another wireless communications system implementing or supporting a demand-based multicast service, according to embodiments implementing a seamless transition from broadcast to unicast. The function of the BM-SC 612/DASH-proxy 1006 may include deciding whether to switch to unicast delivery based on counting. The BM-SC 612/DASH-proxy 1006 may make an indication to the UEs via a FDT with a URL whose representation signals a BC to UC transition. The function of the UE 602 may include, upon receiving the indication in the FDT, (1) continuing to receive the content from the BC channel, or (2) initiating unicast channel establishment. At step 1520, the MPD may use a BaseURL@serviceLocation to indicate a BC-to-UC-transition. The DASH segments identified by the URLs containing a BC-to-UC transition indication are obtained through the broadcast channel. Both unicast and broadcast transmissions of the content may use the same MPD. During a broadcast to unicast delivery switch, the network may continue to deliver the requested content using eMBMS for a period of time to allow the UEs switch to the unicast reception. To establish the broadcast to unicast handoff, the network may need to determine (e.g., count) how many users are interested in a certain broadcast service in a particular area. The procedure may use RAN-based counting as defined in the standards, or the procedure may be based on registration information. When the RAN (e.g., the MCE) detects that the number of UEs interested in a MBMS service is below than a preconfigured threshold, the MCE may inform the BM-SC that the number of UEs interested in the service is below the threshold. Next, in a Make before Handoff procedure, the DASH-proxy 1006 may send in-band scheduling information to indicate a BC transmission end time. The DASH-proxy 1006 may start using the representation (e.g., an indication using FDT in FLUTE) that indicates 'broadcast to unicast transition', or the DASH-proxy 1006 may continue with the MBMS session but indicate to the UE via the FDT to transition to UC delivery, for example, by including a transition flag in the FDT. If in-band scheduling information is used for indicating a BC transmission end time, the DASH client may query for the DASH segments through unicast based on the MPD representation period after the broadcast transmission ends. When the UE 602 obtains the URL containing a 'broadcast to unicast transition' message or receives an indication (such as the transition flag) in the FDT, the UE 602 may initiate a procedure to setup the unicast channel. The BM-SC 612 may activate the HARD function upon making the decision to switch from BC to UC transmissions.

FIG. 16 shows a table 1600 illustrating a comparison between the methods illustrated in FIG. 10 (Option 1) and FIG. 13 (Option 2).

Figure 17:
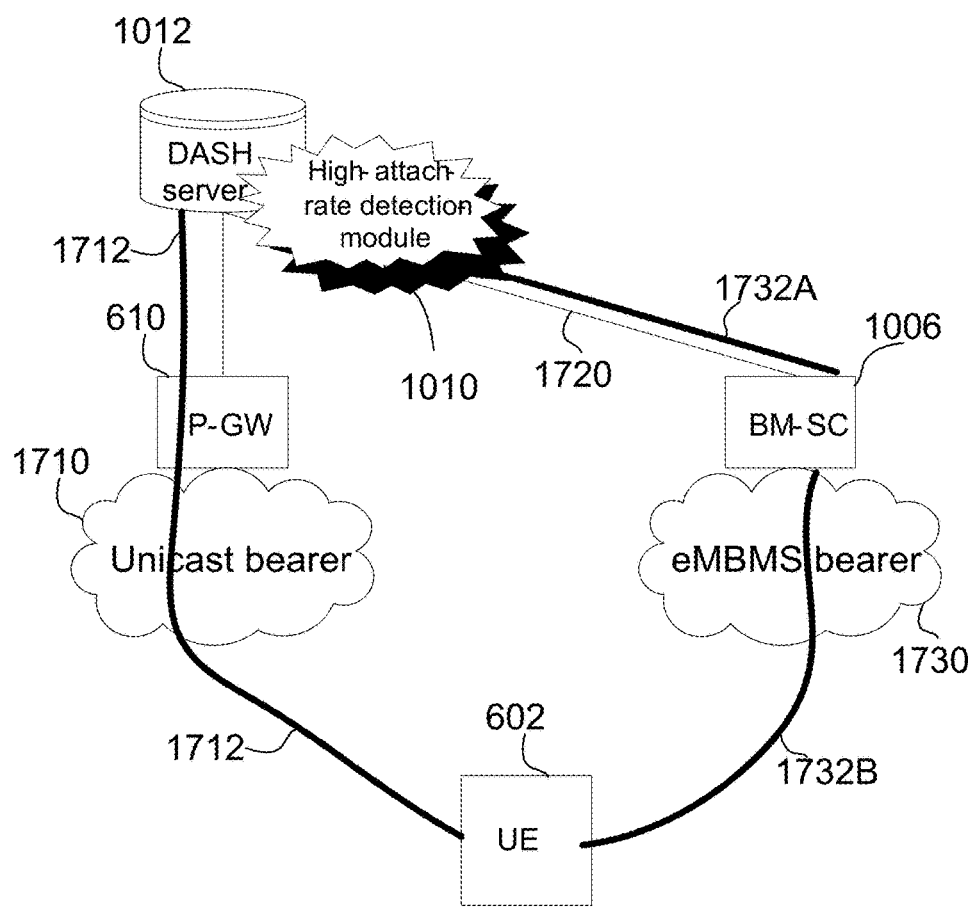
FIG. 17 is a block diagram illustrating components of another wireless communication system for providing or supporting seamless transition between MBMS and unicast service based on demand for a content.

FIG. 17 is a block diagram illustrating components of another wireless communication system for providing or supporting seamless transition between MBMS and unicast service based on demand for a content. The HARD module 1010 may be co-located with the content provider, for example, DASH server 1012. The UE 602 may download content from the DASH server 1012 using a unicast channel. For example, the UE may download content through the unicast bearer 1710 via the P-GW 610, as illustrated in path 1712. The HARD module 1010 at the DASH server 1012 may detect a high demand based on a high count of UEs accessing a same content ("high interest" content). Based on the detected demand, the HARD module 1010 may inform the DASH server 1012 or BM-SC 1006 to transition delivery of the content from unicast to broadcast transmission and initiate an eMBMS flow. The HARD module 1010 may inform the DASH server 1012 of the availability of the broadcast transmission upon turning on the eMBMS flow, e.g., as illustrated in path 1720. Content may be sent to the UE 602 from the Dash server 1012 via the BM-SC through path 1732. The BM-SC 1006 may act as a DASH client and obtain, via path 1732A, 1) the MPD from the DASH server 1012 for transmission to the UE 602, and 2) the content for all representations that are used for transmission of the content over the eMBMS. The BM-SC 1006 may send the MPD and the content to the UE 602, e.g., via the eMBMS bearer 1730, via path 1732B. The MPD may be sent using a service announcement, and the content may be sent using the representation chosen for the MBSFN.

Figure 18:
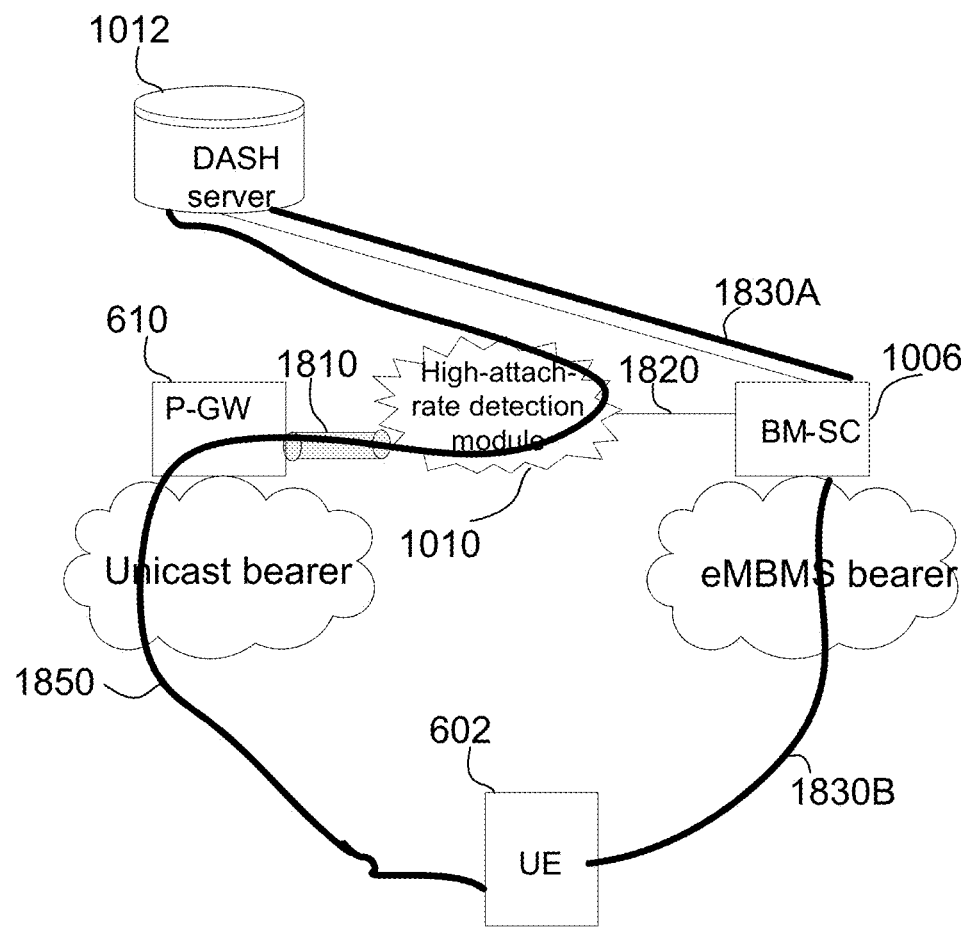
FIG. 18 is a block diagram illustrating components of yet another wireless communication system for providing or supporting seamless transition between MBMS and unicast service based on demand for a content.

FIG. 18 is a block diagram illustrating components of yet another wireless communication system for providing or supporting transition between MBMS and unicast content delivery based on demand for a content. In FIG. 18, the HARD module 1010 may be a separate module or a stand-alone module. The HARD module 1010 may be located at a different physical location than the, e.g., P-GW 610 or DASH server 1012. For example, the HARD can be co-located with an edge cache. A communication tunnel 1810 may connect the P-GW 610 and the HARD module 1010. Data packets may be sent between the P-GW 610 and HARD module 1010 via the tunnel 1810. The UE 602 downloads content from the DASH server 1012 using unicast transmission, e.g., via the path 1820. For example, the BM-SC may act as a proxy for the DASH server 1012 when transmitting content to the UE 602 via the P-GW 610, e.g., via path 1820 through the HARD module 1010 and path 1810. The HARD module 1010 may detect a high demand based on a high count of UEs accessing a same content ("high interest" content). Based on the detected demand, the HARD module 1010 may inform the BM-SC 1006 to transition to delivery of the content via broadcast transmission and initiate an eMBMS flow. The BM-SC 1006 may act as a DASH-proxy and obtain, e.g., via path 1830A, 1) the MPD from the DASH server 1012 for transmission to the UE 602, and 2) the content for all representations that are used for transmission over the eMBMS. The BM-SC 1006 may send the MPD and the content to the UE 602, e.g., via path 1830B. The MPD may be sent using a service announcement, and the content may be sent using the representation chosen for the MBSFN.

Figure 19:
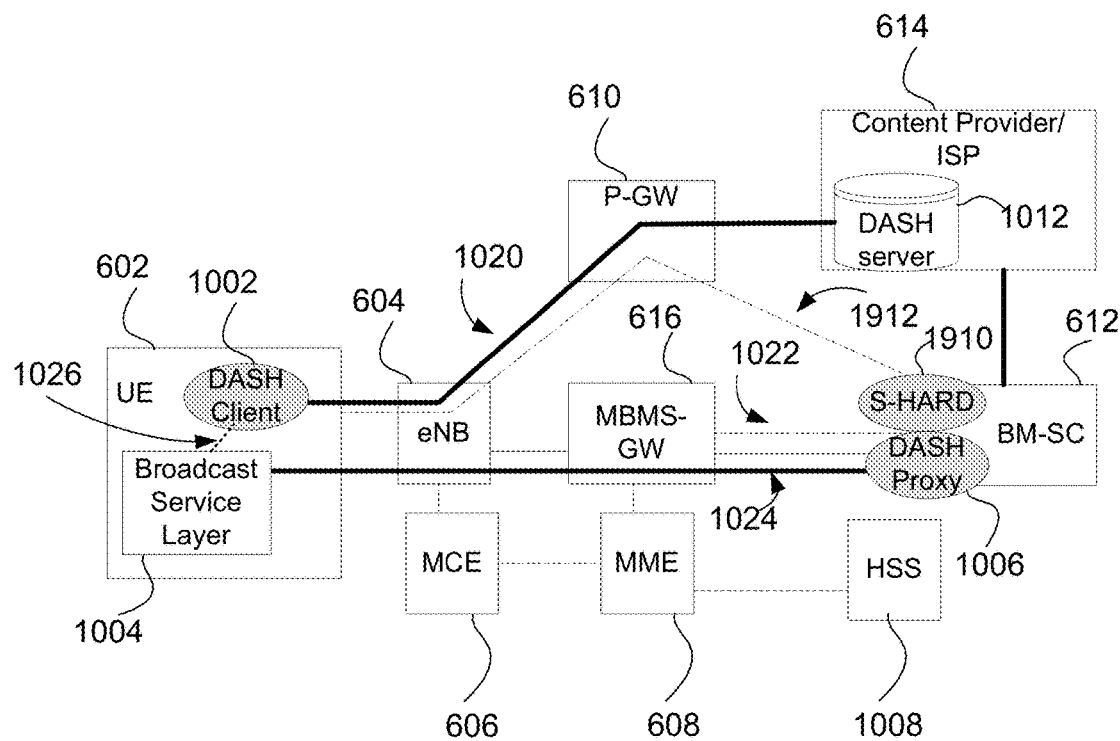
FIG. 19 is a another block diagram illustrating components of a wireless communication system for providing or supporting seamless transition between MBMS and unicast service based on a demand for a content.

FIG. 19 is a another block diagram illustrating components of a wireless communication system for providing or supporting seamless transition between MBMS and unicast service based on a demand for a content. In the embodiment of FIG. 19, a simplified HARD (S-HARD) module 1910 and DASH-proxy 1006 are co-located with the BM-SC 612. The S-HARD module 1910 is "simplified" as it may be located in a control plane rather than a user plane. In the user plane configuration (e.g., the embodiment illustrated in FIG. 10), the HARD module 1010 may be co-located with a network entity receiving requests for unicast content from UEs. The HARD module 1010, in the user plane configuration, may determine demand for a content by processing the received requests for the content. In the control plane configuration, the S-HARD module 1910 may not be co-located with a network entity receiving requests for unicast content from UEs. The S-HARD module 1910 may be co-located with a network entity outside of the transmission path for requests for unicast content from UEs. The UEs may include logic or programming to report reception of unicast services to the S-HARD module 1910. At the S-HARD module 1910, a count of the UEs accessing a same service from a same area may be determined to detect high interest so that the delivery of the content may be transitioned to transmission from UC to BC.

A seamless transition is a transition of delivery of content to a mobile device, such as UE 602, from UC to BC or BC to UC without or with minimal service interruption. The content provider/internet service provider (ISP) 614 may include a DASH server 1012. The system may include a unicast DASH path 1020 for transmission of the DASH segments from the content provider/(ISP) 614 to the DASH client 1002 in the UE 602 via the P-GW 610. Between the content provider/ISP 614 and BM-SC 612, either a unicast path or the multicast path can be used. The system may include a broadcast DASH path 1024 for transmission of the DASH segments from the DASH-proxy 1006 in the BM-SC 612 to the Broadcast service layer 1004 in the UE 602 via the MBMS-GW 616 and the eNB 604. The system may include a unicast DASH path (not shown). For example, the UE 602 may download content from the DASH server 1012 using unicast when the BM-SC 612 acts as a proxy for the DASH server. The BM-SC 612 may transmit data via the P-GW (connection not shown). A broadcast session management connection 1022 is shown as a dashed line between the BM-SC 612, MBMS-GW 616, MCE 606, MME 608, and eNB 604. A unicast session management connection 1912 is shown in dashed line between the UE 602 and BM-SC 612 through eNB 604 and P-GW 610. A broadcast service layer interface 1026 is shown between the broadcast service layer 1004 and DASH client 1002. The wireless communication system may include the S-HARD module 1910. The S-HARD module 1910 may be co-located with the BM-SC 612. For example, The S-HARD module 1910 may receive reports from UEs that receive services through the unicast channel. The S-HARD module 1910 may count the number of UEs accessing the same service or content via a unicast transmission from the same area to determine an aggregate demand. When the S-HARD module 1910 detects a high count of UEs accessing the same service/content ("high interest"), the S-HARD module 1910 may inform the DASH-proxy 1006. Thereafter, the DASH-proxy 1006 may interact with the BM-SC 612 to notify the UE 602 once a broadcast service is available or when the content is switched from unicast delivery to broadcast delivery.

The DASH-proxy 1006 may be co-located with the BM-SC 612, a content delivery network (CDN), or as a separate entity. Acting as the 'hub', the DASH-proxy 1006 serves only the broadcast data path. The DASH-proxy 1006 may inform the S-HARD module 1910 when the BC mode is started. The DASH-proxy 1006 may obtain a media presentation description (MPD) from the DASH server 1012 and send it to the UE 602 (either through a service announcement, service discovery, or unicast MPD download). The DASH-proxy 1006 may interact with the BM-SC 612 to send the demand-based service on eMBMS. The BM-SC 612 may signal the UE 602 to switch from reception of content via unicast delivery to reception of the content via broadcast delivery.

The DASH-proxy 1006 within the BM-SC 612 (or the BM-SC acting as a DASH-proxy 1006), and obtains content (from the DASH server 1012) for broadcast representations. The function of the DASH-proxy 1006 may include handling BC content upon a unicast to broadcast handoff trigger. The trigger may include receiving a message from the S-HARD module 1910 indicating a high rate attach event for the content. The function of the BM-SC 612 may include signaling the UE to switch from UC reception to BC reception of the content.

Figure 20:
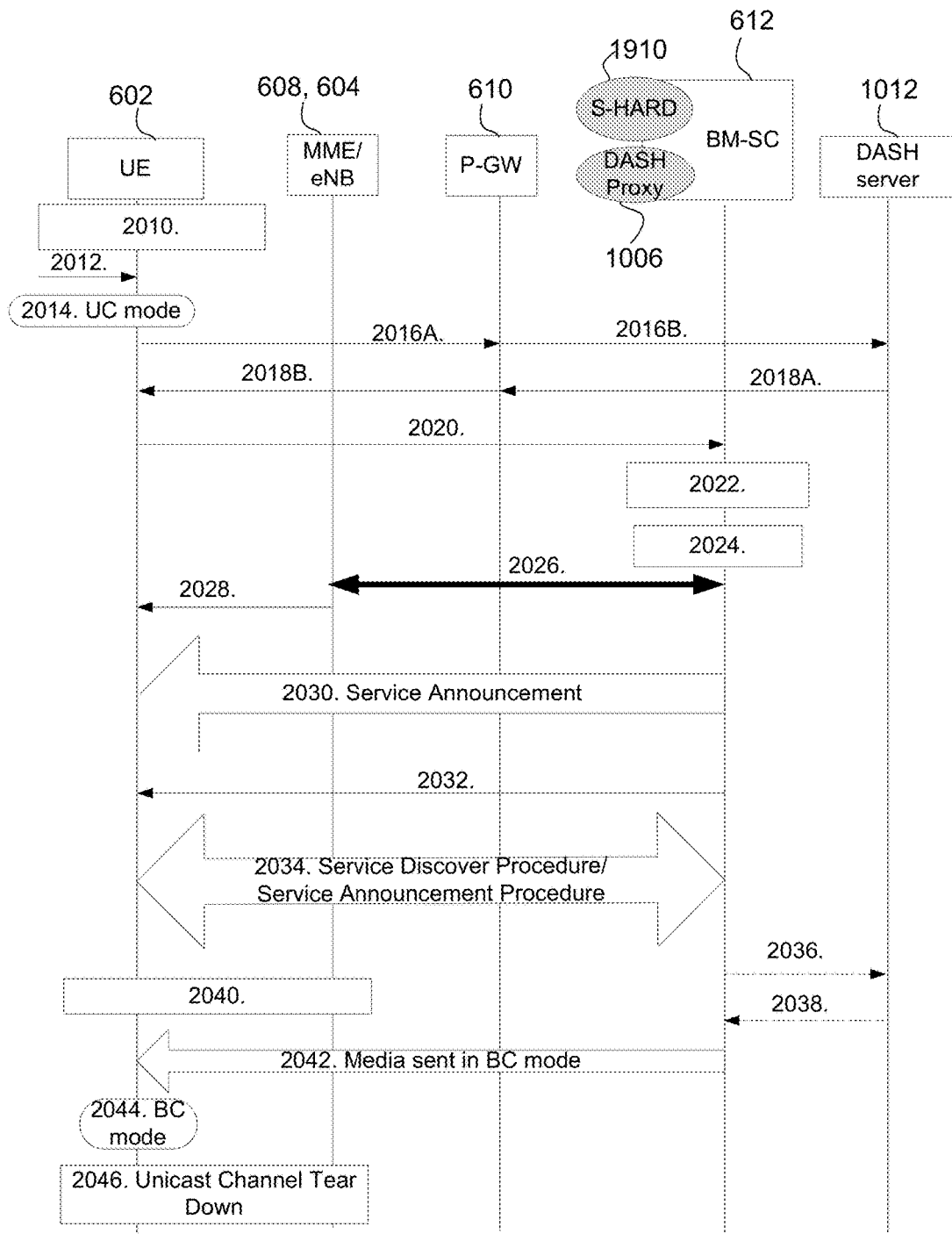
FIG. 20 is a sequence diagram illustrating activities by various components of a wireless communication system implementing or supporting a demand-based multicast service, in accordance with the embodiment of FIG. 19.

FIG. 20 is a sequence diagram illustrating activities by various components of a wireless communication system implementing or supporting a demand-based multicast service, in accordance with the embodiment of FIG. 19. The S-HARD module 1910 is located in the control plane, and the UE 602 may need to report received content to the S-HARD module 1910 at the BM-SC 612. To report received content, the UE 602 may need to obtain the BM-SC 612 location. The UE 602 may be pre-configured with the BM-SC 612 address (for example, IP address). The UE 602 may obtain the BM-SC 612 address through a unicast MPD, service discovery, service announcement, or MPD data included in USD. The UE 602 may send a report to the BM-SC 612 when the UE 602 starts to receive the content which is designated in the reporting list, when the UE changes location while receiving the content, or when the UE finishes or stops receiving the content. The report may include a URL of the content or MPD, a location of the UE (e.g., CGI/MBSFN AreaID), or start and stop indications.

At step 2010, the UE 602 may obtain a list of content to report and a network destination for the report. The network destination may include the BM-SC 612 location, such the BM-SC 612 server IP address. At step 2012, an application at the UE 602 requests content specified by a URL. The UE 602 requests the content via unicast mode, at step 2014. At step 2016A, the UE 602 requests the content by sending an http-GET including a unicast URL with UE location information such as, e.g., CGI information, to the P-GW 610. The CGI indicates the serving cell of the UE 602. Other position location information may be included. The http-GET is forwarded from the P-GW 610 to the DASH server 1012, at step 2016B. At steps 2018A-B, the DASH server 1012 responds to the request with an http-REPLY message sent via the P-GW 610 to the UE 602. At step 2020, the UE 602 may report the received service URL to the S-HARD module 1910 at the BM-SC 612. The report from the UE 602 may include location (for example, CGI, MBSFN Area ID, tracking area ID, etc.) information. The received service URL may be included in the list of content to report. At step 2022, the S-HARD module 1910 may count a number of UEs in a same area accessing some content and compare the count to a threshold to detect high demand for the content. At step 2024, the S-HARD module 1910 may inform the DASH-proxy 1006 when the number of users accessing a service from an area crosses a pre-defined threshold. The DASH-proxy 1006 may determine to set up an eMBMS session based on the information from the S-HARD module 1910. Threshold hysteresis may be configured at the S-HARD module 1910 to prevent ping-ponging between set up and tear down of the eMBMS session. The threshold values for the threshold hysteresis may be set based on a number of active users, number of cells, and/or a hysteresis range. For example, a first threshold T1 may be defined as 100, and a second threshold T2 defined as 70 for a hysteresis range (T1-T2) of 30. For example, the number of UEs in an area may exceed the first threshold T1, and then delivery of the content is switched from UC delivery to BC delivery. Then, the number of UEs in the area may drop to less than the second threshold T2, where delivery of the content is switched from BC delivery to UC delivery. The first threshold T1 may be greater than the second threshold T2. Steps 2026 through 2040 illustrate signaling between the network and mobile components to establish the eMBMS session and broadcast the content. At step 2026, based on the received number of users crossing the pre-defined threshold, the DASH-proxy 1006 may decide to establish an eMBMS session. The eMBMS session setup is performed between the MME/eNB 608, 604 and the BM-SC/DASH-proxy 612, 1006. After the eMBMS session setup is performed, the MME/eNB 608, 604 sends an MCCH update to the UE 602 at step 2028. At step 2030, a service announcement message is broadcast to the UE 602. At step 2032, the DASH-proxy 1006 sends a redirection message to signal the UE 602 to switch from UC to BC. The redirection message may optionally include an MBMS service key (MSK) to speed up transition from UC to BC. At step 2034, the UE 602 may initiate a service discovery procedure or service announcement procedure to obtain the broadcast MPD. Optionally in a 'pull' configuration, at step 2036, the BM-SC 612 may send an http-GET message to the DASH server 1012 for the broadcast content to pull content from the DASH server 1012. At step 2038, the DASH server 1012 sends an http-REPLY to the BM-SC 612. If the optional step 2036 is not performed, the DASH server 1012 may send the broadcast content in a 'push' configuration without an initial request from the BM-SC 612. At step 2040, the UE 602 may indicate to the eNB 604 the frequency on which the UE 602 desires to receive the broadcast transmissions. At step 2042, the content is sent in BC mode, and the UE 602 receives the content via broadcast transmissions. At step 2046, the unicast channel between the UE 602 and MME/eNB 608, 604 is torn down.

Figure 21:
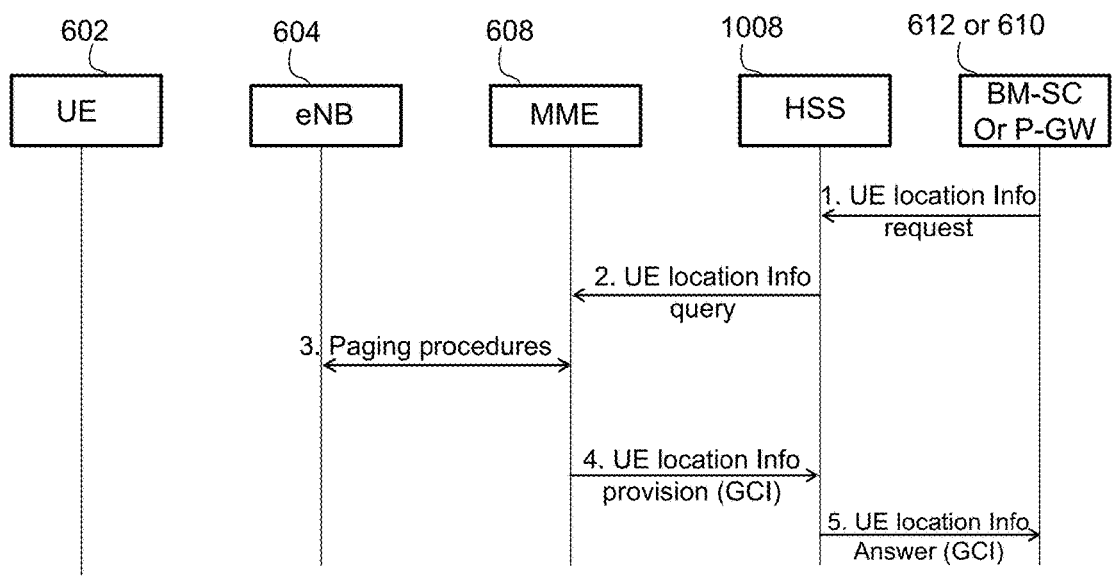
FIG. 21 is a sequence diagram illustrating activities by various components of a wireless communication system providing or supporting Network Provided Location Information (NetLoc) location determination.

FIG. 21 is a sequence diagram illustrating activities by various components of a wireless communication system providing or supporting NetLoc location determination.

Figure 22:
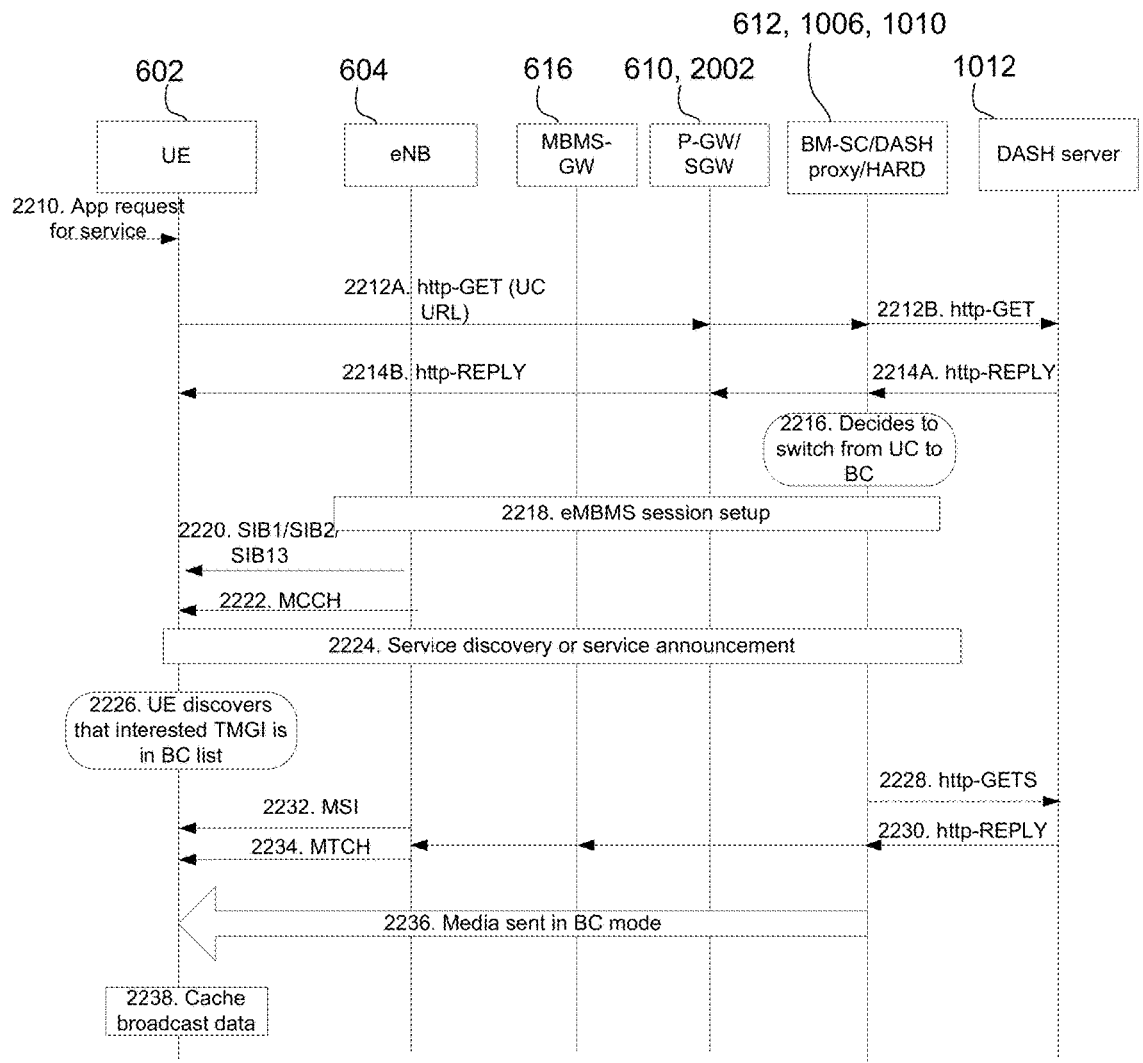
FIG. 22 is a sequence diagram illustrating activities by various components of a wireless communications system for a UE-based solution on switching from unicast to broadcast when the unicast and broadcast are on the same frequency.

FIG. 22 is a sequence diagram illustrating activities by various components of a wireless communications system for a UE-based solution (which may also be referred to herein as a UE autonomous switch) for switching from unicast reception of content to broadcast reception of the content when the unicast transmission and broadcast transmission are on the same frequency. Assuming the network uses implementation dependent solutions or uses the solutions specified above to detect high attach rate without sending redirection signaling to the UE to switch from the UC to BC, the following apply. Upon detection of a high attach rate event, the network decides to enable BC transmission. Then, the network sets up an eMBMS session and updates the system information blocks SIB2/SIB13 and the multicast control channel (MCCH). The network updates USD (USD is sent either on the broadcast channel or the unicast channel based on a UE request on the unicast session). The following may be used to trigger the UE 602 to perform SIB (e.g., SIB2/SIB13) and MCCH monitoring, and to perform service discovery (via unicast) and service announcement (via broadcast) procedures. First, the UE 602 may periodically perform the monitoring and service discovery procedures. For example, the UE 602 may be triggered to perform the monitoring and service discovery procedures based on a predetermined schedule or time windows. Second, the UE 602 may perform the monitoring and service discovery procedures based on detecting signal degradation of unicast transmissions (for example, due to network congestion). Third, the UE 602 may receive notifications from the network through application signaling, such as SMS, OMA PUSH, USD, etc. to trigger the UE to perform the monitoring and service discovery procedures. Fourth, the UE may receive an indication of a unicast release or access barring of the UE from the RAN to trigger to UE to monitor and perform the service procedures. Upon the UE acquiring the USD via service announcement and discovery procedures at step 2224, the UE determines that the TMGI(s) of interest are sent over broadcast channel. The UE then acquires the MCH Scheduling Information (MSI) and receives MTCH which broadcasts the content of the corresponding TMGI. After the UE switches to BC mode, the unicast channel is torn down, or the eNB may tear down the unicast channel based on detection of no data activities over the unicast channel for a configurable time period.

Figure 23:
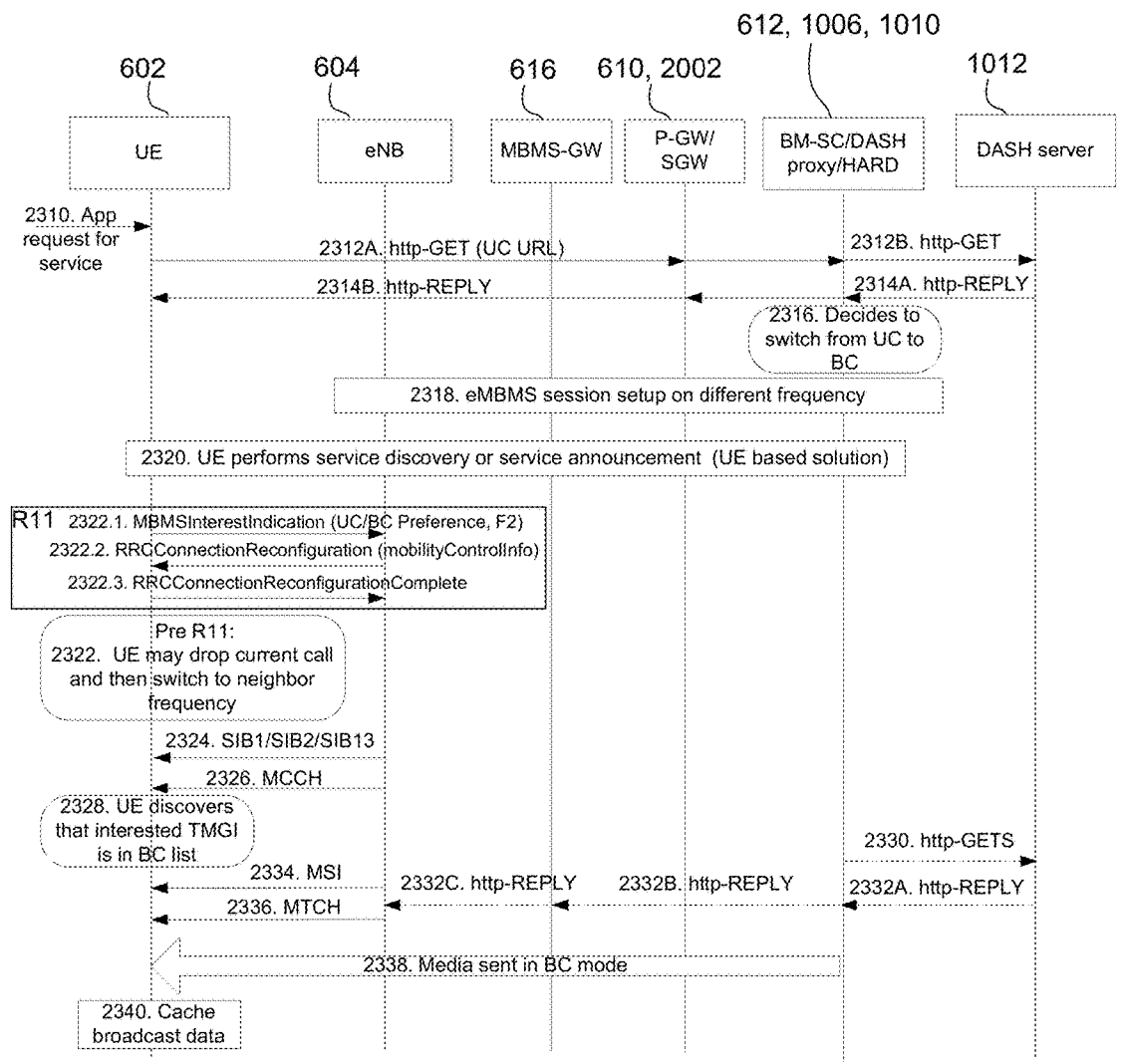
FIG. 23 is a sequence diagram illustrating activities by various components of a wireless communications system for a UE-based solution on switching from unicast to broadcast when the unicast and broadcast are on different frequencies.

FIG. 23 is a sequence diagram illustrating activities by various components of a wireless communications system for a UE-based solution for switching from unicast reception of content to broadcast reception when the unicast transmission of the content and broadcast transmission of the content are on different frequencies. If the UE determines that the broadcast service is sent on another frequency from the USD received from the BM-SC and from the SIB 15 received from the eNB, the UE sends an MBMSInterestIndication to the eNB in step 5. The eNB then sends an RRC Connection Reconfiguration to the UE including mobility control information to handoff the UE to another frequency (for example F2). The UE then sends an RRC connectionReconfiguration to the eNB. If the UE cannot send MBMSInterestIndication to the eNB, for example, the eNB is a pre-R11 eNB, the UE may drop the current UC connection and then tune to the neighbor frequency (e.g., the new frequency). After handoff to the new frequency, the UE may need to acquire SIB, MCCH, and MTCH for receiving the content on the MBMS channel. After the UE enters BC reception mode, the unicast channel is torn down, or the eNB may tear down the unicast channel based on detection of no data activities over the unicast channel for a configurable time period.

Figure 24:
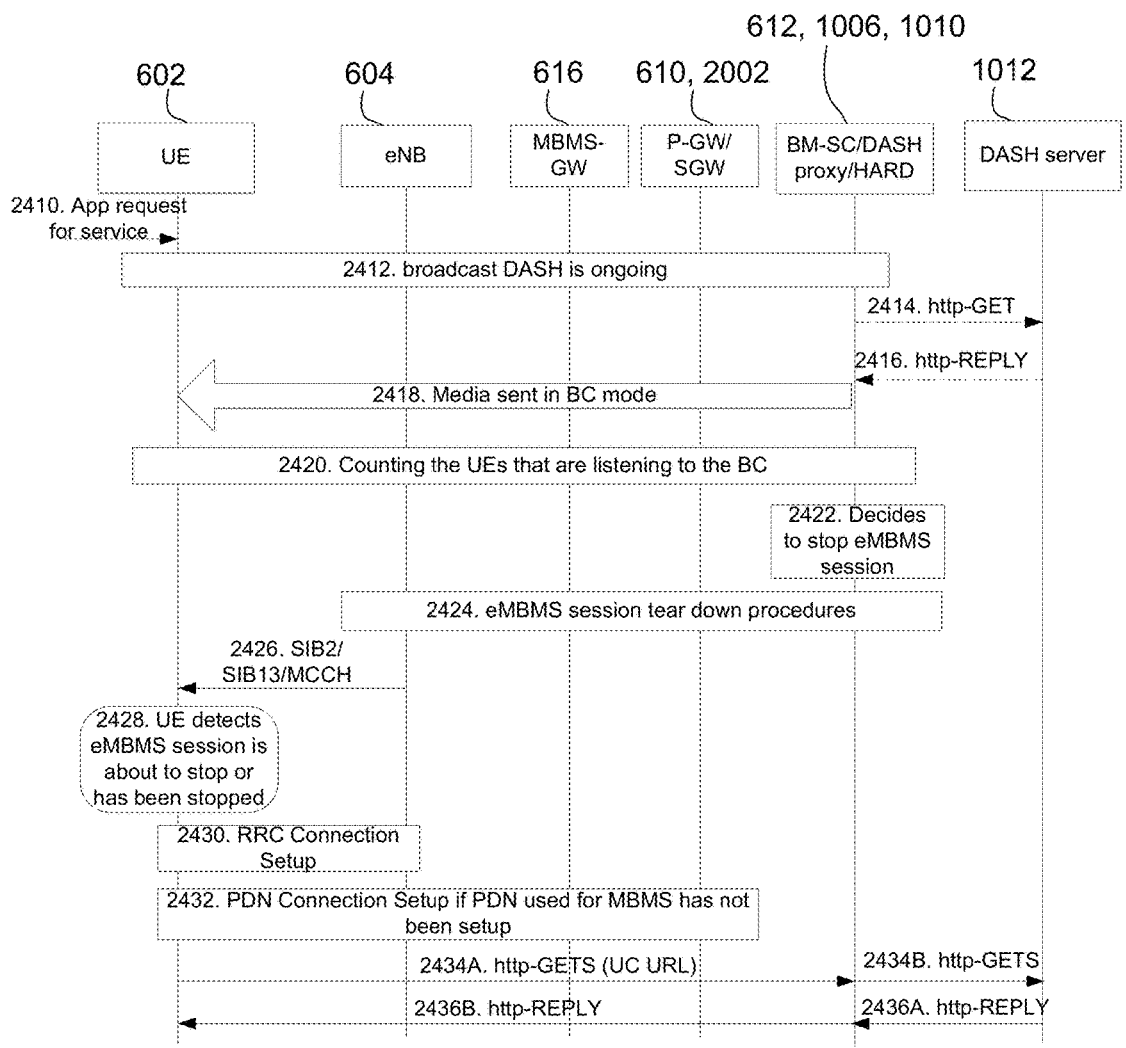
FIG. 24 is a sequence diagram illustrating activities by various components of a wireless communications system for a UE-based solution on switching from broadcast to unicast.

FIG. 24 is a sequence diagram illustrating activities by various components of a wireless communications system for a UE-based solution for switching from broadcast reception of the content to unicast reception of the content. A UE may buffer or cache sufficient content prior to switching from one reception mode to another so that no service interruption is perceived by the user of the UE. For example, the UE may be receiving content from a multicast session before receiving the content from the multicast session is halted. The UE may further determine that 50 milliseconds are required to transition from the multicast session the unicast session, and that the UE may not be able to receive content from the network during the transition. In this case, the UE may buffer 50 milliseconds of content before performing the transition to the unicast session. During the transition, the UE may present the content from the buffer to the user so that the user does not perceive an interruption in the delivery of the content.

Figure 25:
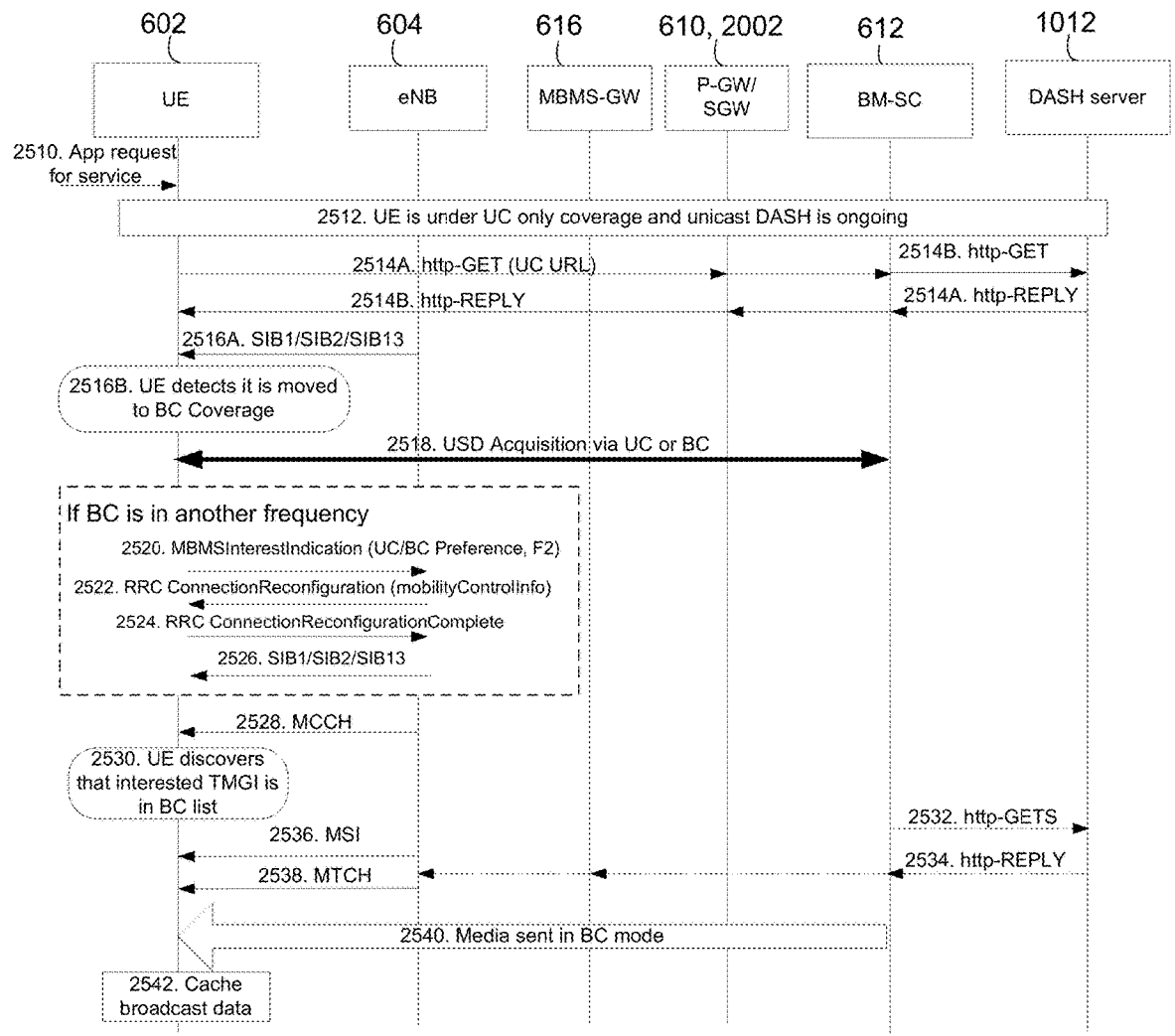
FIG. 25 illustrates switching from UC to BC (as an example, Dynamic Adaptive Streaming over HTTP (DASH) may be used).
Figure 26:
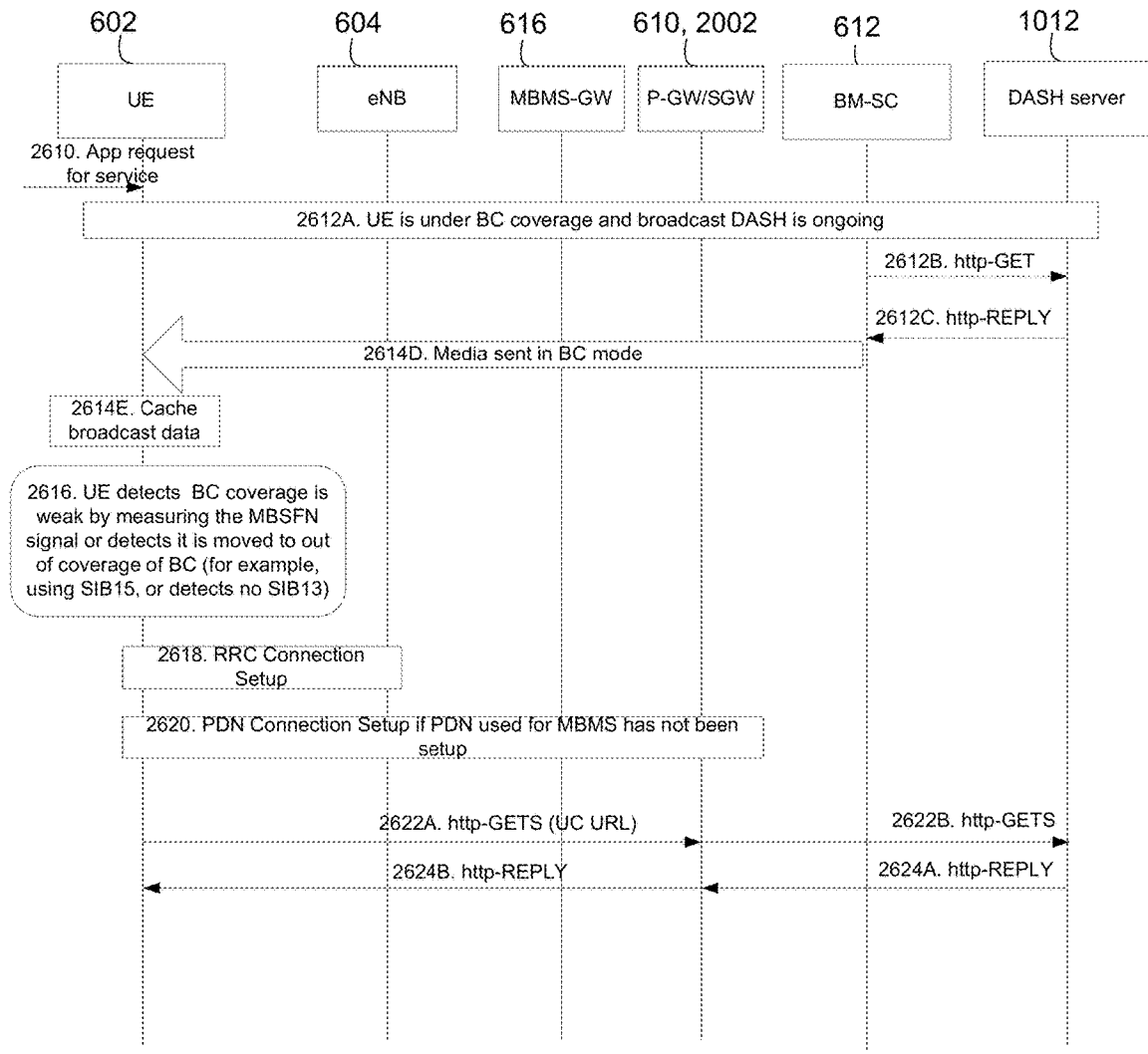
FIG. 26 illustrates switching from BC to UC.

A UE-based approach for switching between UC to BC reception mode may also be used when the UE moves between UC only coverage and BC coverage due to the UE's mobility. FIGS. 25 and 26 illustrate UC to BC and BC to UC switching call flows due to UE mobility.

FIG. 25 illustrates a call flow for switching from UC to BC reception mode (as an example, DASH may be used for delivery of content via either or both UC and BC).

A description of each step may be as follows:

2512. The application requests a content. The UE 602 discovers it is within a UC only coverage area for content delivery. The UE 602 may send an HTTP-GET message to the network. This step may use unicast DASH procedures as specified in 3GPP TS 26.247.

2516A-B. The UE 602 may detect a new cell with BC delivery of the content, e.g., by receiving SIB messages from the new cell.

2518. The UE 602 may acquire a USD either via a unicast channel or a broadcast channel.

2520. If the UE 602 determines that the broadcast service is sent on another frequency from the USD received from the BM-SC 612 and from the SIB 15 received from the eNB 604, the UE 602 may send an MBMSInterestIndication to the eNB 604.

2522. The eNB 640 may send an RRC Connection Reconfiguration to the UE 602 including mobility control information to handoff the UE to another frequency.

2524. The UE 602 may send an RRC connectionReconfiguration message to the eNB 604.

2526. The UE 602 may acquire the SIB 13 including the MCCH radio configuration.

2528. The UE 602 may acquire an MBSFNAreaConfiguration message from the MCCH to obtain TMGI information.

2530. The UE 602 may determine that the TMGI of interest is sent over a broadcast channel.

2536. The UE 602 may acquire the MCH Scheduling Information (MSI).

2538. On the scheduled MBSFN subframes as indicated by MSI, the UE 602 may receive the MTCH which broadcasts the content of the corresponding TMGI.

2540. The UE 602 may continue to receive the content from MBMS.

FIG. 26 illustrates a call flow for switching from BC to UC reception mode.

A description of each step may be as follows:

2612A-E. The application requests a content. The UE 602 may determine that it is within a MBMS coverage area. The UE 602 receives content via MBMS.

2616. The UE 602 may detect that the MBMS coverage is weak or that the UE 602 has moved out of MBMS coverage (e.g., by moving into coverage of a new cell). This may be done through one or more of the following methods:

by measuring MBSFN signal (e.g., MBSFN RSRP and RSRQ);
using information received in a SIB15; or
determining there is no SIB13 sent from the new cell.

2618. The UE 602 may establish a RRC connection with the eNB 604 (or cell).

2620. The UE 602 may establish a PDN connection if needed.

2622A-B. The UE 602 may send an HTTP-GET message to the network. This step may use unicast DASH procedures as specified in 3GPP TS 26.247.

2624A-B. The DASH server 1012 may send an HTTP-REPLY to the UE 602 through the P-GW 610. This step may use unicast DASH procedures as specified in 3GPP TS 26.247.

If DASH is used for both UC delivery of a content and BC delivery of the content, a unified MPD may be used. The unified MPD may list all URLs used for unicast and broadcast transmission. If a RTP is used for both UC delivery of content and BC delivery of content, the USD may list all URLs used for unicast and broadcast transmission of the content. The UE 602 uses the information received from a MPD, and/or a USD, and/or a SIB to obtain the knowledge that the same content is available via UC and BC reception modes so that the UE 602 can switch between UC and BC reception.

It may also be the case that broadcast and unicast URLs for a content are not the same. (The URL may be referencing either DASH MPD or an RTP stream). In such cases, a device may be able to predict a corresponding related unicast or broadcast URL via a known set of construction rules. For example, the construction rules may be rules processed at a mobile device. For example, the mobile device may determine the corresponding related unicast or broadcast URL based on a structural similarity between the unicast or broadcast URL and the corresponding related broadcast or unicast URL, respectively. For example, the corresponding URLs may differ in a portion of the URL string such as, e.g., a prefix, suffix, etc. It is further possible that there are multiple possibly valid URLs within the given rules. The device may autonomously detect the presence of a syntactically valid broadcast URL in the then current USD and elect to switch service to broadcast. Similarly, a device detecting loss or impending loss of broadcast service may request predicted unicast URLs, assuming that such behavior is allowed. This behavior is not in lieu of requesting the currently defined unicast URL included in the currently valid USD, of a potentially or apparently failing MBSFN signal, but in addition to the nominally expected behavior. For example, the device may perform the detection based on mobility of the device. For example, the device may be moving to another area (e.g., another cell) and switch receiving content between unicast and broadcast. The device may autonomously switch receiving content between unicast and broadcast in conjunction with or in response to cell reselection or handover. The device may have a predefined precedence (e.g., a priority ranking) with respect to order of unicast URLs to attempt, for example the currently defined unicast URL has highest priority. It is possible that the network may have policies with respect to such behavior that the device must adhere to. (These policies may be dependent on the capabilities of the device for example a broadcast capable device may take unicast, when broadcast is unavailable.) The device may autonomously elect to switch to unicast, when such behavior is allowed and service conditions (QoS) dictate such a change or loss of service.

Figure 27:
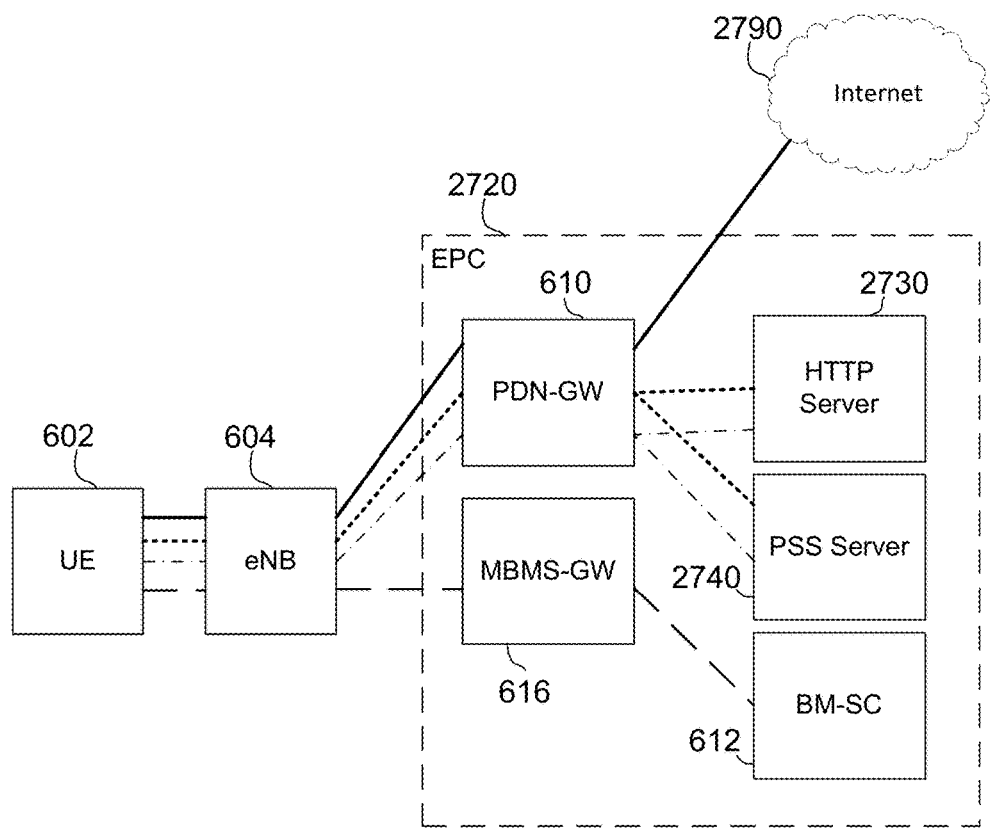
FIG. 27 illustrates various methods for content delivery.

FIG. 27 illustrates a high-level MBMS and PSS architecture with various modes of content delivery. Content delivery to a UE 602 may originate at various sources. For example, the content may originate from the Internet 2790, an HTTP Server 2730, a packet switched streaming service (PSS) server 2740, and a BM-SC 612. The content may be delivered to the UE 602 via a PDN-GW 610, MBMS-GW 616, and/or the eNB 604. In one example, over-the-top (OTT) over UC content delivery may originate from the Internet 2790 and may be delivered via the PDN-GW 610 and eNB 604 for delivery to the UE 602. In another example, PSS over UC may originate from the PSS server 2740 or HTTP server 2730 and may be delivered via the PDN-GW 610, or optionally originate from the content provider via the HTTP server 2730 or PSS server 2740, and the eNB 604 for delivery to the UE 602. In another example, MBMS over UC may originate from the PSS server 2740 or HTTP server 2730 and may be delivered via the PDN-GW 610, or optionally originate from the content provider via the HTTP server 2730 or PSS server 2740, and the eNB 604 for delivery to the UE 602. The MBMS over UC may be controlled by the BM-SC. In another example, MBMS over BC may originate from the BM-SC 612 and may be delivered via the MBMS-GW 616 and eNB 604 for delivery to the UE 602.

A network operator may identify services that may be delivered via either BC or UC or both. The policy which can be preconfigured in a network entity (for example, PDN-GW, or HARD) or sent from another network entity (for example, a policy charging and rules function (PCRF), or BM-SC) may allow some content to be switched between UC and BC based on service URL(s) or other service identities. For example, only MBMS over UC can be allowed to switch between UC and BC; or operator controlled PSS or HTTP service over UC is also allowed to switch UC and BC; or non-operator controlled PSS or HTTP service over UC is also allowed to switch between UC and BC; or all services including OTT over UC are allowed to switch between UC and BC. Additionally or alternatively, the server providing the content (e.g., the HTTP server, PSS server, BM-SC) may provide an indication to the network entity that the content may be delivered via UC, BC, or both. Delivery of the content may be switch between any of the content delivery methods. For example, the content may be switched from delivered via UC transmission and BC transmission. For example, content delivered via the UC transmission methods including over-the-top over UC, MBMS service over UC, and PSS over UC may be switched to BC transmission methods including the MBMS service over BC. For example, content delivered via the BC transmission methods including MBMS service over BC may be switched to BC transmission methods including over-the-top over UC, MBMS service over UC, and PSS over UC.

Figure 28:
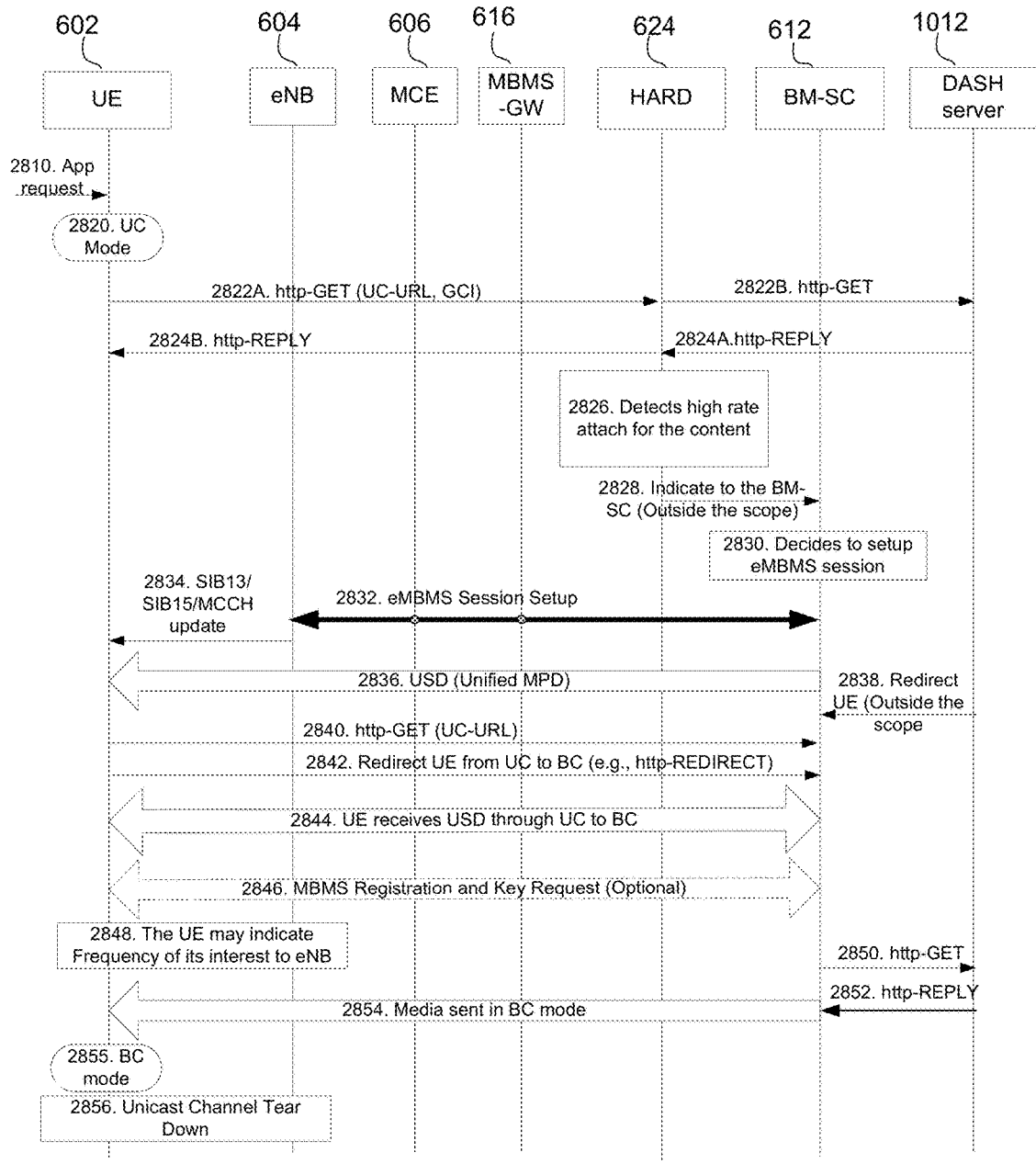
FIG. 28 is a sequence diagram illustrating activities by various components of a wireless communications system for switching from UC to BC mode.

FIG. 28 is a sequence diagram illustrating activities by various components of a wireless communications system for switching from content delivery via UC mode to content delivery via BC mode. This figure shows switching from non-MBMS services over UC (for example, OTT service over UC, PSS or HTTP service over UC) to MBMS over BC, using DASH as an example. In order to switch from a UC delivery mode to a LTE BC delivery mode, there may be a need to have the HARD 624 function in the core network or in the content server. The HARD 624 function may be collocated with the P-GW, the TDF, or with other network entities. When the HARD 624 function detects that demand for a content has a high attach rate (e.g., number of the UEs that are receiving a content from the same area exceeds a configurable threshold based on a network operator policy), the HARD 624 function may send an indication to the BM-SC 612 to turn on eMBMS transmission, and switch content delivery from a unicast mode of delivery to an eMBMS mode of content delivery.

Similarly, in order to switch from a LTE BC mode of content delivery to a UC mode of content delivery, there may be a need to have a LTE broadcast counting mechanism in the radio network. For example, the current counting mechanism specified in 3GPP TS 36.331 or some enhanced counting mechanism may be used. When the radio network detects demand for the content has a low attach rate (e.g., number of UEs that are receiving a content from the same area drops below a configurable threshold based on the network operator policy), the radio network indicates the counting result to the BM-SC 612 which may decide whether or not to turn off the eMBMS mode of content delivery. If eMBMS transmission of the content is disabled, the UE 602 may continue receiving the content through a UC delivery mode.

The manner in which the HARD 624 function detects a high attach rate may be implementation dependent. Therefore, in the various call flows, the Core Network entity may be shown without being further distinguished among the P-GW, the HARD 624 function, and the BM-SC 612.

Returning to FIG. 28, illustrated is one aspect for switching from non-eMBMS UC content delivery to BC content delivery (DASH may be used for both UC and BC content delivery). At step 2810, the application sends a request for a content. At step 2822A-B, the UE 602 discovers that the content requested by the application is not available through LTE broadcast (eMBMS?). The UE 602 may send an HTTP-GET message to the network. The HTTP-GET message may include the UE's 602 location information including, for example, a CGI. The core network (P-GW, which is not shown in the call flow) may forward the HTTP-GET message to the DASH server. The HARD 624 function may be located in the path of the user traffic. Steps 2820-2824 may use unicast DASH procedures as specified in 3GPP TS 26.247.

At steps 2824A-B, the DASH server 1012 may send an HTTP-REPLY message to the UE 602 through the P-GW. This step may use unicast DASH procedures as specified in 3GPP TS 26.247. At step 2826, the HARD 624 function may detect that the content has a high attach rate, e.g., the number of the UEs receiving the content from the same area exceeds a configurable threshold based on network operator policy. The HARD 624 function may use the location information received from the UE 602 or use NetLoc as specified in 3GPP TR 23.842. In step 2828, the HARD 624 function may indicate to the BM-SC 612 that the content has a high attach rate. In step 2830, the BM-SC 612 may decide to enable eMBMS transmission. At step 2832, the core network may set up an eMBMS session as specified in 3GPP TS 23.246. At step 2834, the eNB 604 may apply a radio resource configuration and send updated SIB13 and SIB15 information if needed. The eNB 604 may also perform MCCH change notifications to inform UEs of the presence of the eMBMS service. At step 2836, the BM-SC 612 may send an updated USD that includes a unified MPD if needed. A unified MPD may include parameters for all eMBMS services. At step 2838, the BM-SC 612 may inform the P-GW/HARD to redirect the UE 602 from UC to BC reception mode. At step 2840, the UE 602 may continue to use unicast DASH procedures by sending an HTTP-GET message. At step 2842, once the MBMS session has been established, the core network may send an HTTP-REDIRECT message to redirect the UE 602 to switch from UC to BC reception mode. At step 2844, upon receiving redirection from the network, the UE 602 may initiate service discovery procedures to receive the USD through a broadcast channel if available or through a unicast channel if the USD is not available via the broadcast channel. At step 2846, if the UE 602 has not registered with the MBMS service and the USD indicates that registration is required, the UE may perform MBMS service registration and obtain a service key if service protection is enabled. At step 2848, based on the information received from the SIB15 message received over the air and the USD received from the BM-SC 612, if the corresponding MBMS service is transmitted on a different frequency, the UE 602 may send an MBMSInterestMessage to indicate the frequency of interest. At step 2850, the core network continues to send the HTTP-GET message to the DASH server. At step 2852, the DASH server may reply with an HTTP-REPLY message. At step 2854, the BM-SC 612 sends the content via DASH over MBMS. At step 2856, the UE 602 may receive DASH segments over the corresponding MBMS channel and enter a BC mode of reception. When the DASH client continues to request DASH segments, the MBMS client may indicate to the DASH Client that the MPD should be updated. Furthermore, the DASH client may be redirected to, and eventually acquire the content Segments from, the local server associated with MBMS reception.

Figure 29:
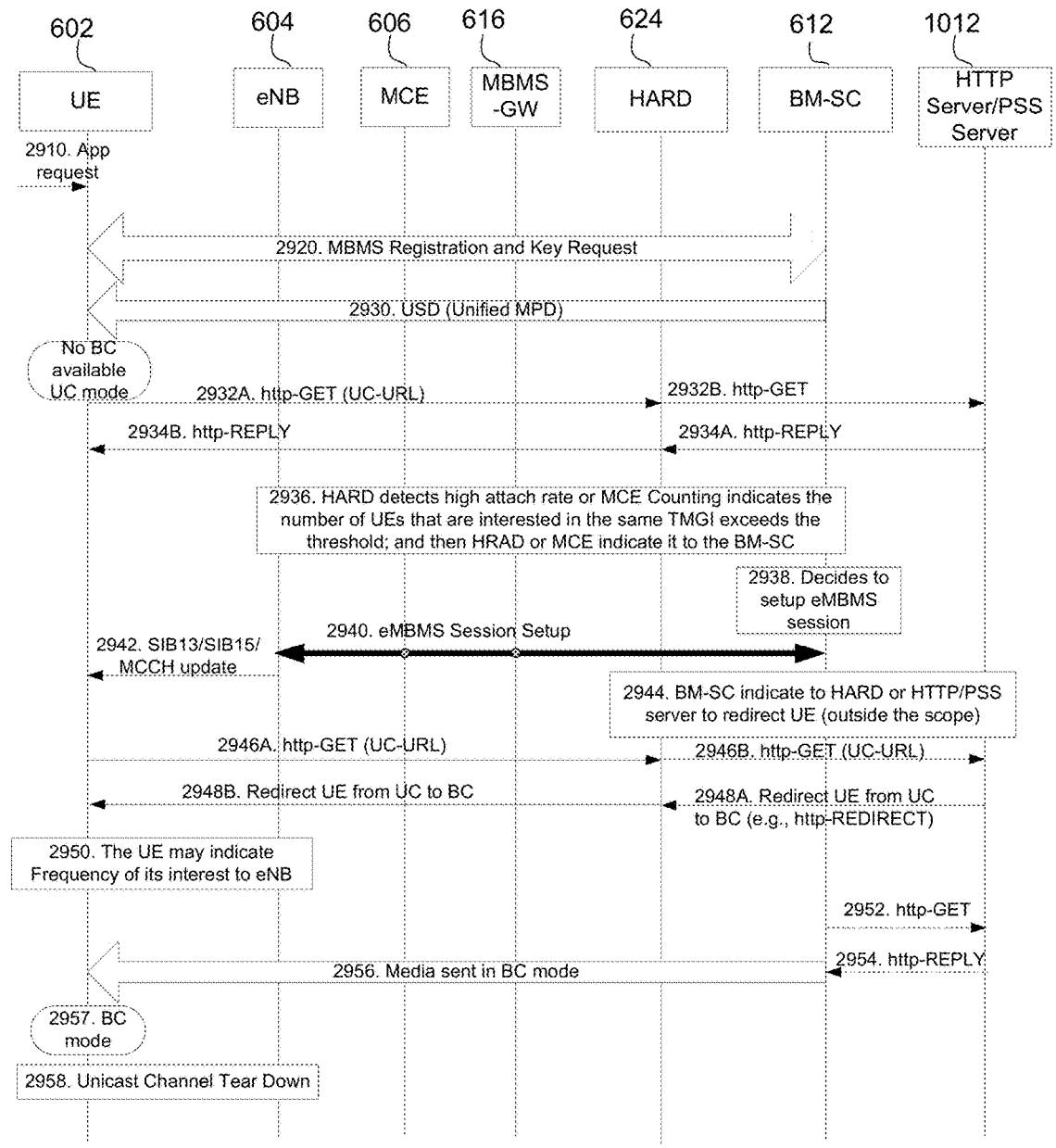
FIG. 29 is a sequence diagram illustrating activities by various components of a wireless communications system for switching from BC to UC mode.

FIG. 29 illustrates an aspect for switching from content delivery via MBMS over UC to content delivery via MBMS over BC, using DASH as an example.

A description of each step may be as follows:

2910. The application sends a request for a content.

2920. Since the service is a MBMS service, the UE 602 performs MBMS service registration and obtains a service key if service protection is enabled.

2930. The UE 602 may acquire the USD with a unified MPD included via either a unicast channel or a broadcast channel.

2932A-B. The UE 602 may discover that the content requested by the application is not available through LTE broadcast (e.g., eMBMS). The UE 602 may send an HTTP-GET message to the network. The HTTP-GET message may include the UE's 602 location information including, for example, a CGI. The core network (P-GW, which is not shown in the call flow) may forward the HTTP-GET message to the DASH server. The HARD 624 function may be in the path of user traffic. This step may use unicast DASH procedures as specified in 3GPP TS 26.247.

2934A-B. The DASH may server send an HTTP-REPLY message back to the UE 602 through the P-GW. This step may use unicast DASH procedures as specified in 3GPP TS 26.247.

2936. The HARD 624 function may detect that the content has a high attach rate, e.g., the number of the UEs that are receiving the content from the same area exceeds a configurable threshold based on network operator policy. The HARD 624 function may use the location information received from the UE 602 or may use NetLoc as specified in 3GPP TR 23.842. The HARD 624 function may then send an indication to the BM-SC that the content has a high attach rate. Alternatively, a MBMS counting mechanism specified in 3GPP TS 36.300 may be used. For example, when the MCE 606 detects a number of UEs that are interested in a TMGI exceeds a preconfigured threshold, the MCE 606 sends an indication to the BM-SC 612.

2938. The BM-SC 612 may decide to enable eMBMS transmission.

2940. The core network may set up an eMBMS session as specified in 3GPP TS 23.246.

2942. The eNB 604 may apply radio resource configuration and send updated SIB13 and SIB15 if needed. The eNB 604 may also perform MCCH change notifications to inform UEs of the presence of eMBMS service.

2944. The BM-SC 612 may send an indication to the P-GW/HARD or HTTP server/PSS server to redirect the UE 602 from UC to BC reception mode.

2946A-B. The UE 602 may continue to perform unicast DASH procedures by sending an HTTP-GET message.

2948A-B. Once the MBMS session has been established, the core network may send an HTTP-REDIRECT message to redirect the UE 602 from UC to BC reception mode.

2950. Based on the information received from SIB 15 over the air and USD from BM-SC 612, if the corresponding MBMS service is transmitted on a different frequency, the UE 602 may send an MBMSInterestMessage to indicate the frequency of interest.

2952. The core network may continue to send an HTTP-GET message to the DASH server.

2954. The DASH server may reply with an HTTP-REPLY message.

2956. The BM-SC 612 may send the content via DASH over MBMS.

2958. The UE 602 may receive DASH segments over an MBMS channel and enter a BC reception mode. The DASH client may continue to send requests for DASH segments. If so, the MBMS client may send an indication to the DASH Client that the MPD should be updated. Furthermore, the DASH client may be redirected to, and eventually acquire the Segments from, the local server associated with MBMS reception.

Figure 30:
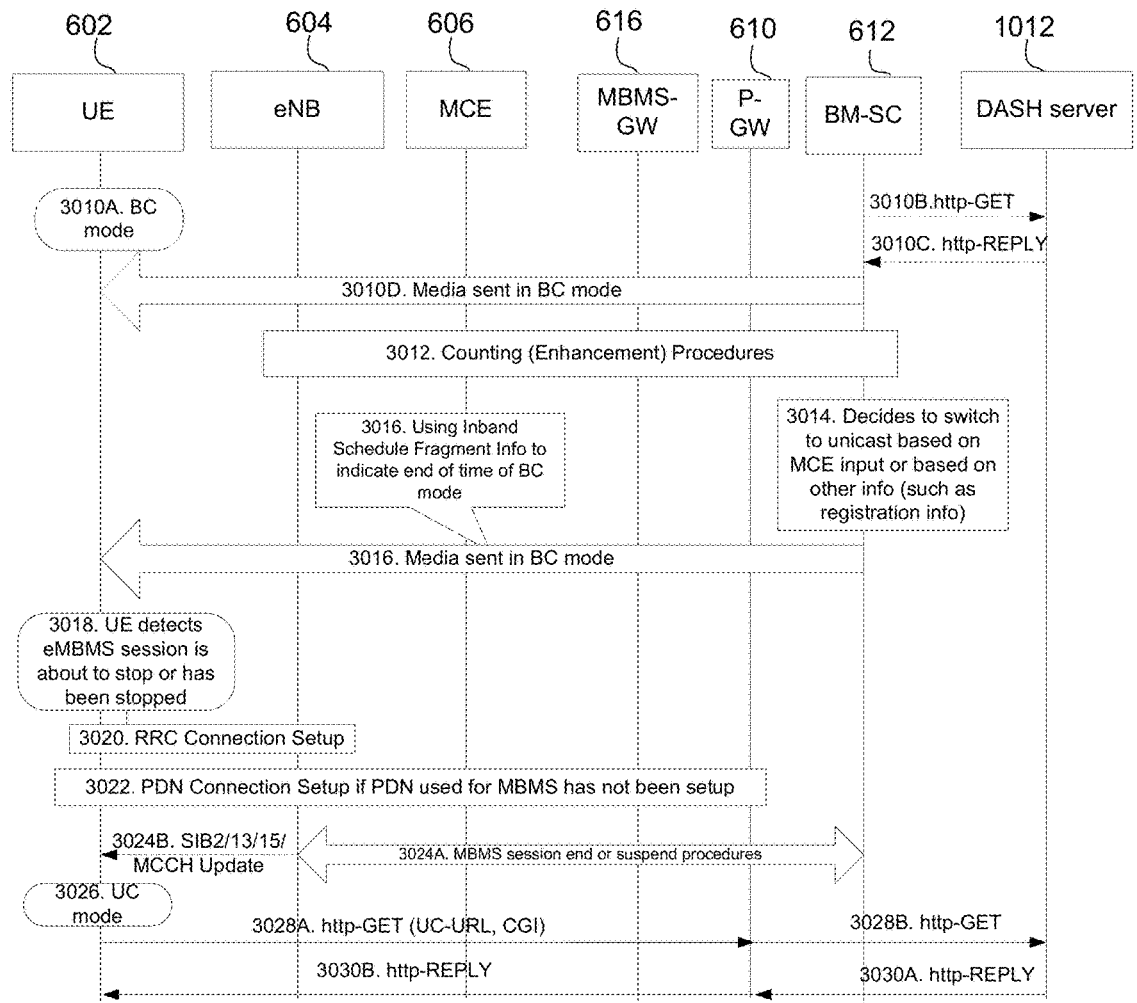
FIG. 30 illustrates switching from BC to UC (DASH may be used for both UC and BC).

FIG. 30 illustrates an aspect for switching a UE from content delivery via MBMS over BC to content delivery via a UC reception mode (DASH may be used for both UC and BC delivery of the content).

A description of each step may be as follows:

3010A-D. An application is on (in a running state), and DASH over MBMS is on-going. The UE 602 is in BC reception mode.

3012. The eNB 604/MCE 606 communicates with the BM-SC 612 to report a counting result for a content being transmitted via BC delivery of content.

3014. The BM-SC 612 may decide to switch from a BC to a UC content delivery mode based on the MCE's 606 input or based on other information (for example, expiration of a preconfigured timer or MBMS registration information).

3016. The BM-SC 612 may use an in-band Schedule Fragment Information to indicate the end of MBMs transmission of the content. For example, the Schedule Fragment Information may be sent within the eMBMS transmission.

3018. The UE 602 may obtain the in-band Schedule Fragment Information and detect that the MBMS session is about to end.

3020. The UE 602 may establish an RRC connection prior to the MBMS session end time.

3022. The UE 602 may also establish a PDN connection if needed.

3024A-B. The BM-SC 612 may perform MBMS session stop procedures as specified in 3GPP TS 23.246.

3026. The UE 602 may enter a UC reception mode.

3028-3030. The UE 602 may continue to use unicast DASH procedures to receive content by sending HTTP-GET messages.

Figure 31:
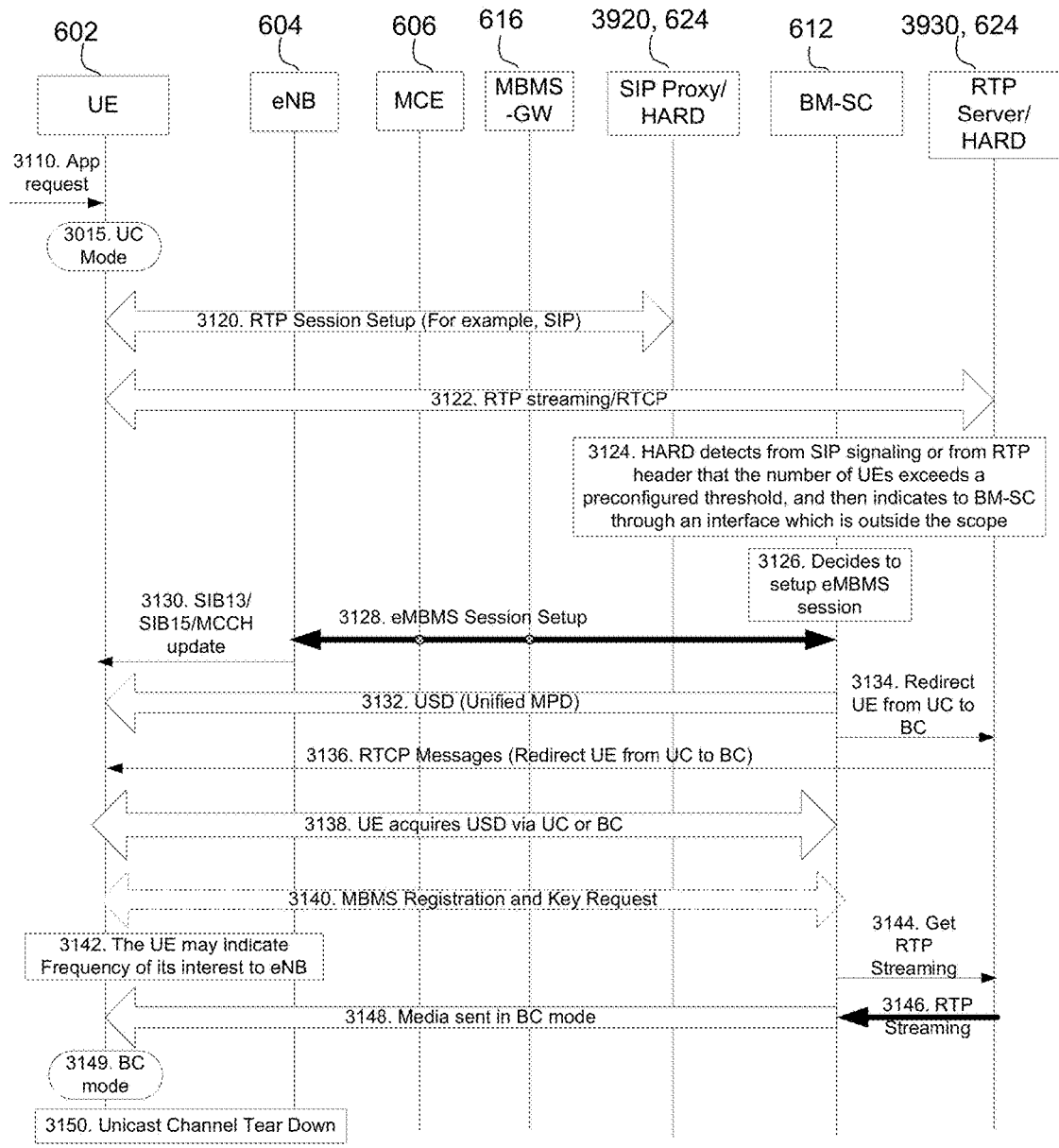
FIG. 31 illustrates switching from non-eMBMS UC to BC, where real-time transport protocol (RTP) may be used in both delivery of content via UC and delivery of content via BC.

FIG. 31 illustrates an aspect for switching from content reception via non-eMBMS UC to content reception via BC, where an RTP may be used for delivery of content via UC and delivery of content via BC.

A description of each step may be as follows:

3110. The application sends a request for a content.

3120. The UE 602 may discover that the content requested by the application is not available through LTE BC. The UE may send SIP signaling to set up an RTP session. The SIP message may include the UE's 602 location information including, for example, CGI.

3122. An RTP streaming and RTCP may be established between the UE 602 and the RTP Server 3930.

3124. The HARD 624 function, which may be located in the path of SIP signaling or the RTP user traffic path, detects a content with a high attach rate, e.g., the number of the UEs receiving the content from the same area exceeds a configurable threshold based on network operator policy. The HARD 624 function may send an indication of the high attach rate content to the BM-SC 612.

3126. The BM-SC 612 may decide to enable eMBMS transmission.

3128. The BM-SC 612 may set up an eMBMS session as specified in 3GPP TS 23.246.

3130. The eNB 604 may apply radio resource configuration and send updated SIB13 and SIB15 information if needed. The eNB 604 may also perform MCCH change notifications to inform UEs of the presence of the eMBMS service.

3132. The BM-SC 612 may send an updated USD which includes a unified MPD if needed.

3134. Once the MBMS session has been established, the BM-SC 612 may indicate to the RTP server to redirect UE 602 from UC to BC reception mode.

3136. The RTP server may redirect the UE 602 to switch from a UC to a BC reception mode using RTCP messages.

3138. Upon receiving redirection from the network, the UE 602 may initiate service discovery procedures to receive the USD through a broadcast channel if available or through a unicast channel if the USD is not available from the broadcast channel.

3140. If the UE 602 has not registered for the MBMS service and the USD indicates that registration is required, the UE 602 may perform MBMS service registration and obtain a service key if service protection is enabled.

3142. Based on the information received from SIB 15 over the air and the USD received from the BM-SC 612, if the corresponding MBMS service is transmitted in a different frequency, the UE 602 may send an MBMSInterestMessage to indicate the interested frequency.

3144. The BM-SC 612 may request RTP packets from the RTP server.

3146. The RTP server sends the RTP packets to the BM-SC 612.

3148. The BM-SC 612 may send the content to the UE 602 via RTP streaming over MBMS.

3150. The UE 602 receives RTP packets over the MBMS channel and enters BC reception mode.

Figure 32:
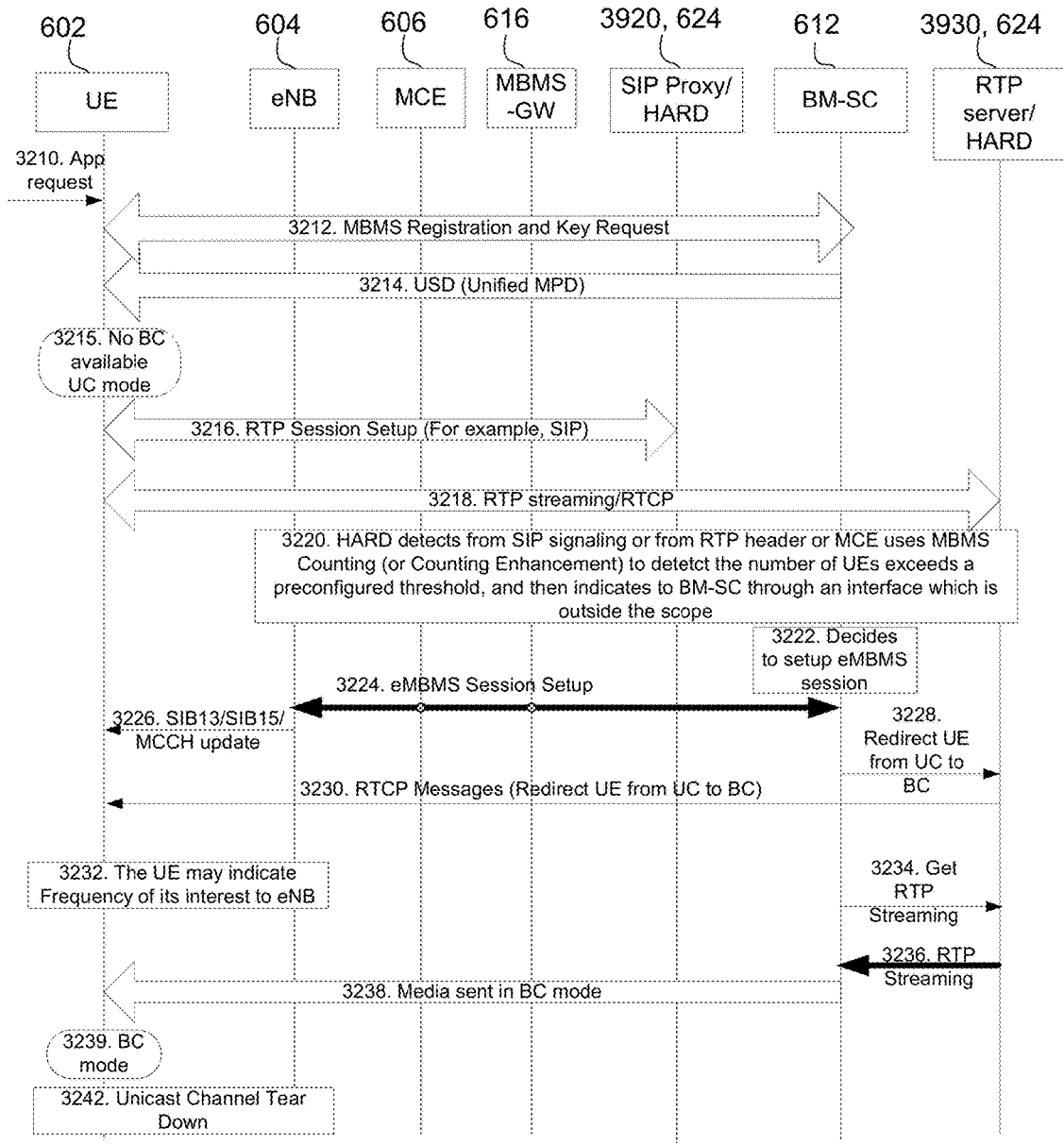
FIG. 32 illustrates switching from eMBMS UC to BC, where real-time transport protocol (RTP) may be used in both delivery of content via UC and delivery of content via BC.

FIG. 32 illustrates an aspect for switching from MBMS over UC to BC delivery mode, where RTP may be used for delivery of content via UC and delivery of content via BC.

A description of each step may be as follows:

3210. The application requests a content.

3212. Since the service may be an MBMS service, the UE 602 may perform MBMS service registration and may obtain a service key if service protection is enabled.

3214. The UE 602 may acquire a USD with a unified MPD included via either a unicast channel or a broadcast channel.

3216. The UE 602 may discover that the content requested by the application is not available through LTE broadcast. The UE 602 may send SIP signaling to establish a RTP session. The SIP message may include the UE's location information, for example CGI.

3218. RTP streaming and RTCP may be ongoing.

3220. The HARD 624 function, which may be in the path of SIP signaling or the RTP user traffic path, detects a content with a high attach rate, e.g., number of the UEs that are receiving the content from the same area exceeds a configurable threshold based on network operator policy. The HARD 624 function may indicate such high attach rate content to the BM-SC 612.

3222. The BM-SC 612 may decide to enable eMBMS transmission of the high attach rate content.

3224. The BM-SC 612 may establish an eMBMS session to deliver the content as specified in 3GPP TS 23.246.

3226. The eNB 604 may use RRC control signals to send updated SIB13 and SIB 15 if needed. The eNB 604 may also perform MCCH change notifications to inform UEs of the presence of eMBMS service.

3228. Once an MBMS session has been established, the BM-SC 612 may send an indication to the RTP server to redirect the UE 602 from UC to BC.

3230. The RTP server may redirect the UE 602 to switch from UC to BC reception mode using RTCP messages.

3232. Based on the information received from SIB 15 over the air and USD from the BM-SC 612, if the corresponding MBMS service is transmitted on a different frequency, the UE 602 may send an MBMSInterestMessage to indicate the frequency of interest.

3234. The BM-SC 612 may request RTP packets from the RTP server.

3236-3238. The RTP server may send RTP packets to the BM-SC 612. The BM-SC 612 may send the content via RTP streaming over MBMS.

3242. The UE 602 may receive the RTP packets over the corresponding MBMS channel and may enter BC reception mode.

Figure 33:
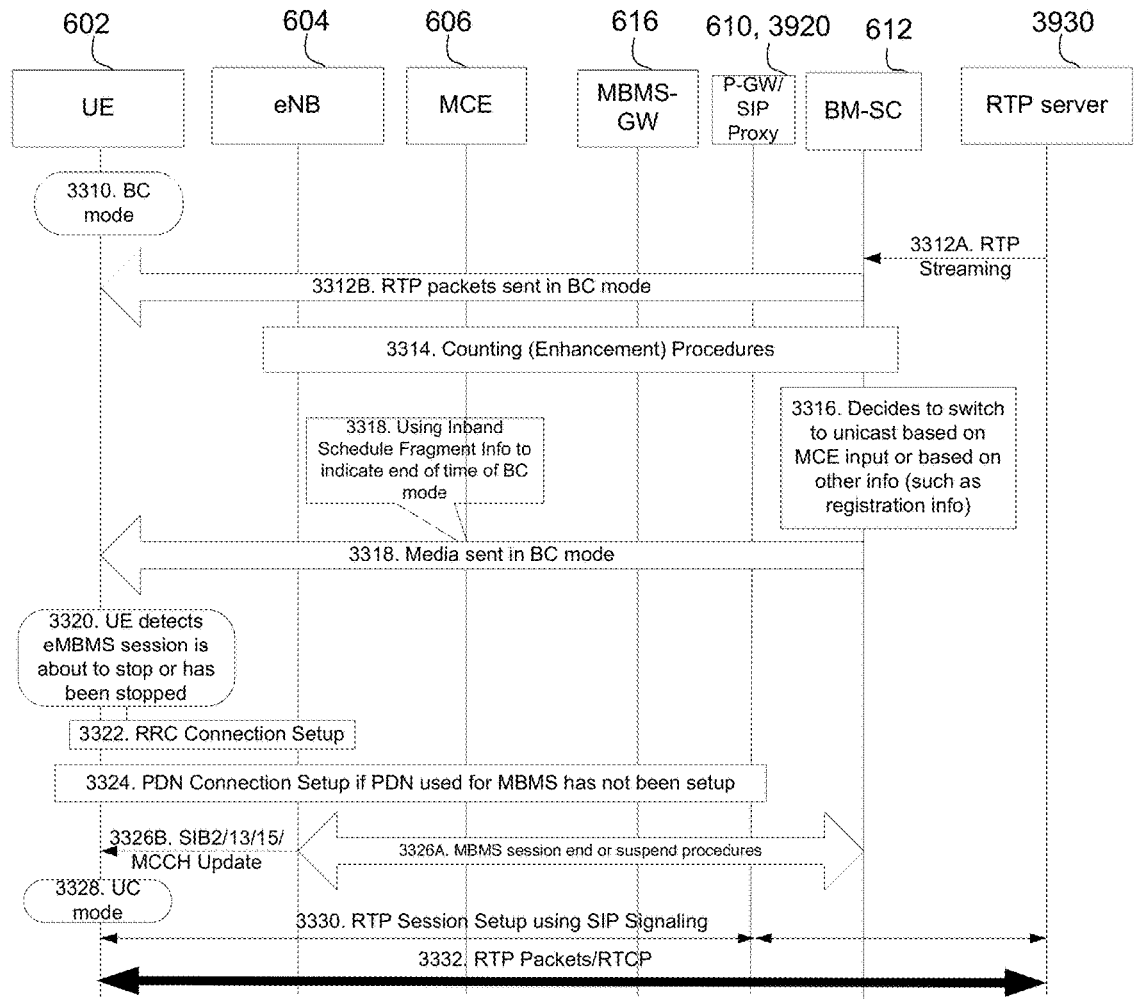
FIG. 33 illustrates switching from BC to UC, where real-time transport protocol (RTP) may be used in both delivery of content via UC and delivery of content via BC.

FIG. 33 illustrates switching from delivery of content via BC to delivery of content via UC, where RTP may be used in both delivery of content via UC and delivery of content via BC.

A descriptions of each step may be as follows:

3310-3312. An application may be running on a UE 602 and delivery of content via RTP over MBMS is on-going. The UE 602 is in BC reception mode.

3314. The eNB 604/MCE 606 may communicate with the BM-SC 612 to report a counting result for content.

3316. The BM-SC 612 may decide to switch from BC to UC delivery mode based on the MCE's 606 input or based on other information (for example, expiration of a preconfigured timer or MBMS registration information).

3318. The BM-SC 612 may use an in-band Schedule Fragment Info to indicate the end of MBMS transmission of the content.

3320. The UE 602 may obtain the in-band Schedule Fragment Info and detect that the MBMS session for the content is about to end.

3322. The UE 602 may establish an RRC connection before the MBMS session end time.

3324. The UE 602 may also establish a PDN connection if needed, e.g., if a PDN used for MBMS has not been set up.

3326A-B. The BM-SC 612 may perform MBMS session stop procedures e.g., as specified in 3GPP TS 23.246.

3328. The UE 602 may enter UC reception mode.

3330. The UE 602 may establish a RTP session via SIP signaling.

3332. The UE 602 may receive content via RTP packets over a unicast channel.

Figure 34A:
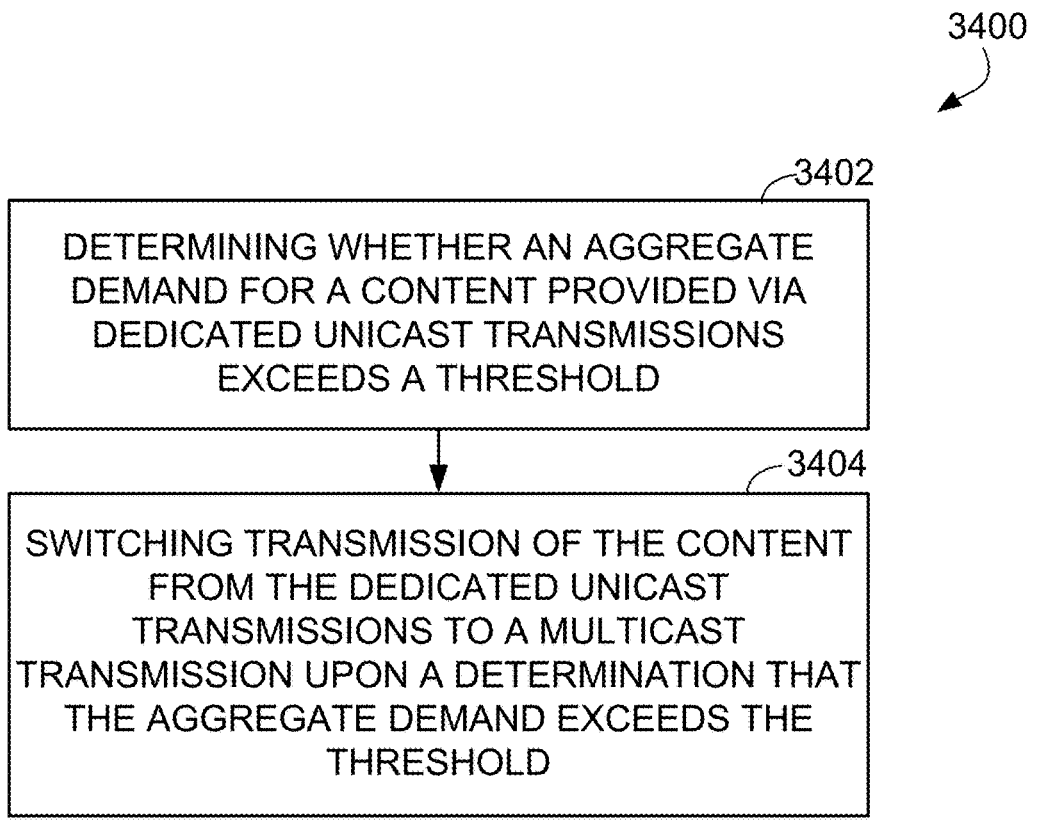
FIGS. 34A-E illustrate embodiments of a methodology for implementing a demand-based multicast service in a wireless communication system using a high attach rate detection (HARD) module.

In accordance with one or more aspects of the embodiments described herein, with reference to FIG. 34A, there is shown a methodology 3400, operable by an apparatus, such as for example, a P-GW or a BM-SC including a HARD module. The method is not limited to performance by the P-GW or BM-SC and/or HARD module, and may be performed by any network entity or combination of entities for which the defined operations are possible and/or permitted by applicable standards. The method 3400 may include, at 3402, determining whether an aggregate demand for a content provided via dedicated unicast transmissions exceeds a threshold. The method 3400 may further include, at 3404, switching transmission of the content from the dedicated unicast transmissions to a multicast transmission upon a determination that the aggregate demand exceeds the threshold.

Figure 34B:
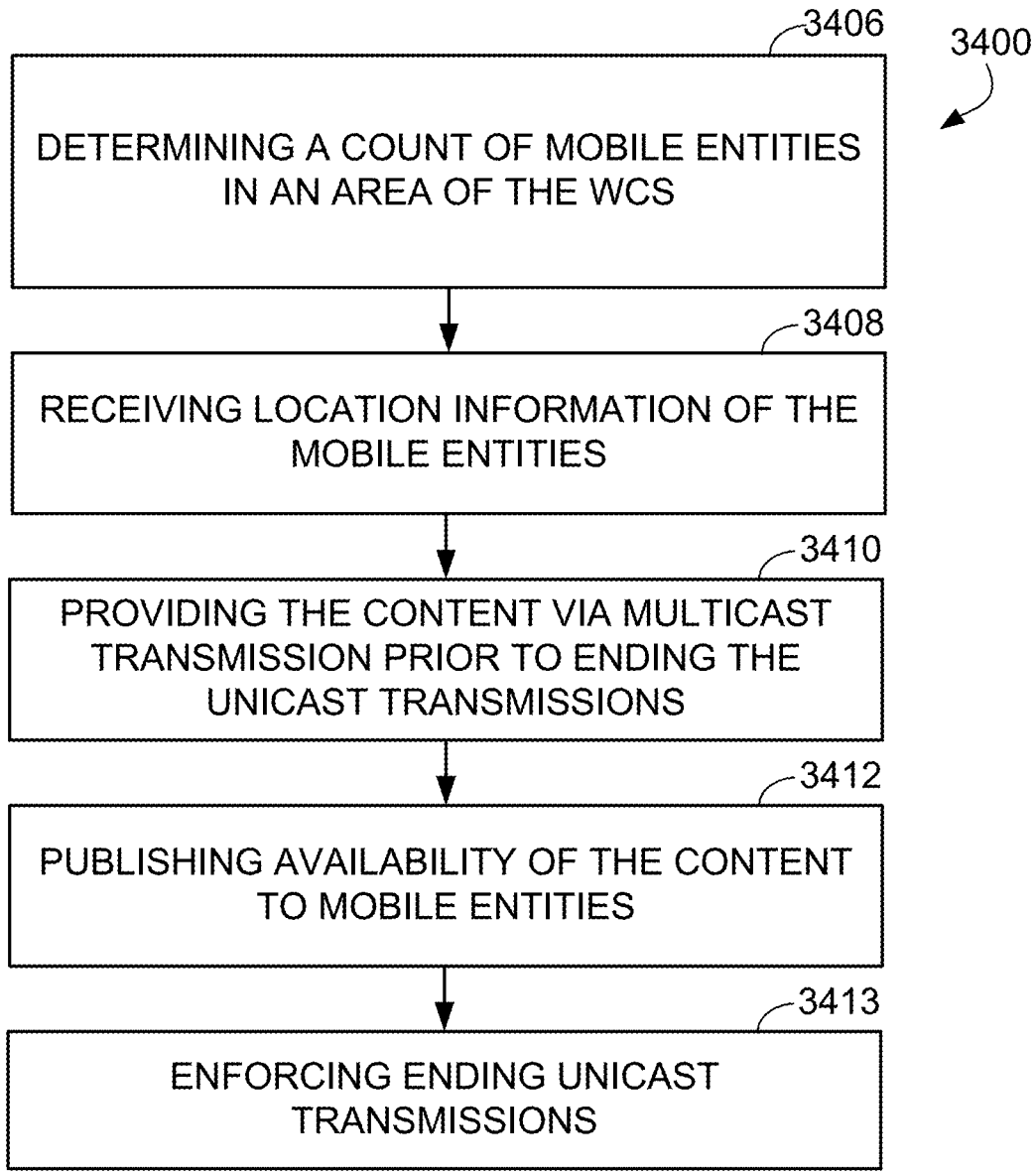

With reference to FIG. 34B, there are shown further optional operations or aspects of the method 3400. If the method 3400 includes at least one block of FIG. 34B, then the method 3400 may terminate after the at least one block, without including any subsequent downstream block(s). It is further noted that numbers of the blocks do not imply a particular order in which the blocks may be performed according to the method 3400. For example, the method 3400 may further include determining a count of mobile entities in an area of the WCS (block 3406), receiving location information of the mobile entities (block 3408), providing the content via multicast transmission prior to ending the unicast transmissions (block 3410), publishing availability of the content to mobile entities (block 3412), and enforcing ending unicast transmissions (block 3413).

Figure 34C:
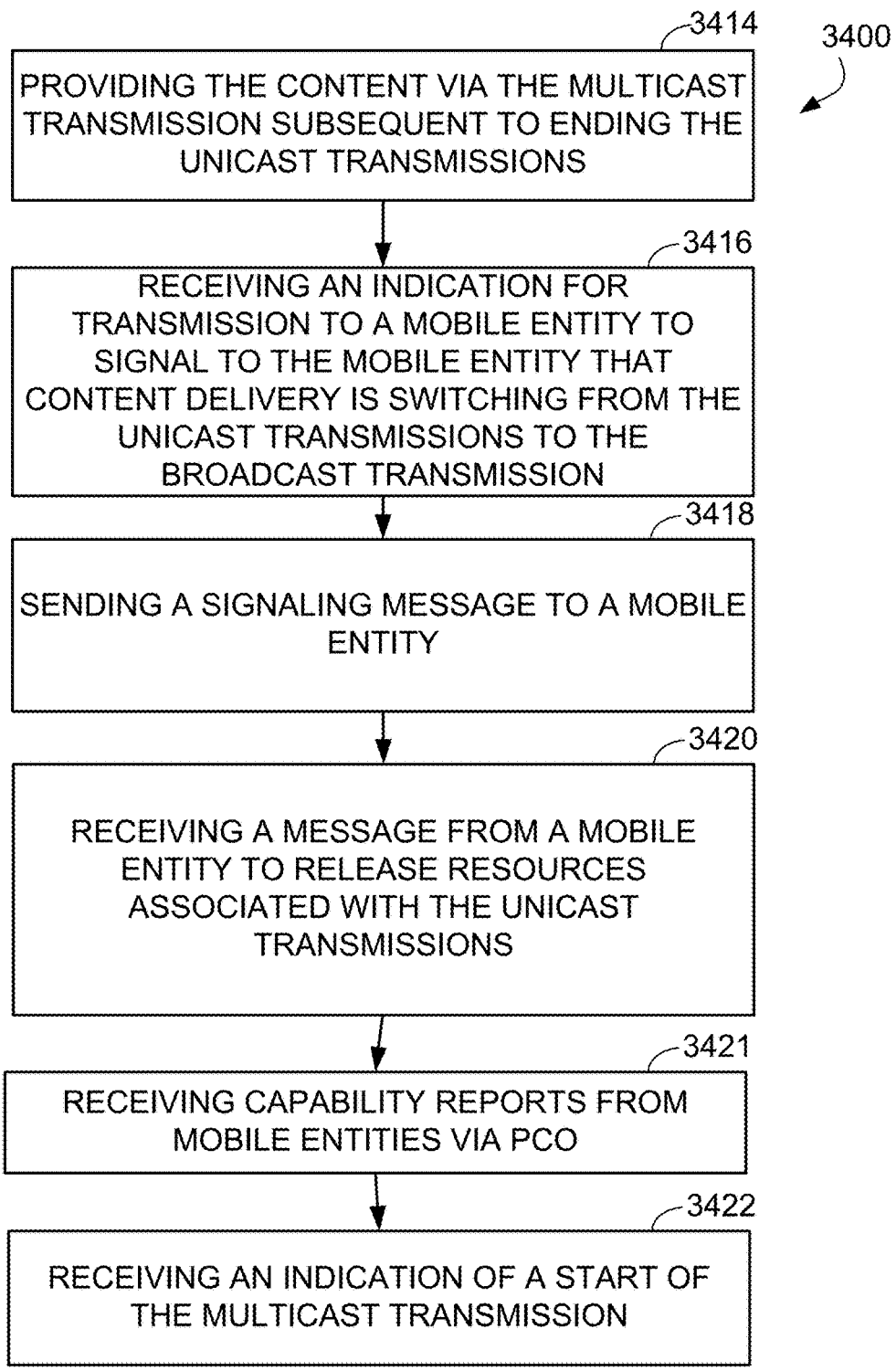

With reference to FIG. 34C, there are shown further optional operations or aspects of the method 3400. If the method 3400 includes at least one block of FIG. 34C, then the method 3400 may terminate after the at least one block, without including any subsequent downstream block(s). It is further noted that numbers of the blocks do not imply a particular order in which the blocks may be performed according to the method 3400. For example, the method 3400 may further include providing the content via the multicast transmission subsequent to ending the unicast transmissions (block 3414), receiving an indication for transmission to a mobile entity to signal to the mobile entity that content delivery is switching from the unicast transmission mode to the broadcast transmission mode (block 3416), sending a signaling message to a mobile entity, wherein the signaling message indicates that the content delivery is switching from the unicast transmission mode to the multicast transmission mode (block 3418). For example, the signaling message may include PCO or a socket configuration. The method 3400 may further include receiving a message from a mobile entity to release resources associated with the unicast transmission mode (block 3420), receiving capability reports from mobile entities via PCO (block 3421), and receiving an indication of a start of the multicast transmission mode (block 3422).

Figure 34D:
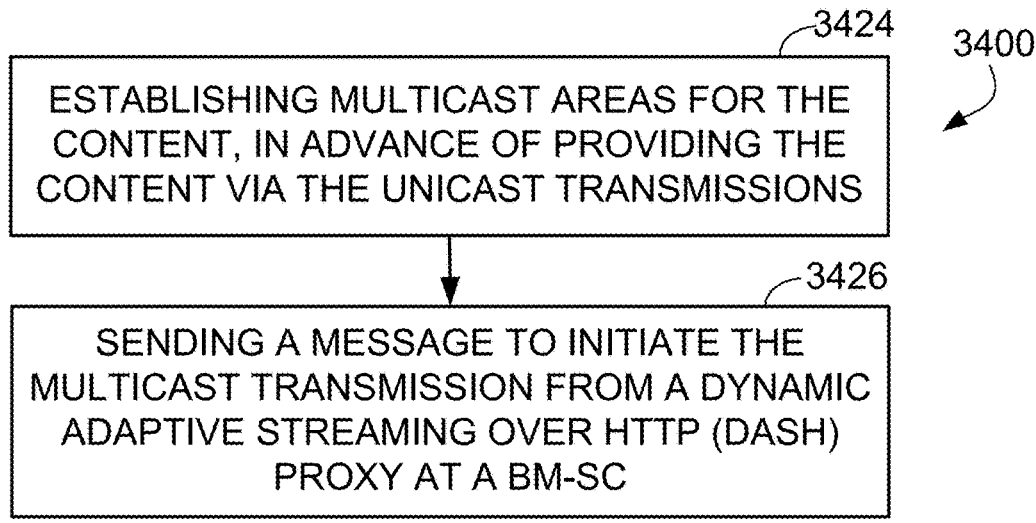

With reference to FIG. 34D, there are shown further optional operations or aspects of the method 3400. If the method 3400 includes at least one block of FIG. 34D, then the method 3400 may terminate after the at least one block, without including any subsequent downstream block(s). It is further noted that numbers of the blocks do not imply a particular order in which the blocks may be performed according to the method 3400. For example, the method 3400 may further include establishing one or more multicast areas for delivery of the content, in advance of providing the content via the unicast transmissions (block 3424), and sending a message to initiate the multicast transmission from a dynamic adaptive streaming over HTTP (DASH) proxy at a BM-SC (block 3426).

Figure 34E:
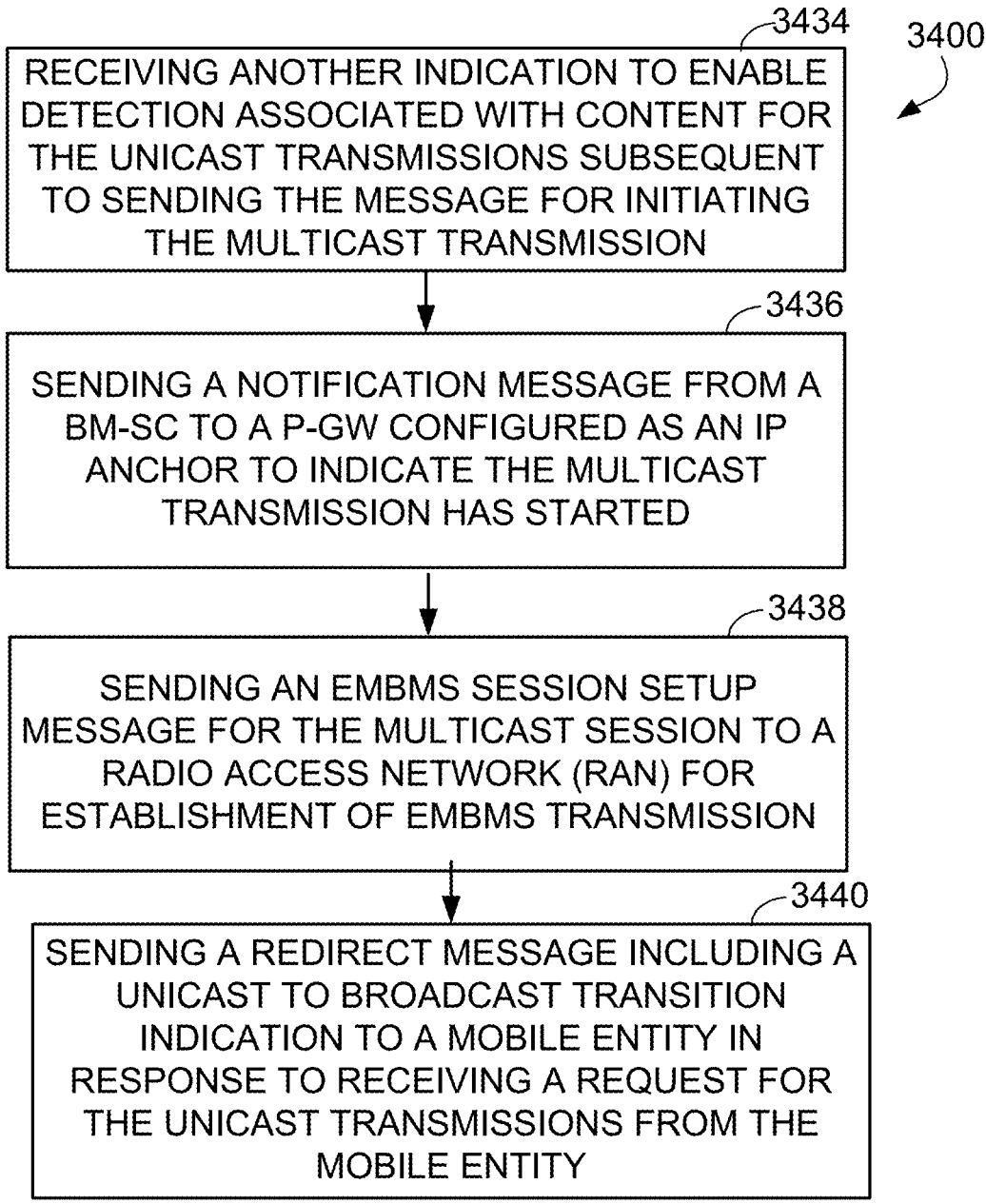

With reference to FIG. 34E, there are shown further optional operations or aspects of the method 3400. If the method 3400 includes at least one block of FIG. 34E, then the method 3400 may terminate after the at least one block, without including any subsequent downstream block(s). It is further noted that numbers of the blocks do not imply a particular order in which the blocks may be performed according to the method 3400. For example, the method 3400 may further include receiving another indication to enable detection associated with content for the unicast transmissions subsequent to sending the message for initiating the multicast transmission (block 3434), sending a notification message from a BM-SC to a P-GW configured as an IP anchor to indicate the multicast transmission has started (block 3436), sending an eMBMS session setup message for the multicast session to a RAN for establishment of eMBMS transmission (block 3438), and sending a redirect message including a unicast to broadcast transition indication to a mobile entity in response to receiving a request for delivery of content via unicast delivery from the mobile entity (block 3440).

Figure 35:
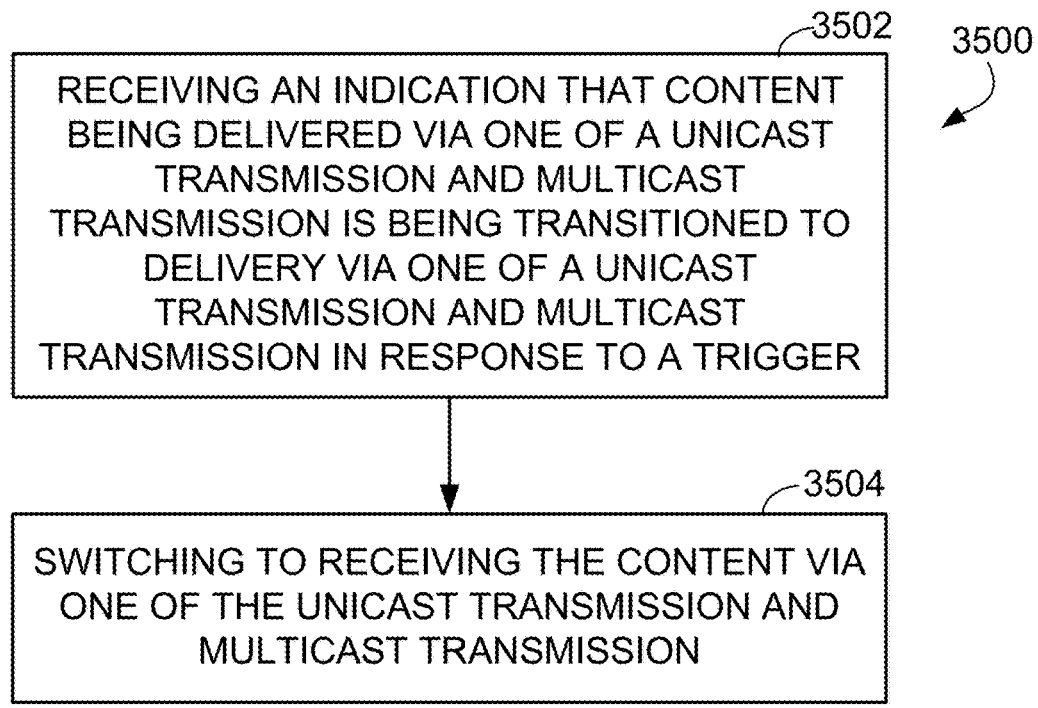
FIG. 35 illustrates an embodiment of a methodology for implementing UE-based solution for demand-based multicast service in a wireless communication system.

In accordance with one or more aspects of the embodiments described herein, with reference to FIG. 35, there is shown a methodology 3500, operable by an apparatus, such as for example, the UE. The method is not limited to performance by the UE, and may be performed by any mobile entity or combination of entities for which the defined operations are possible and/or permitted by applicable standards. The method 3500 may include, at 3502, receiving an indication that content being delivered via unicast transmission or multicast transmission is being transitioned to delivery via unicast transmission or multicast transmission, respectively, in response to a trigger. The method 3500 may further include, at 3504, switching to receiving the content via the unicast transmission or multicast transmission, respectively.

Figure 36A:
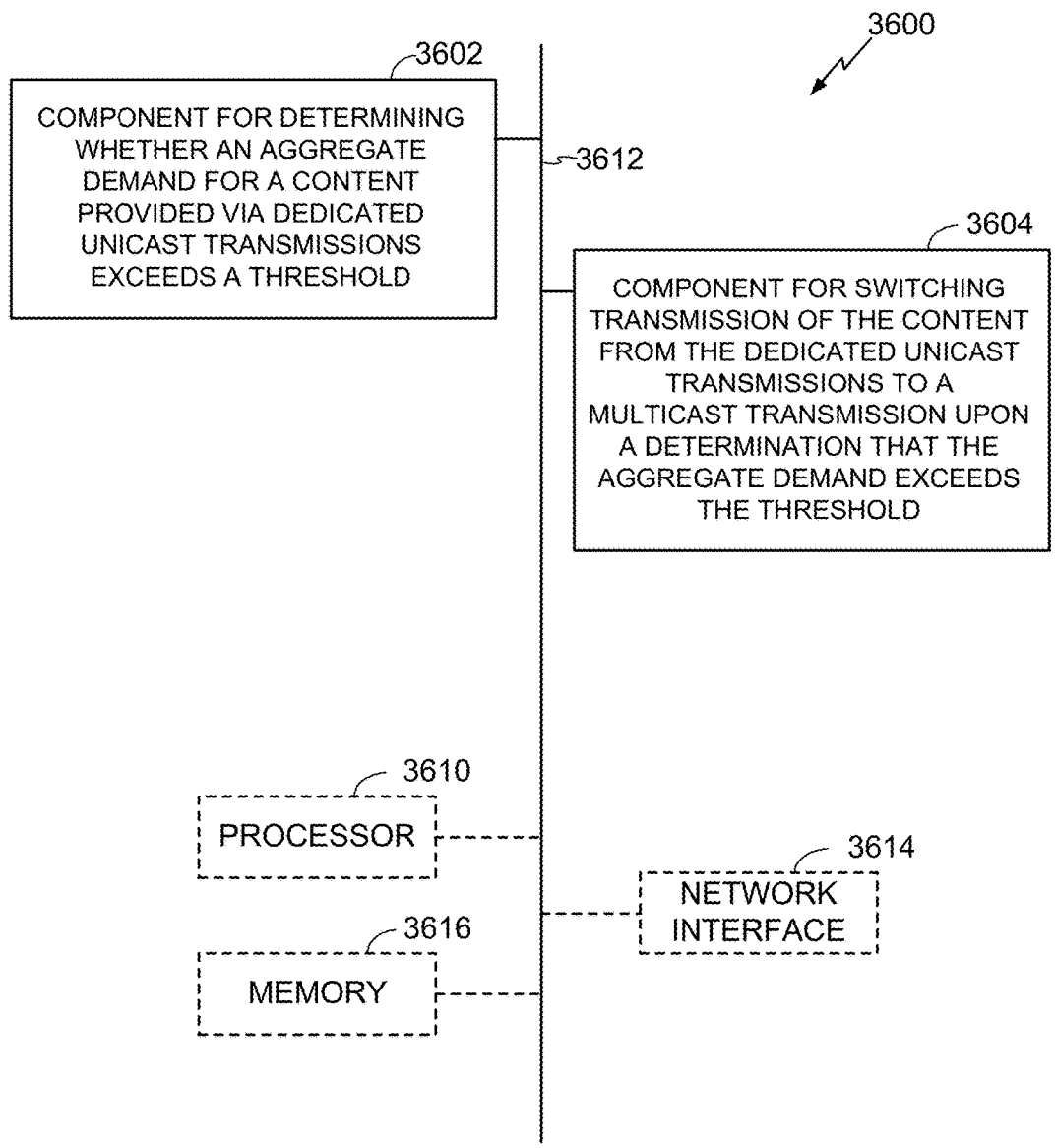
FIGS. 36A-E illustrate embodiments of an apparatus for implementing a demand-based multicast service, in accordance with the methodologies of FIGS. 34A-E.

FIG. 36A shows an embodiment of an apparatus for implementing a demand-based multicast service in a wireless communication system, in accordance with the methodology of FIGS. 34A-E. With reference to FIG. 36A, there is provided an exemplary apparatus 3600 that may be configured as a P-GW or BM-SC component, or as a processor or similar device/component for use within one of the devices. The apparatus 3600 may include functional blocks that can represent functions implemented by a processor, software, hardware, or combination thereof (e.g., firmware). For example, apparatus 3600 may include a component or module 3602 for determining whether an aggregate demand for a content provided via dedicated unicast transmissions exceeds a threshold. The apparatus 3600 may also include a component or module 3604 for switching transmission of the content from the dedicated unicast transmissions to a multicast transmission upon a determination that the aggregate demand exceeds the threshold.

In related aspects, the apparatus 3600 may optionally include a processor component 3610 having at least one processor, in the case of the apparatus 3600 configured as a P-GW or BM-SC, rather than as a processor. The processor 3610, in such case, may be in operative communication with the components 3602-3604 via a bus 3612 or similar communication coupling. The processor 3610 may effect initiation and scheduling of the processes or functions performed by electrical components 3602-3604.

In further related aspects, the apparatus 3600 may include a signaling component 3614. The apparatus 3600 may optionally include a component for storing information, such as, for example, a memory device/component 3616. The computer readable medium or the memory component 3616 may be operatively coupled to the other components of the apparatus 3600 via the bus 3612 or the like. The memory component 3616 may be adapted to store computer readable instructions and data for effecting the processes and behavior of the components 3602-3604, and subcomponents thereof, or the processor 3610, or the methods disclosed herein. The memory component 3616 may retain instructions for executing functions associated with the components 3602-3604. While shown as being external to the memory component 3616, it is to be understood that the components 3602-3604 can exist within the memory component 3616. It is further noted that the components in FIG. 36A may comprise processors, electronic devices, hardware devices, electronic sub-components, logical circuits, memories, software codes, firmware codes, etc., or any combination thereof.

Figure 36B:
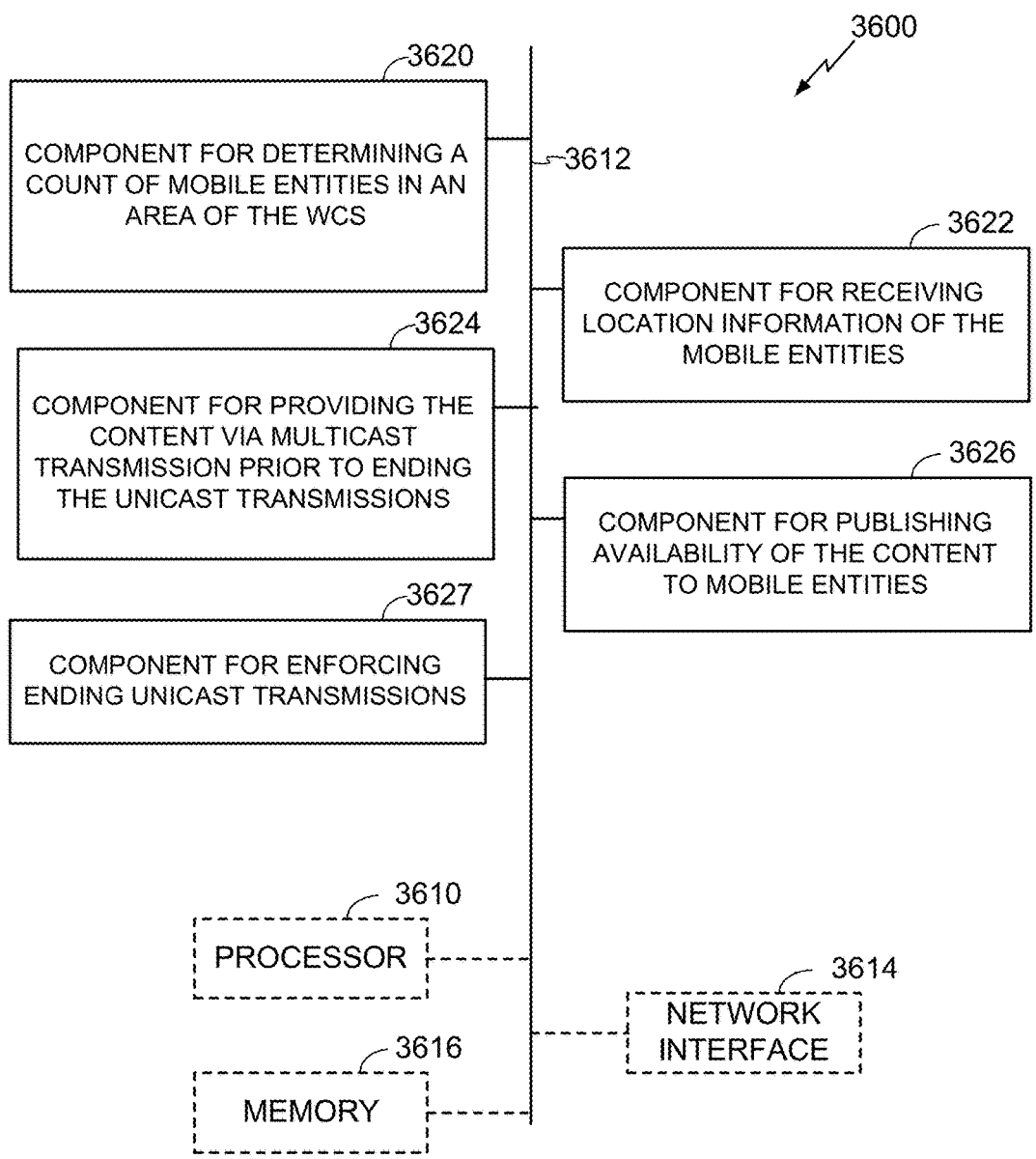

With reference to FIG. 36B, there are shown further optional components or modules of the apparatus 3600. For example, the apparatus 3600 may further include a component or module 3620 for determining a count of mobile entities in an area of the WCS. For example, the apparatus 3600 may further include a component or module 3622 for receiving location information of the mobile entities. The apparatus 3600 may further include a component or module 3624 for providing the content via multicast transmission prior to ending the unicast transmissions. The apparatus 3600 may further include a component or module 3626 for publishing availability of the content to mobile entities. The apparatus 3600 may further include a component or module 3627 for enforcing ending unicast transmissions.

Figure 36C:
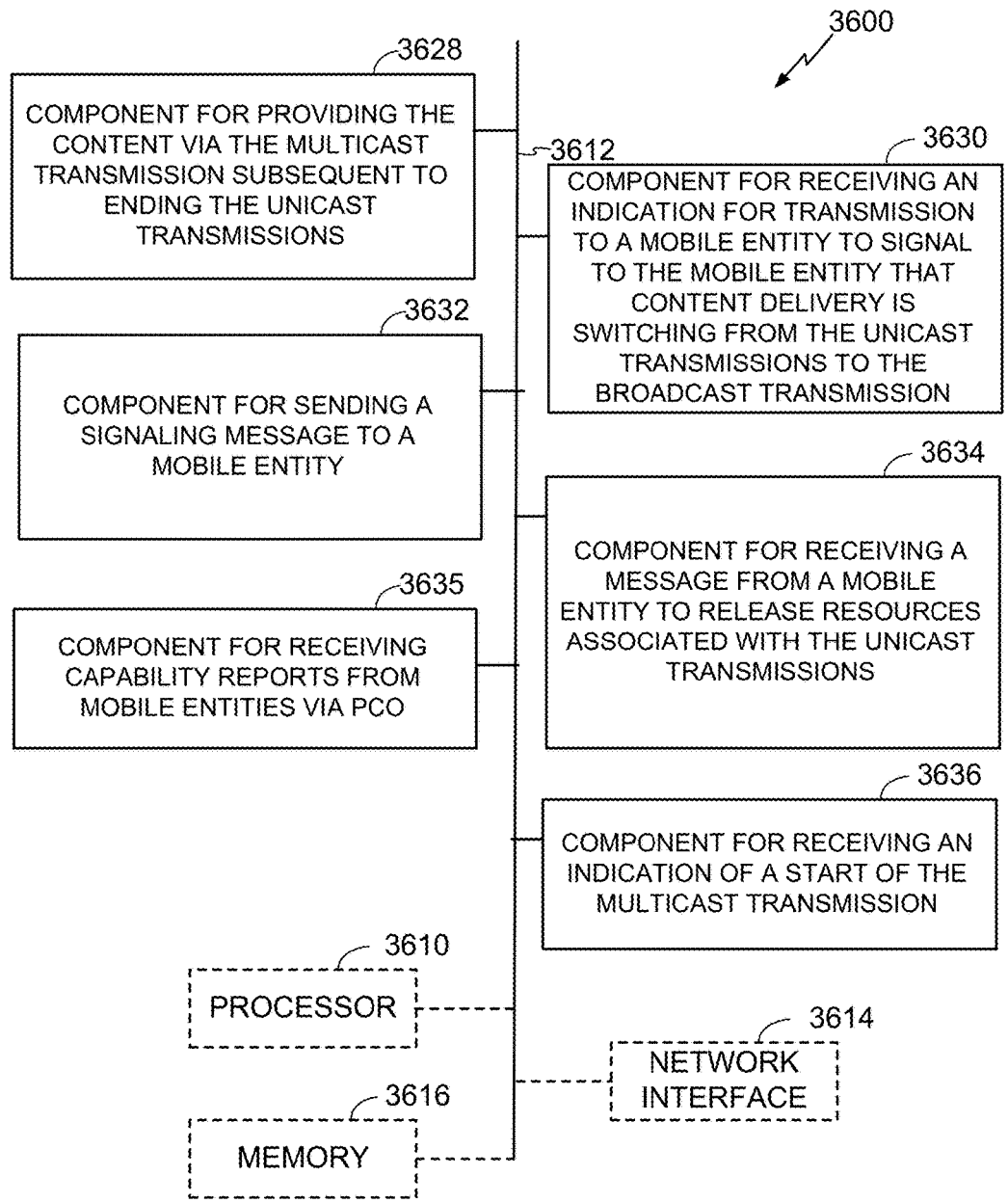

With reference to FIG. 36C, there are shown further optional components or modules of the apparatus 3600. For example, the apparatus 3600 may further include a component or module 3628 for providing the content via the multicast transmission subsequent to ending the unicast transmissions. For example, the apparatus 3600 may further include a component or module 3630 for receiving an indication for transmission to a mobile entity to signal to the mobile entity that content delivery is switching from the unicast transmissions to the broadcast transmission. The apparatus 3600 may further include a component or module 3632 for sending a signaling message to a mobile entity, wherein the signaling message indicates that the content delivery is switching from the unicast transmission to the multicast transmission. The apparatus 3600 may further include a component or module 3634 for receiving a message from a mobile entity to release resources associated with the unicast transmission. The apparatus 3600 may further include a component or module 3635 for receiving capability reports from mobile entities via PCO. The apparatus 3600 may further include a component or module 3636 for receiving an indication of a start of the multicast transmission.

Figure 36D:
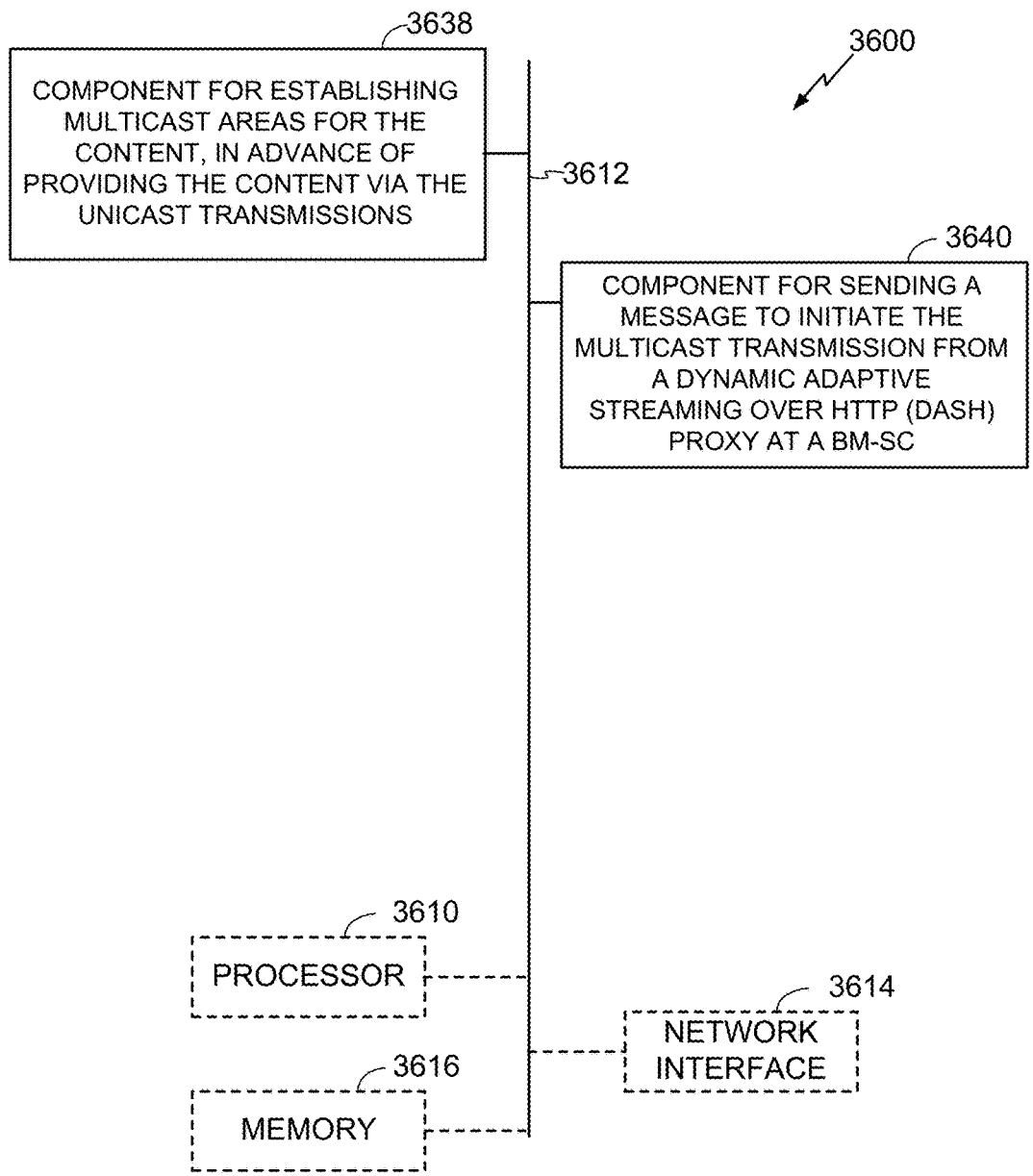

With reference to FIG. 36D, there are shown further optional components or modules of the apparatus 3600. For example, the apparatus 3600 may further include a component or module 3638 for establishing one or more multicast areas for delivery of the content, in advance of providing the content via the unicast transmissions. For example, the apparatus 3600 may further include a component or module 3640 for sending a message to initiate the multicast transmission from a dynamic adaptive streaming over HTTP (DASH) proxy at a BM-SC.

Figure 36E:
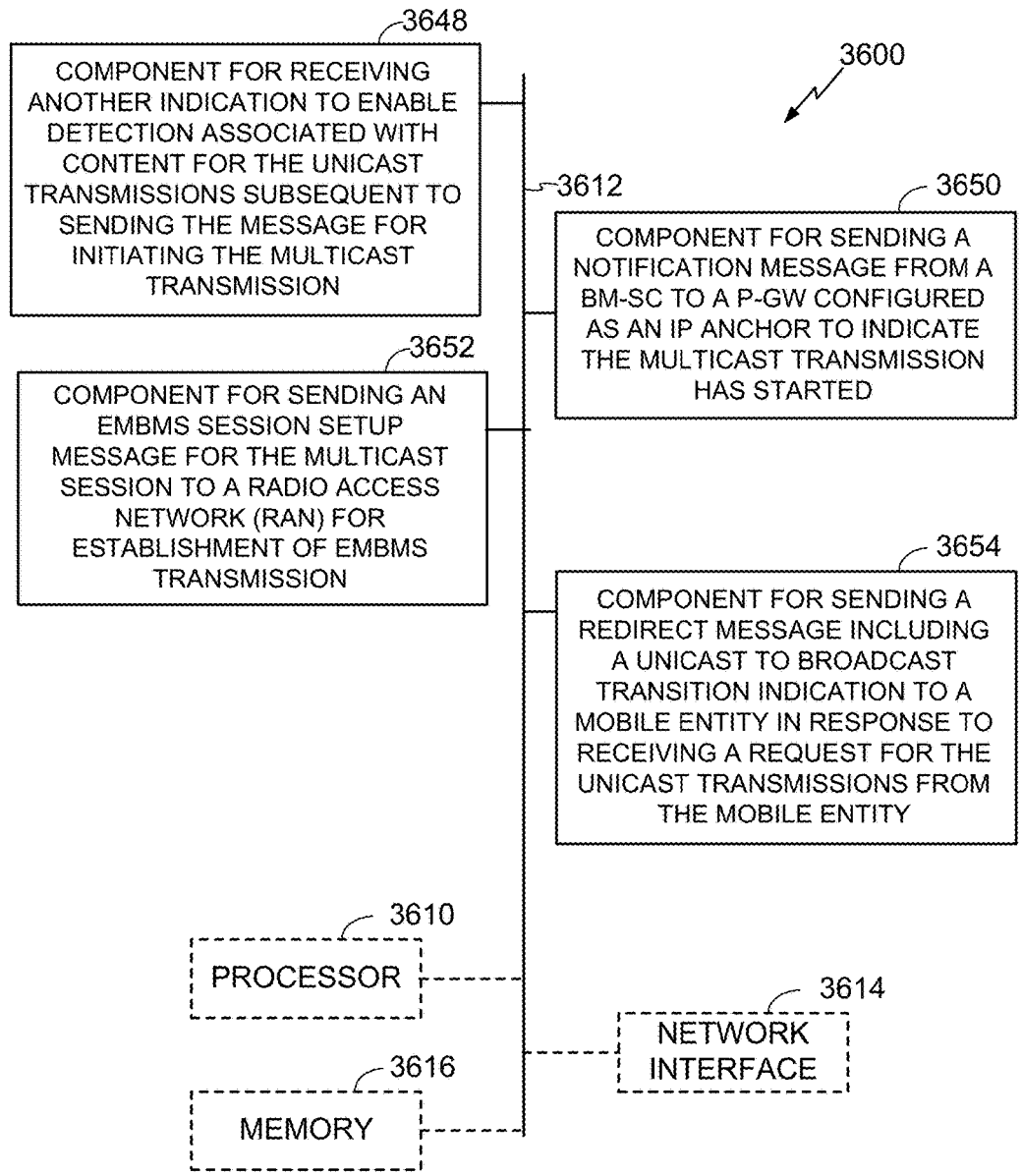

With reference to FIG. 36E, there are shown further optional components or modules of the apparatus 3600. For example, the apparatus 3600 may further include a component or module 3648 for receiving another indication to enable detection associated with content for the unicast transmissions subsequent to sending the message for initiating the multicast transmission. For example, the apparatus 3600 may further include a component or module 3650 for sending a notification message from a BM-SC to a P-GW configured as an IP anchor to indicate the multicast transmission has started. The apparatus 3600 may further include a component or module 3652 for sending an eMBMS session setup message for the multicast session to a RAN for establishment of an eMBMS transmission. The apparatus 3600 may further include a component or module 3654 for sending a redirect message including a unicast to broadcast transition indication to a mobile entity in response to receiving a request for delivery of content via unicast delivery from the mobile entity.

Figure 37:
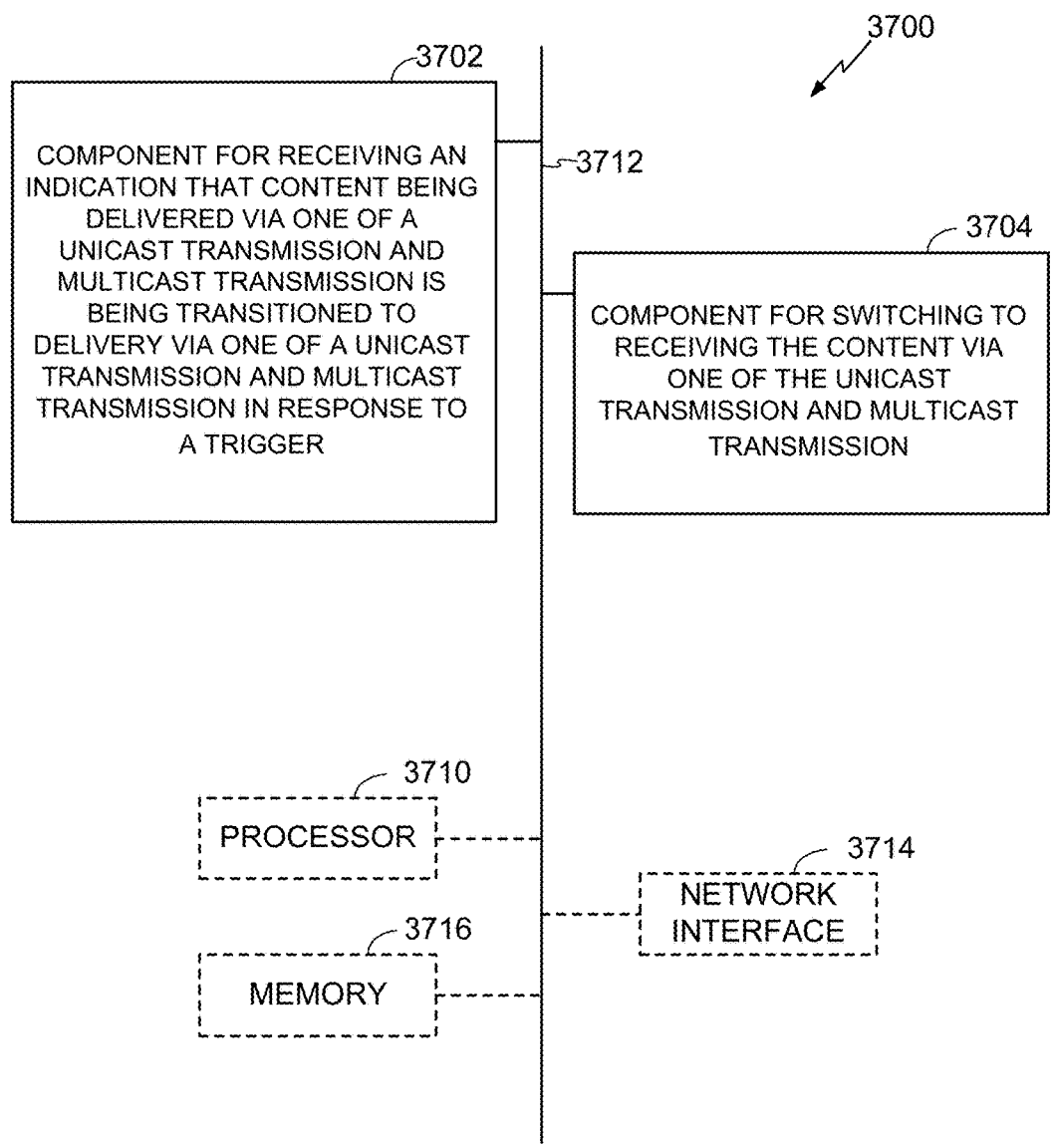
FIG. 37 illustrates an embodiment of an apparatus for implementing a demand-based multicast service, in accordance with the methodology of FIG. 35.

FIG. 37 shows an embodiment of an apparatus for implementing a demand-based multicast service in a wireless communication system, in accordance with the methodology of FIG. 35. With reference to FIG. 37, there is provided an exemplary apparatus 3700 that may be configured as a UE, or as a processor or similar device/component for use within the device. The apparatus 3700 may include functional blocks that can represent functions implemented by a processor, software, hardware, or combination thereof (e.g., firmware). For example, apparatus 3700 may include a component or module 3702 for receiving an indication that content being delivered via unicast transmission or multicast transmission is being transitioned to delivery via multicast transmission or unicast transmission, respectively, in response to a trigger. The apparatus 3700 may also include a component or module 3704 for switching to receiving the content via multicast transmission or unicast transmission, respectively.

Figure 38:
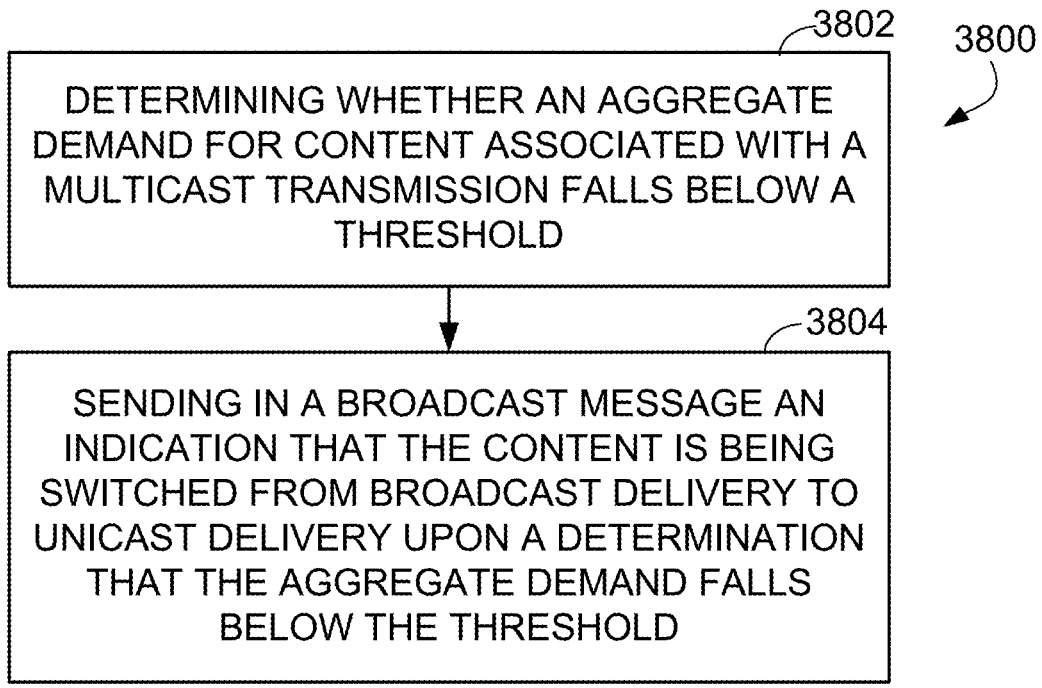
FIG. 38 illustrates an embodiment of another methodology for implementing a demand-based multicast service in a wireless communication system using a HARD module.

In accordance with one or more aspects of the embodiments described herein, with reference to FIG. 38, there is shown a methodology 3800, operable by an apparatus, such as for example, a P-GW or a BM-SC including a HARD module. The method is not limited to performance by the P-GW or BM-SC and/or HARD module, and may be performed by any network entity or combination of entities for which the defined operations are possible and/or permitted by applicable standards. The method 3800 may include, at 3802, determining whether an aggregate demand for content associated with a multicast transmission falls below a threshold. The method 3800 may further include, at 3804, sending in a broadcast message an indication that the content is being switched from broadcast delivery to unicast delivery upon a determination that the aggregate demand falls below the threshold.

Figure 39:
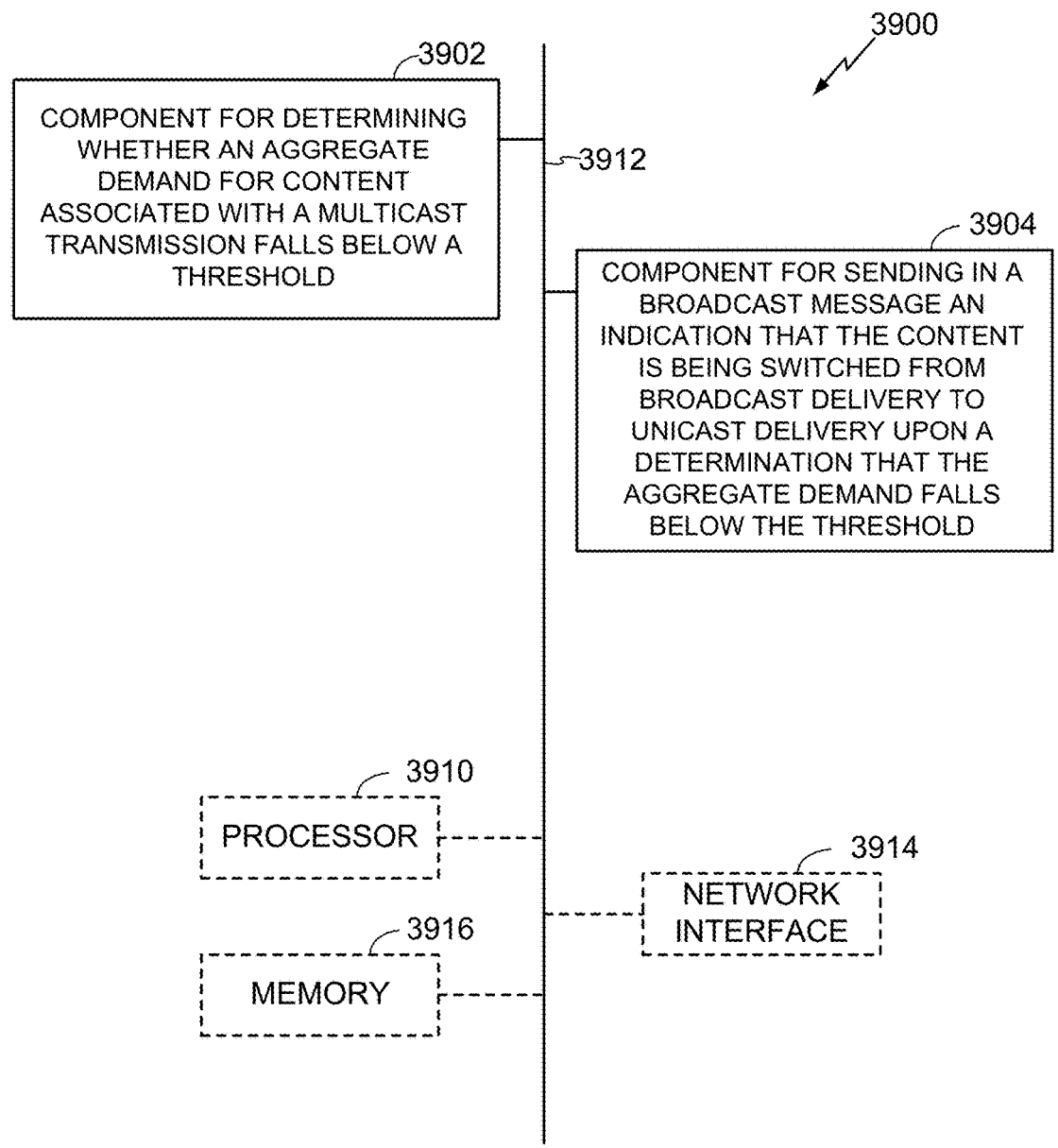
FIG. 39 illustrates an embodiment of another apparatus for implementing a demand-based multicast service, in accordance with the methodology of FIG. 38.

FIG. 39 shows another embodiment of an apparatus for implementing a demand-based multicast service in a wireless communication system, in accordance with the methodology of FIG. 38. With reference to FIG. 39, there is provided an exemplary apparatus 3900 that may be configured as a P-GW or BM-SC component, or as a processor or similar device/component for use within one of the devices. The apparatus 3900 may include functional blocks that can represent functions implemented by a processor, software, hardware, or combination thereof (e.g., firmware). For example, apparatus 3900 may include a component or module 3902 for determining whether an aggregate demand for content associated with a multicast transmission falls below a threshold. The apparatus 3900 may also include a component or module 3904 for sending in a broadcast message an indication that the content is being switched from broadcast delivery to unicast delivery upon a determination that the aggregate demand falls below the threshold.

In related aspects, the apparatus 3900 may optionally include a processor component 3910 having at least one processor, in the case of the apparatus 3900 configured as a P-GW or BM-SC, rather than as a processor. The processor 3910, in such case, may be in operative communication with the components 3902-3904 via a bus 3912 or similar communication coupling. The processor 3910 may effect initiation and scheduling of the processes or functions performed by electrical components 3902-3904.

In further related aspects, the apparatus 3900 may include a signaling component 3914. The apparatus 3900 may optionally include a component for storing information, such as, for example, a memory device/component 3916. The computer readable medium or the memory component 3916 may be operatively coupled to the other components of the apparatus 3900 via the bus 3912 or the like. The memory component 3916 may be adapted to store computer readable instructions and data for effecting the processes and behavior of the components 3902-3904, and subcomponents thereof, or the processor 3910, or the methods disclosed herein. The memory component 3916 may retain instructions for executing functions associated with the components 3902-3904. While shown as being external to the memory component 3916, it is to be understood that the components 3902-3904 can exist within the memory component 3916. It is further noted that the components in FIG. 39 may comprise processors, electronic devices, hardware devices, electronic sub-components, logical circuits, memories, software codes, firmware codes, etc., or any combination thereof.

In other embodiments, a MBSFN areaID may also be reported as location information. A location (CGI/MBSFN areaID) may be included only in an MPD fetch. The UE 602 may create a unique content ID for each MPD. The UE 602 reports the same content ID for every segment fetched from a particular MPD so the HARD module may determine the MPD from the content ID. In this case, the HARD module may avoid inspecting or parsing the MPD to determine which segment fetch corresponds to which content MPD because the HARD module knows the content MPD from the content ID. The MSK may be included in the redirection signaling message to speed up transition from UC reception of a content to BC reception of the content. When the UE 602 transitions to receiving content through delivery via broadcast transmissions, the UE 602 may need to obtain the MSK. When the MSK is included in the redirection signaling message, fewer steps are needed, because the UE 602 may not need to separately request the MSK and receive the MSK in a separate message. Different MPDs may be used to describe UC content and BC content. For example, one MPD may describe the content delivered via unicast transmission, and another MPD may describe the content delivered via broadcast transmission. If different MPDs are used to describe the UC content and the BC content, the UE 602 may not be aware of the mapping between the two MPDs. An indication may be needed for the UE 602 to determine the mapping between the UC MPD and BC MPD so that the UE 602 can switch between UC reception of a content and BC reception of the content. In one aspect, the mapping information may be included in the UC MPD, such as a BC MPD URL reference included in the UC MPD. In another aspect, a service announcement may provide the mapping information between the UC MPD and BC MPD.

Figure 40:
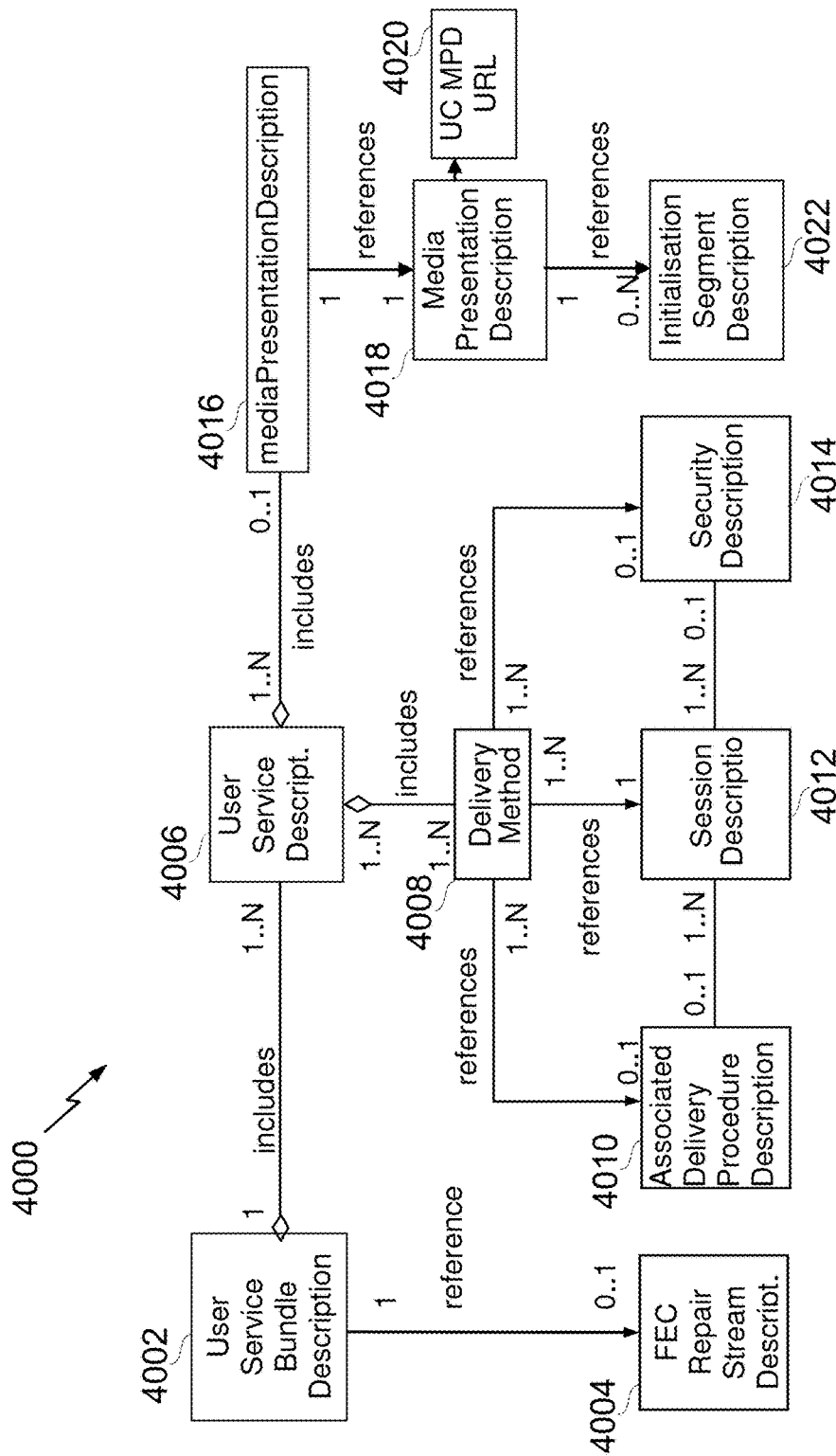
FIG. 40 illustrates a relational mapping for data elements of a user service bundle.

FIG. 40 illustrates a relational mapping for data elements of a user service bundle, for example, as used in the call flow of FIG. 30. The unicast and broadcast transmissions may or may not use a common MPD. FIG. 40 illustrates relationships between data elements. Each data element may be a data structure. When a first data element includes a second data element, the two data elements may be included in the same data structure, as in-line elements. When a first data element references a second data element, a link or reference pointer to the second data element may be included in the data structure of the first data element. The data elements may be related in a one-to-one relationship, one-to-many relationship, or many-to-many relationship.

A user service bundle description 4002 is illustrated including user service descriptions 4006, and optionally including a reference to a forward error correction (FEC) repair stream description 4004. The user service description 4006 optionally includes a mediaPresentationDescription 4016 and includes delivery methods 4008. The delivery method 4008 includes a reference to a session description 4012, and optionally includes references to an associated delivery procedure description 4010 and a security description 4014. The session description 4012 may be related to the associated delivery procedure description 4010 and security description 4014. The mediaPresentationDescription 4016 includes a reference to a media presentation description MPD 4018. The MPD 4018 may include a UC MPD URL 4020 and references to initialization segment descriptions 4022.

Figure 41A:
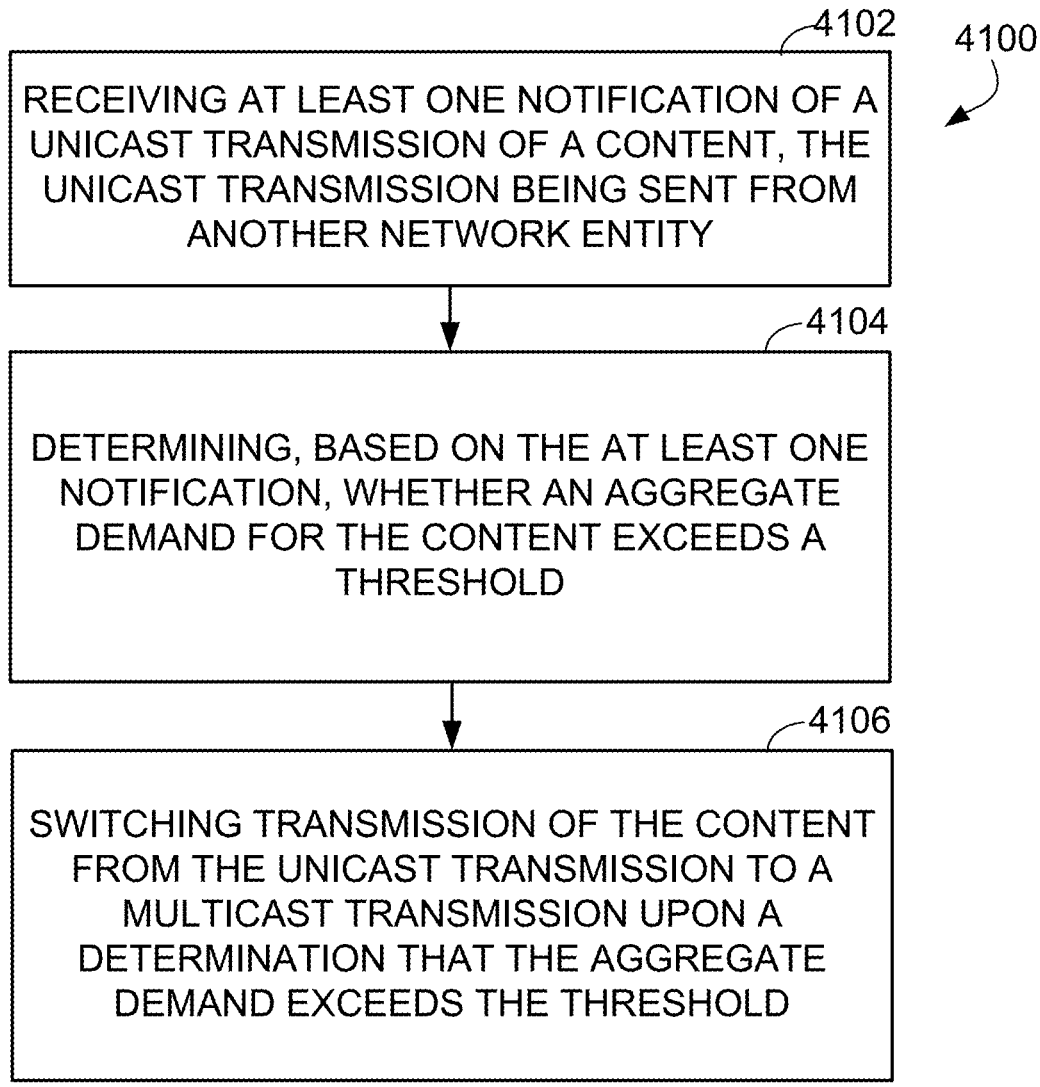
FIGS. 41A-B illustrate embodiments of a methodology for implementing a demand-based multicast service in a wireless communication system using an simplified HARD (S-HARD) module.

In accordance with one or more aspects of the embodiments described herein, with reference to FIG. 41A, there is shown a methodology 4100, operable by an apparatus, such as for example, a BM-SC or a BM-SC including an S-HARD module. The method is not limited to performance by the BM-SC or BM-SC and/or S-HARD module, and may be performed by any network entity or combination of entities for which the defined operations are possible and/or permitted by applicable standards. The method 4100 may include, at 4102, receiving at least one notification of a unicast transmission of a content, the unicast transmission being sent from another network entity. The method 4100 may further include, at 4104, determining, based on the at least one notification, whether an aggregate demand for the content exceeds a threshold. The method 4100 may further include, at 4106, switching transmission of the content from the unicast transmission to a multicast transmission upon a determination that the aggregate demand exceeds the threshold.

Figure 41B:
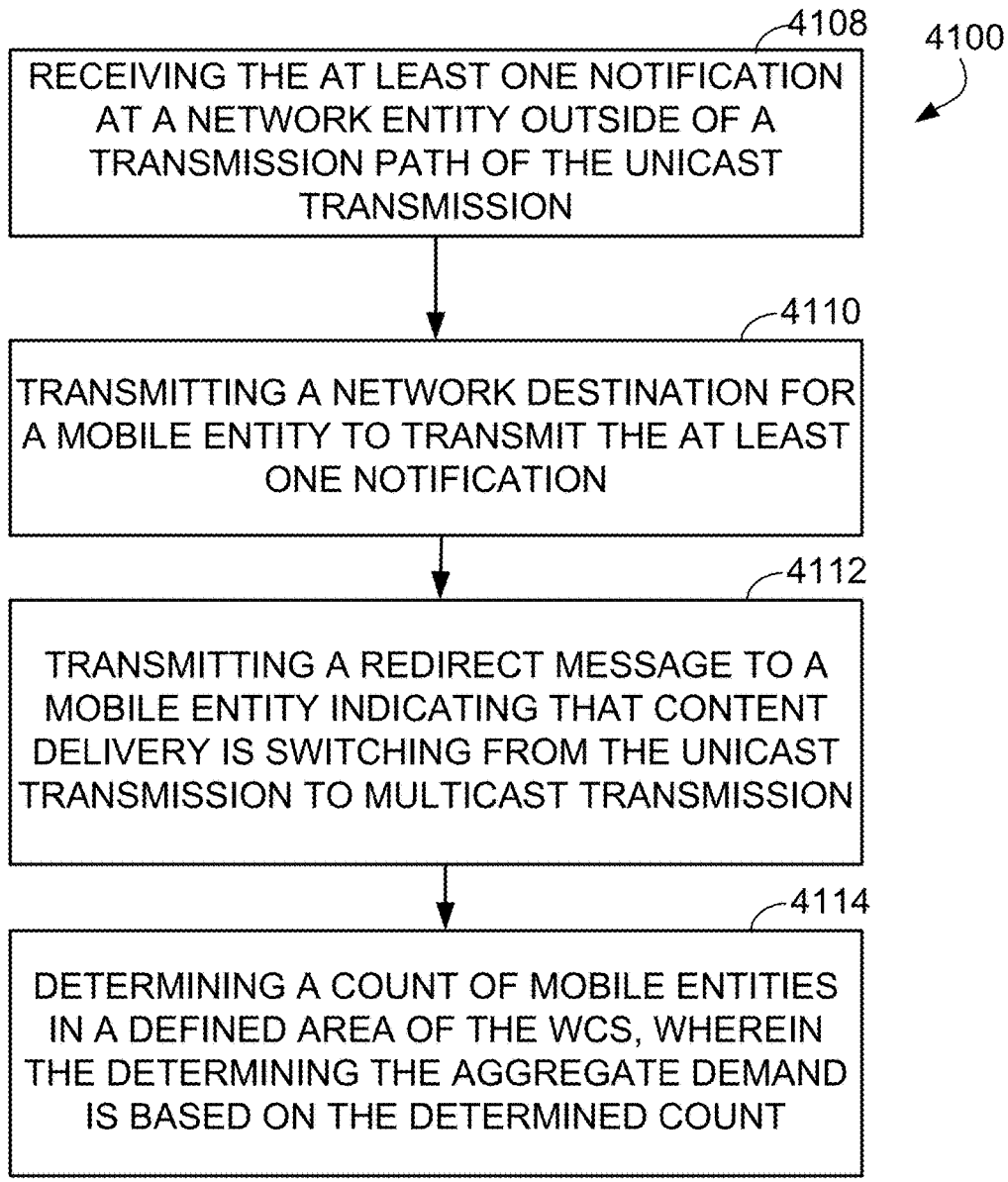

With reference to FIG. 41B, there are shown further optional operations or aspects of the method 4100. If the method 4100 includes at least one block of FIG. 41B, then the method 4100 may terminate after the at least one block, without including any subsequent downstream block(s). It is further noted that numbers of the blocks do not imply a particular order in which the blocks may be performed according to the method 4100. For example, the method 4100 may further include receiving the at least one notification at a network entity outside of a transmission path of the unicast transmission (block 4108), transmitting a network destination for a mobile entity to transmit the at least one notification (block 4110), transmitting a redirect message to a mobile entity indicating that content delivery is switching from the unicast transmission to multicast transmission (block 4112), and determining a count of mobile entities in a defined area of the WCS, wherein the determining the aggregate demand is based on the determined count (block 4114).

Figure 42:
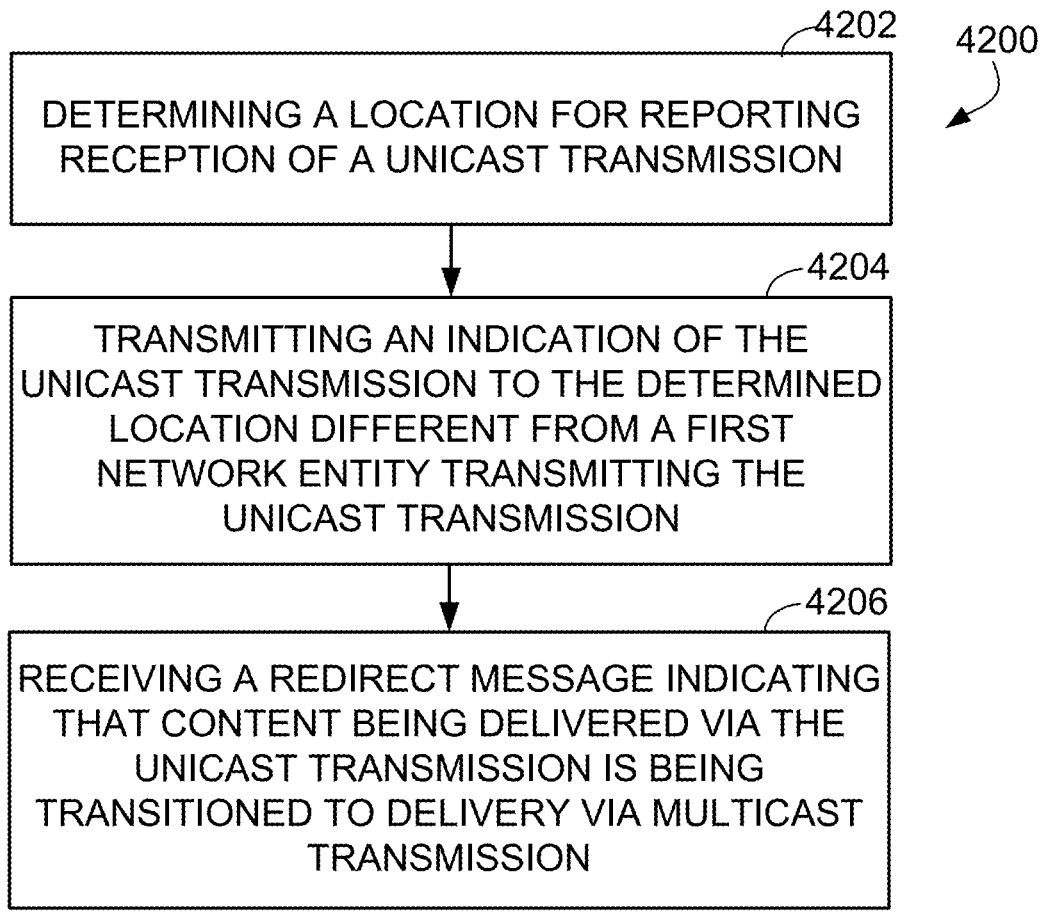
FIG. 42 illustrates embodiments of a methodology for implementing UE-based solution for demand-based multicast service in a wireless communication system.

In accordance with one or more aspects of the embodiments described herein, with reference to FIG. 42, there is shown a methodology 4200, operable by an apparatus, such as for example, the UE. The method is not limited to performance by the UE, and may be performed by any mobile entity or combination of entities for which the defined operations are possible and/or permitted by applicable standards. The method 4200 may include, at 4202, determining a location for reporting reception of a unicast transmission. The method 4200 may further include, at 4204, transmitting an indication of the unicast transmission to the determined location different from a first network entity transmitting the unicast transmission. The method 4200 may further include, at 4206, receiving a redirect message indicating that content being delivered via the unicast transmission is being transitioned to delivery via multicast transmission.

Figure 43A:
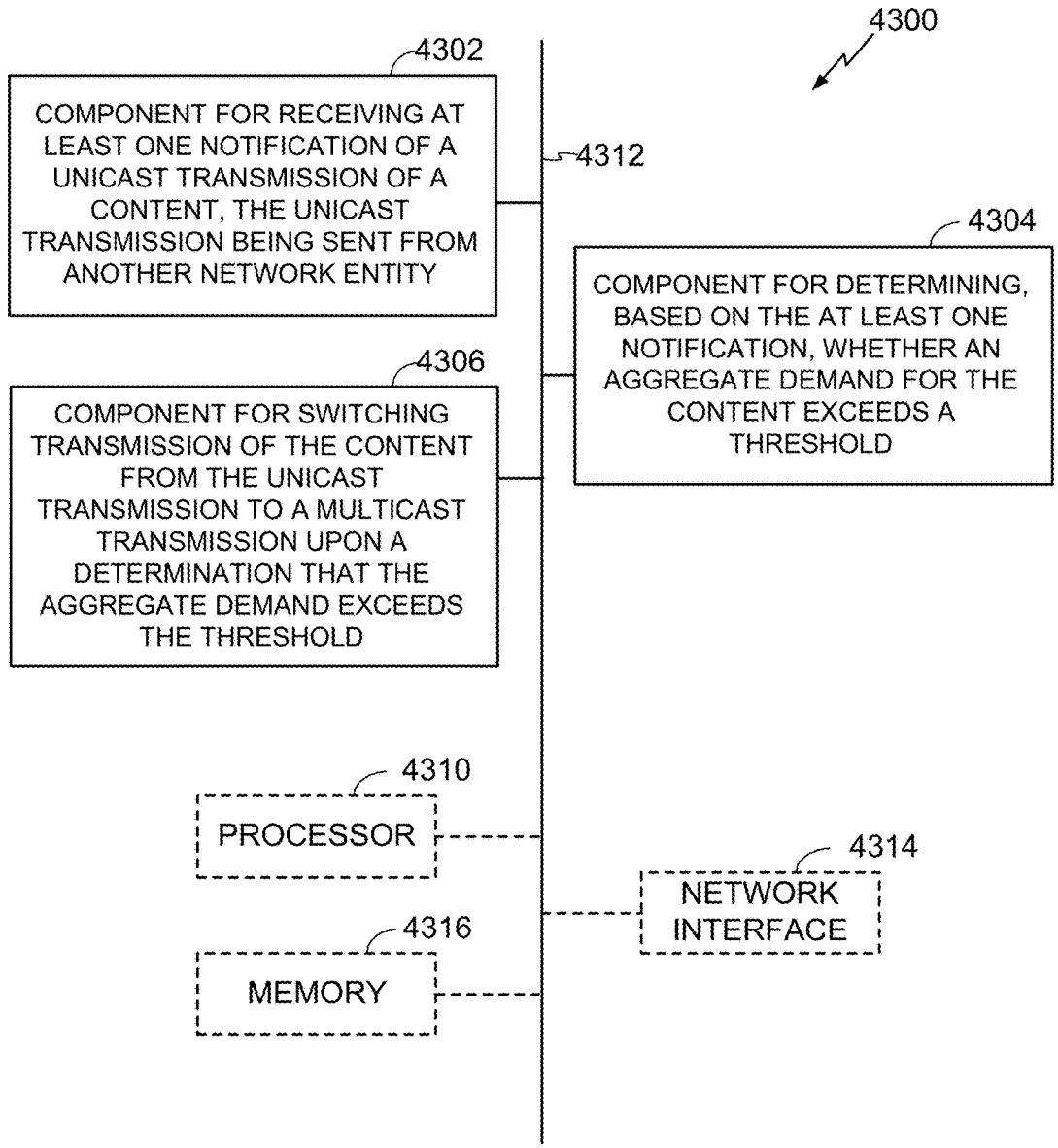
FIGS. 43A-B illustrate embodiments of an apparatus for implementing a demand-based multicast service, in accordance with the methodologies of FIGS. 41A-B.

FIG. 43A shows an embodiment of an apparatus for implementing a demand-based multicast service in a wireless communication system, in accordance with the methodologies of FIGS. 41A-B. With reference to FIG. 43A, there is provided an exemplary apparatus 4300 that may be configured as a BM-SC and/or S-HARD module, or as a processor or similar device/component for use within the device. The apparatus 4300 may include functional blocks that can represent functions implemented by a processor, software, hardware, or combination thereof (e.g., firmware). The functional blocks may be implemented by the processor 4310 and/or network interface 4314. The network interface 4314 may be a transmitter, receiver, or transceiver. The functional blocks may be implemented by the processor 4310 and/or network interface 4314 coupled to the memory component 4316. For example, apparatus 4300 may include a component or module 4302 for receiving at least one notification of a unicast transmission of a content, the unicast transmission being sent from another network entity. The component or module 4302 may be performed by the processor 4310 and/or network interface 4314. The apparatus 4300 may also include a component or module 4304 for determining, based on the at least one notification, whether an aggregate demand for the content exceeds a threshold. The apparatus 4300 may also include a component or module 4306 for switching transmission of the content from the unicast transmission to a multicast transmission upon a determination that the aggregate demand exceeds the threshold.

In related aspects, the apparatus 4300 may optionally include a processor component 4310 having at least one processor, in the case of the apparatus 4300 configured as a BM-SC, rather than as a processor. The processor 4310, in such case, may be in operative communication with the components 4302-4306 via a bus 4312 or similar communication coupling. The processor 4310 may effect initiation and scheduling of the processes or functions performed by electrical components 4302-4306.

In further related aspects, the apparatus 4300 may include a signaling component 4314. The apparatus 4300 may optionally include a component for storing information, such as, for example, a memory device/component 4316. The computer readable medium or the memory component 4316 may be operatively coupled to the other components of the apparatus 4300 via the bus 4312 or the like. The memory component 4316 may be adapted to store computer readable instructions and data for effecting the processes and behavior of the components 4302-4306, and subcomponents thereof, or the processor 4310, or the methods disclosed herein. The memory component 4316 may retain instructions for executing functions associated with the components 4302-4306. While shown as being external to the memory component 4316, it is to be understood that the components 4302-4306 can exist within the memory component 4316. It is further noted that the components in FIG. 43A may comprise processors, electronic devices, hardware devices, electronic sub-components, logical circuits, memories, software codes, firmware codes, etc., or any combination thereof.

Figure 43B:
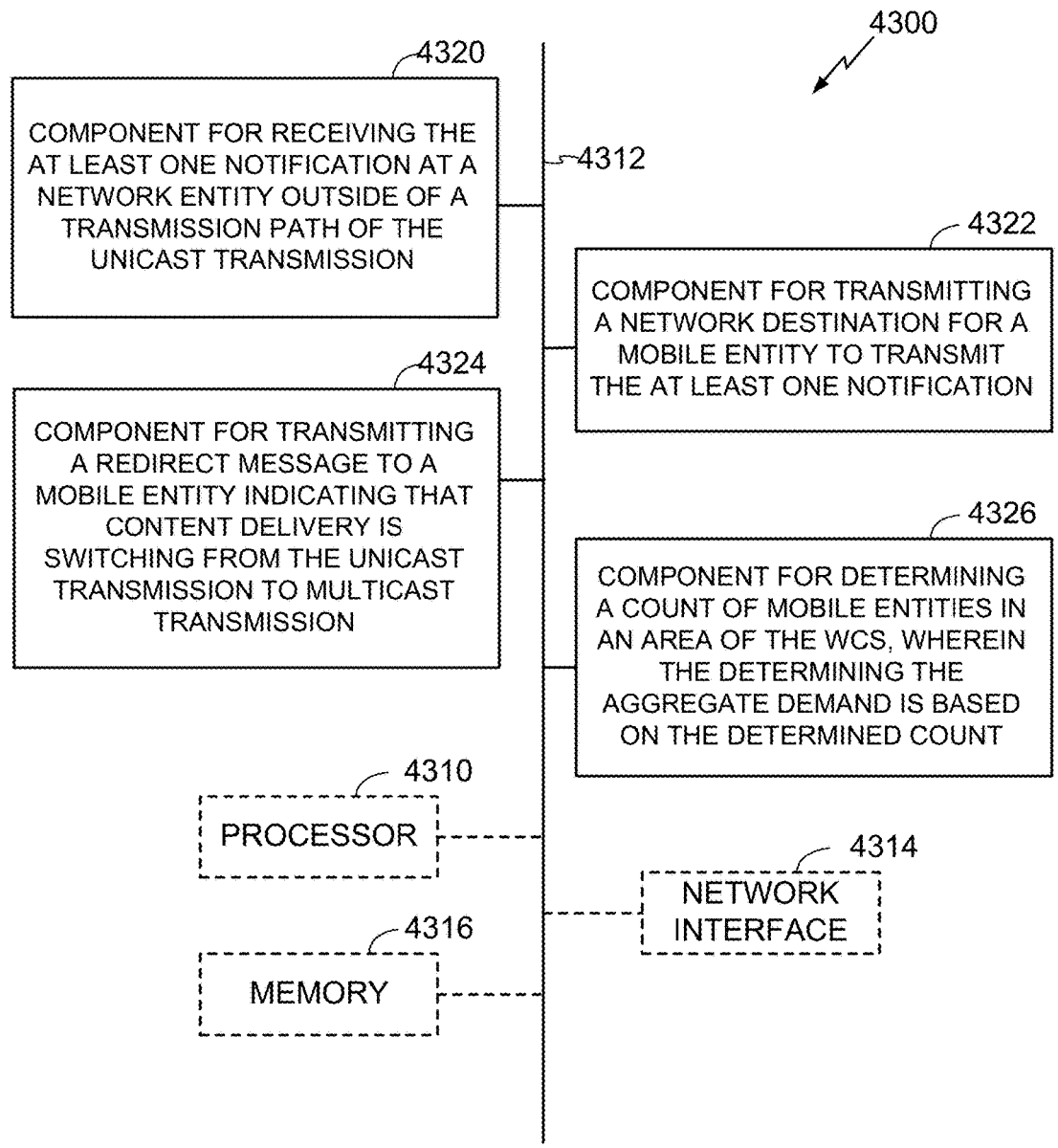

With reference to FIG. 43B, there are shown further optional components or modules of the apparatus 4300. For example, the apparatus 4300 may further include a component or module 4320 for receiving the at least one notification at a network entity outside of a transmission path of the unicast transmission. For example, the apparatus 4300 may further include a component or module 4322 for transmitting a network destination for a mobile entity to transmit the at least one notification. The component or module 4322 may be performed by the processor 4310 and/or network interface 4314. The apparatus 4300 may further include a component or module 4324 for transmitting a redirect message to a mobile entity indicating that content delivery is switching from the unicast transmission to multicast transmission. The apparatus 4300 may further include a component or module 4326 for determining a count of mobile entities in an area of the WCS, wherein the determining the aggregate demand is based on the determined count.

Figure 44:
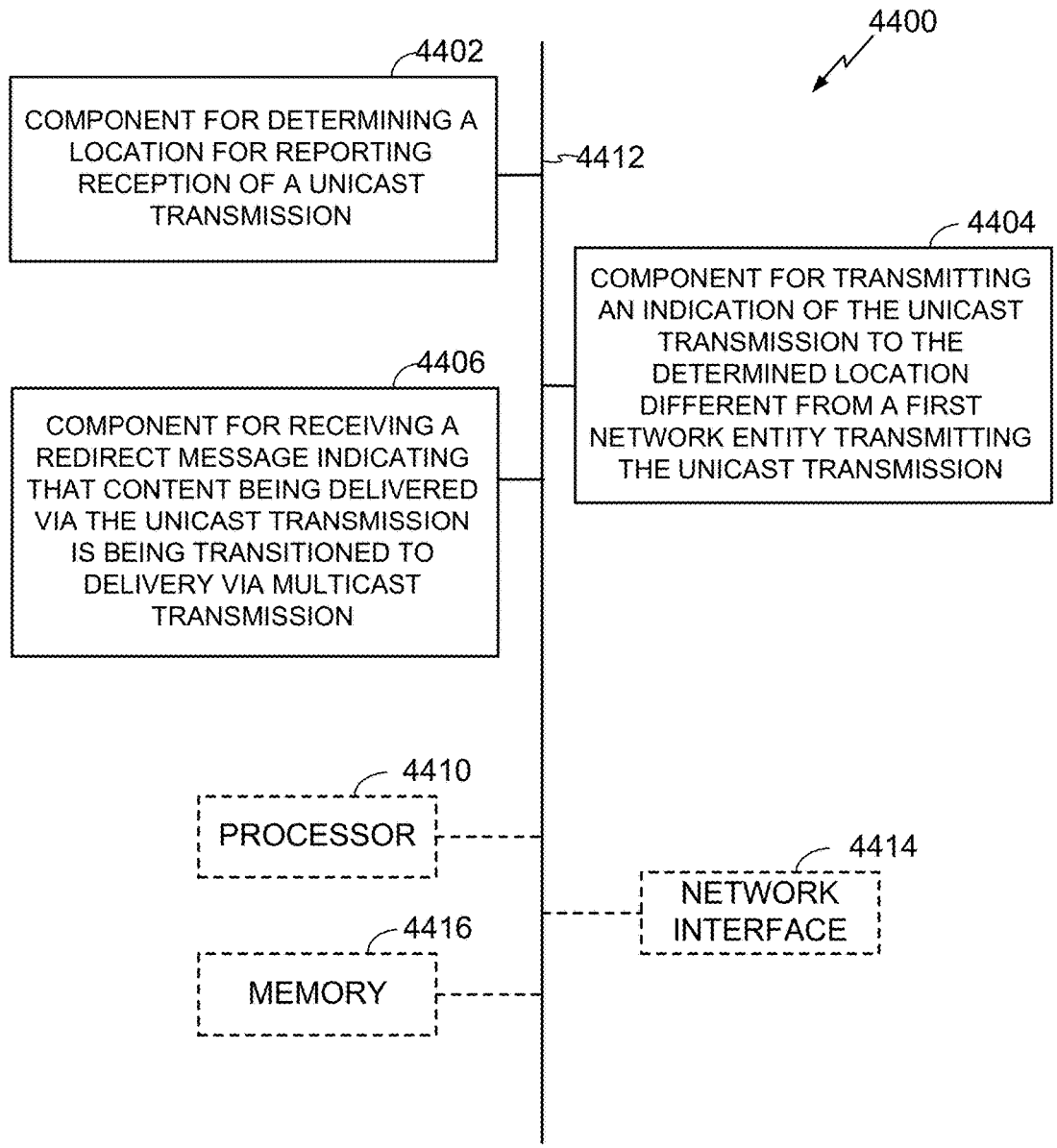
FIG. 44 illustrates an embodiment of an apparatus for implementing a demand-based multicast service, in accordance with the methodology of FIG. 42.

FIG. 44 shows an embodiment of an apparatus for implementing a demand-based multicast service in a wireless communication system, in accordance with the methodology of FIG. 42. With reference to FIG. 44, there is provided an exemplary apparatus 4400 that may be configured as a UE, or as a processor or similar device/component for use within the device. The apparatus 4400 may include functional blocks that can represent functions implemented by a processor, software, hardware, or combination thereof (e.g., firmware). The functional blocks may be implemented by the processor 4410 and/or network interface 4414. The network interface 4414 may be a transmitter, receiver, or transceiver. The functional blocks may be implemented by the processor 4410 and/or network interface 4414 coupled to the memory 4416. For example, apparatus 4400 may include a component or module 4402 for determining a location for reporting reception of a unicast transmission. The apparatus 4400 may also include a component or module 4404 for transmitting an indication of the unicast transmission to the determined location different from a first network entity transmitting the unicast transmission. The component or module 4404 may be performed by the processor 4410 and/or network interface 4414. The apparatus 4400 may also include a component or module 4406 for receiving a redirect message indicating that content being delivered via the unicast transmission is being transitioned to delivery via multicast transmission. The component or module 4406 may be performed by the processor 4410 and/or network interface 4414.

Figure 45:
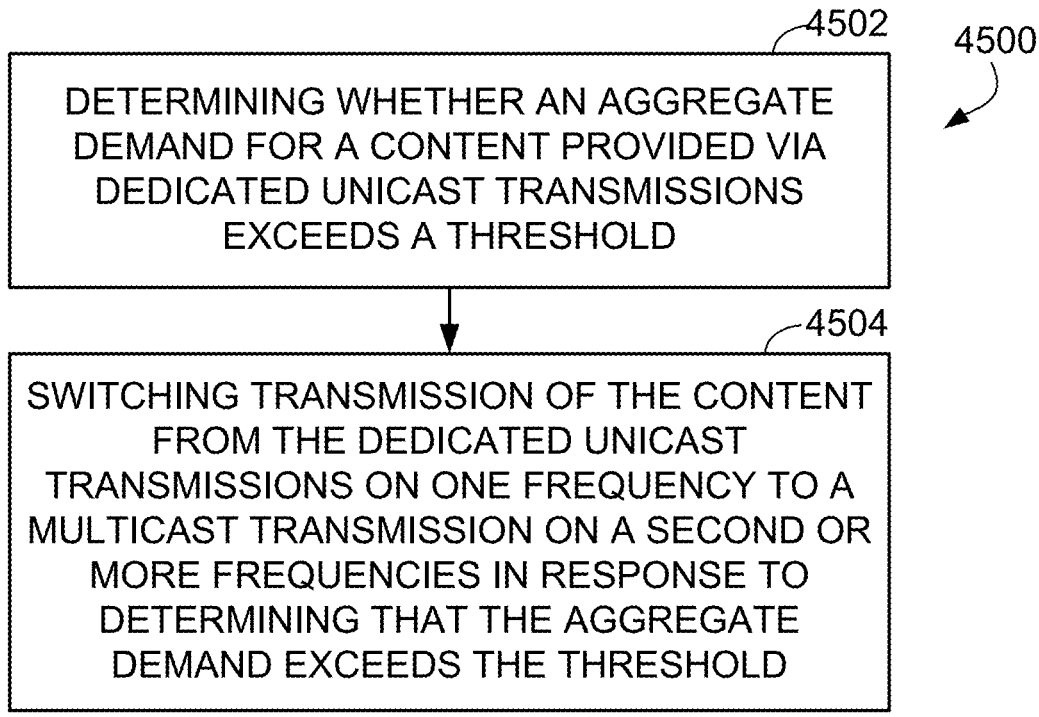
FIG. 45 illustrates an embodiment of a methodology for implementing switching between UC and BC in a multi-band/multi-frequency wireless communication system.

In accordance with one or more aspects of the embodiments described herein, with reference to FIG. 45, there is shown a methodology 4500, operable by an apparatus, such as for example, a P-GW or a BM-SC including a HARD module. The method is not limited to performance by the P-GW or BM-SC and/or HARD module, and may be performed by any network entity or combination of entities for which the defined operations are possible and/or permitted by applicable standards. The method 4500 may include, at 4502, determining whether an aggregate demand for a content provided via dedicated unicast transmissions exceeds a threshold. The method 4500 may further include, at 4504, switching transmission of the content from the dedicated unicast transmissions on one frequency to a multicast transmission on a second or more frequencies in response to determining that the aggregate demand exceeds the threshold. For example, the one frequency and second frequency may be the same or different frequencies.

Figure 46:
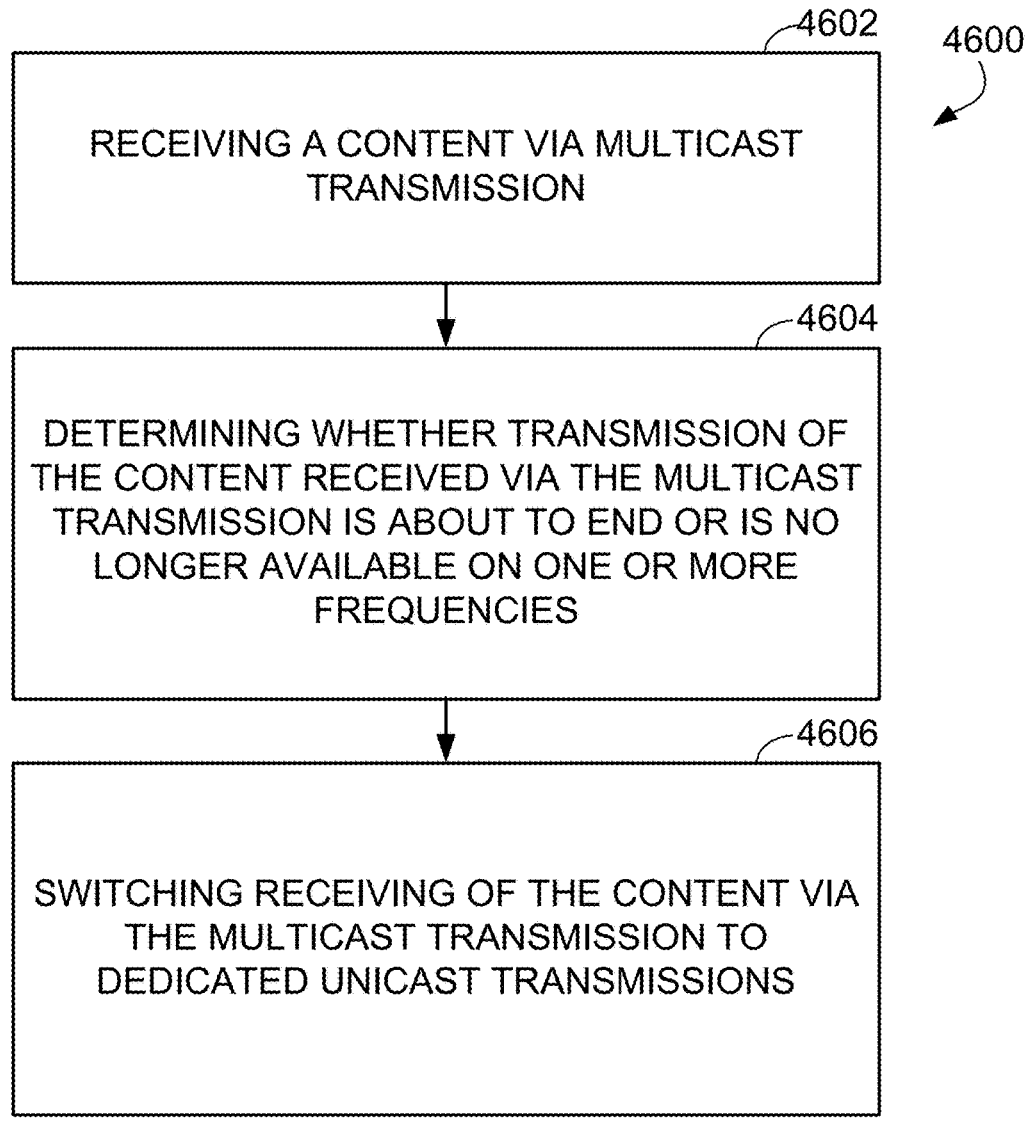
FIG. 46 illustrates an embodiment of a methodology for implementing switching between UC and BC by a UE.

In accordance with one or more aspects of the embodiments described herein, with reference to FIG. 46, there is shown a methodology 4600, operable by an apparatus, such as for example, a P-GW or a BM-SC including a HARD module. The method is not limited to performance by the P-GW or BM-SC and/or HARD module, and may be performed by any network entity or combination of entities for which the defined operations are possible and/or permitted by applicable standards. The method 4600 may include, at 4602, receiving a content via multicast transmission. The method 4600 may further include, at 4604, determining whether transmission of the content received via the multicast transmission is about to end or is no longer available on one or more frequencies. The method 4600 may further include, at 4606, switching receiving of the content via the multicast transmission to dedicated unicast transmissions.

Figure 47:
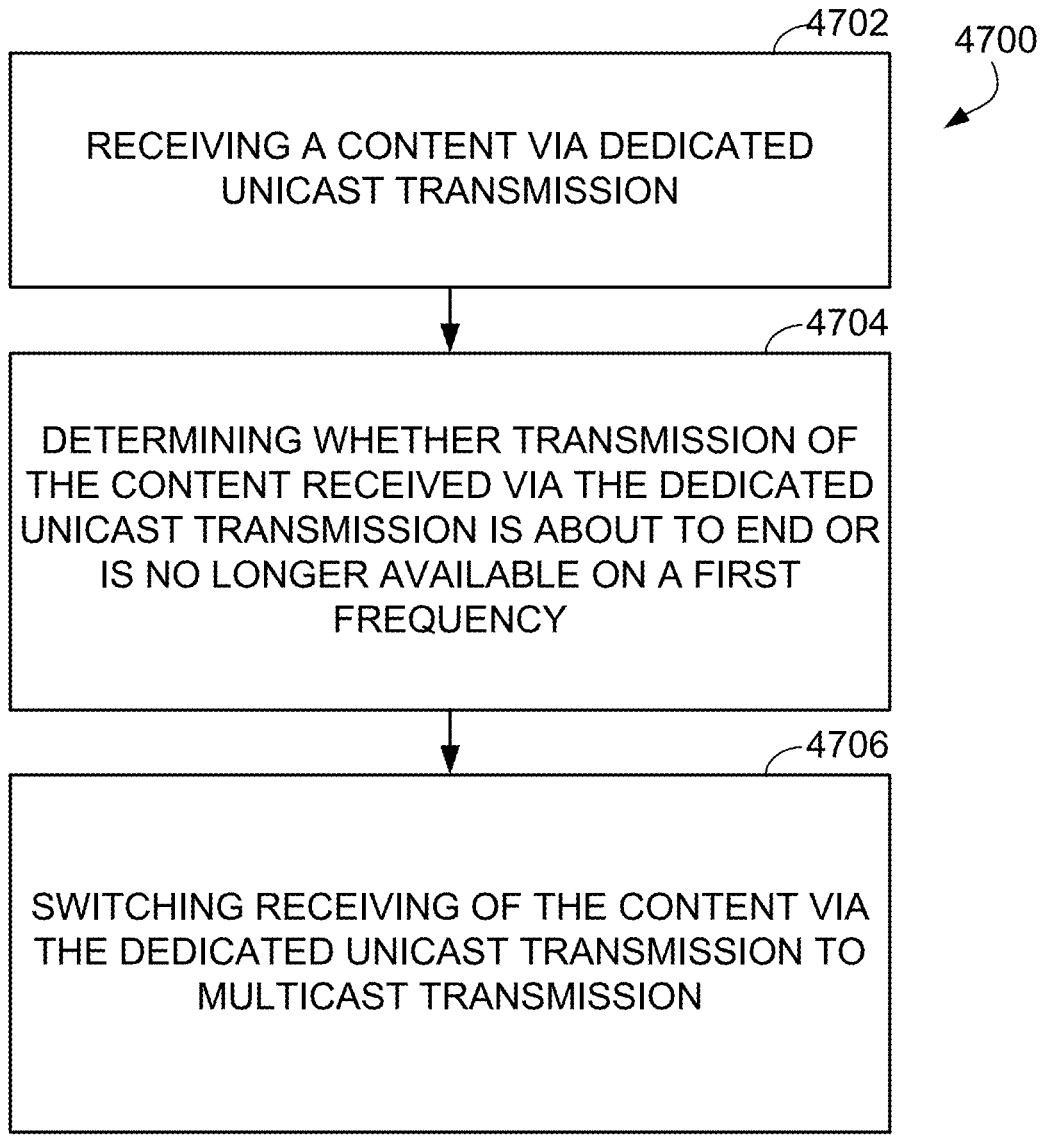
FIG. 47 illustrates another embodiment of a methodology for implementing switching between UC and BC by a UE.

In accordance with one or more aspects of the embodiments described herein, with reference to FIG. 47, there is shown a methodology 4700, operable by an apparatus, such as for example, the UE. The method is not limited to performance by the UE, and may be performed by any mobile entity or combination of entities for which the defined operations are possible and/or permitted by applicable standards. The method 4700 may include, at 4702, receiving a content via dedicated unicast transmission. The method 4700 may further include, at 4704, determining whether transmission of the content received via the dedicated unicast transmission is about to end or is no longer available on a first frequency. The method 4700 may further include, at 4706, switching receiving of the content via the dedicated unicast transmission to multicast transmission.

Figure 48:
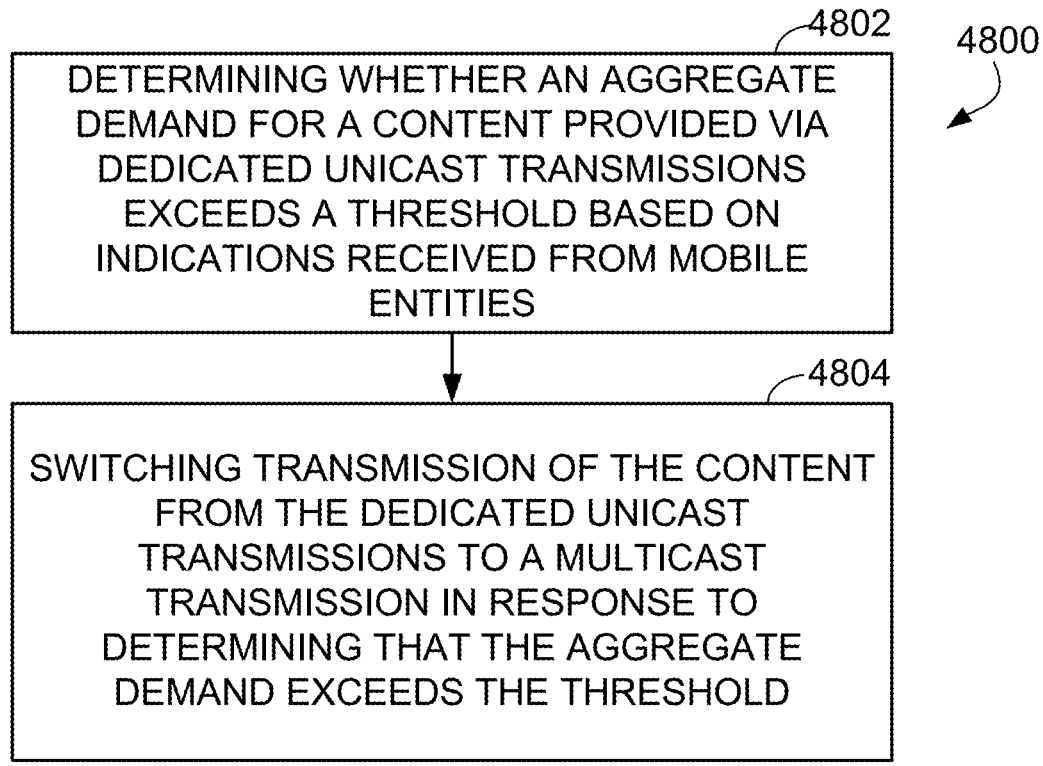
FIG. 48 illustrates an embodiment of a methodology for signaling and network support for implementing switching between UC and BC.

In accordance with one or more aspects of the embodiments described herein, with reference to FIG. 48, there is shown a methodology 4800, operable by an apparatus, such as for example, a P-GW or a BM-SC including a HARD module. The method is not limited to performance by the P-GW or BM-SC and/or HARD module, and may be performed by any network entity or combination of entities for which the defined operations are possible and/or permitted by applicable standards. The method 4800 may include, at 4802, determining whether an aggregate demand for a content provided via dedicated unicast transmissions exceeds a threshold based on indications received from mobile entities. The method 4800 may further include, at 4804, switching transmission of the content from the dedicated unicast transmissions to a multicast transmission in response to determining that the aggregate demand exceeds the threshold.

Figure 49:
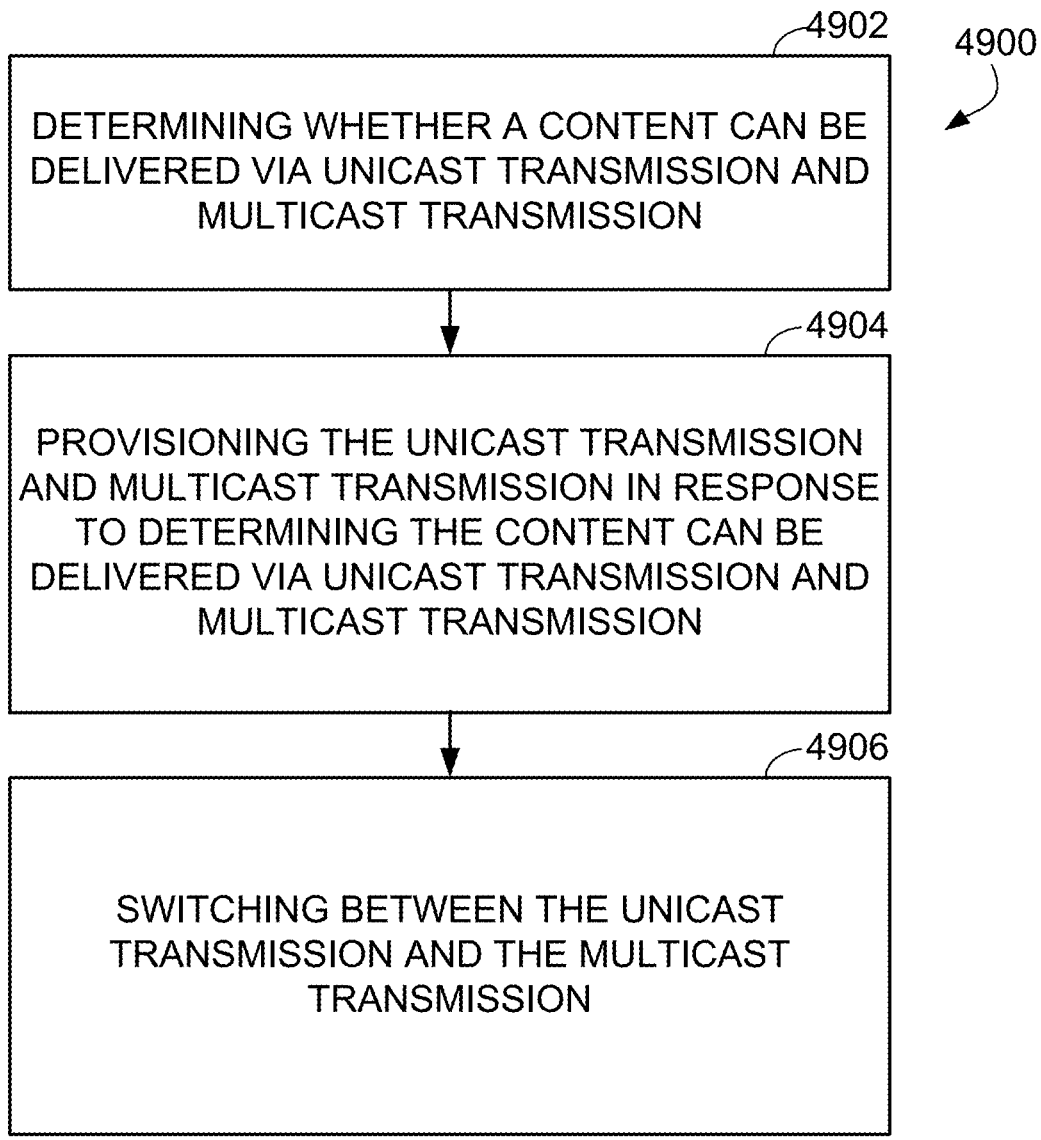
FIG. 49 illustrates an embodiment of a methodology for provisioning BC and UC services, and switching between the BC and UC services.

In accordance with one or more aspects of the embodiments described herein, with reference to FIG. 49, there is shown a methodology 4900, operable by an apparatus, such as for example, a P-GW or a BM-SC including a HARD module. The method is not limited to performance by the P-GW or BM-SC and/or HARD module, and may be performed by any network entity or combination of entities for which the defined operations are possible and/or permitted by applicable standards. The method 4900 may include, at 4902, determining whether a content can be delivered via unicast transmission and multicast transmission. The method 4900 may further include, at 4904, provisioning the unicast transmission and multicast transmission in response to determining the content can be delivered via unicast transmission, multicast transmission, or both. The method 4900 may further include, at 4906, switching between the unicast transmission and the multicast transmission.

Figure 50:
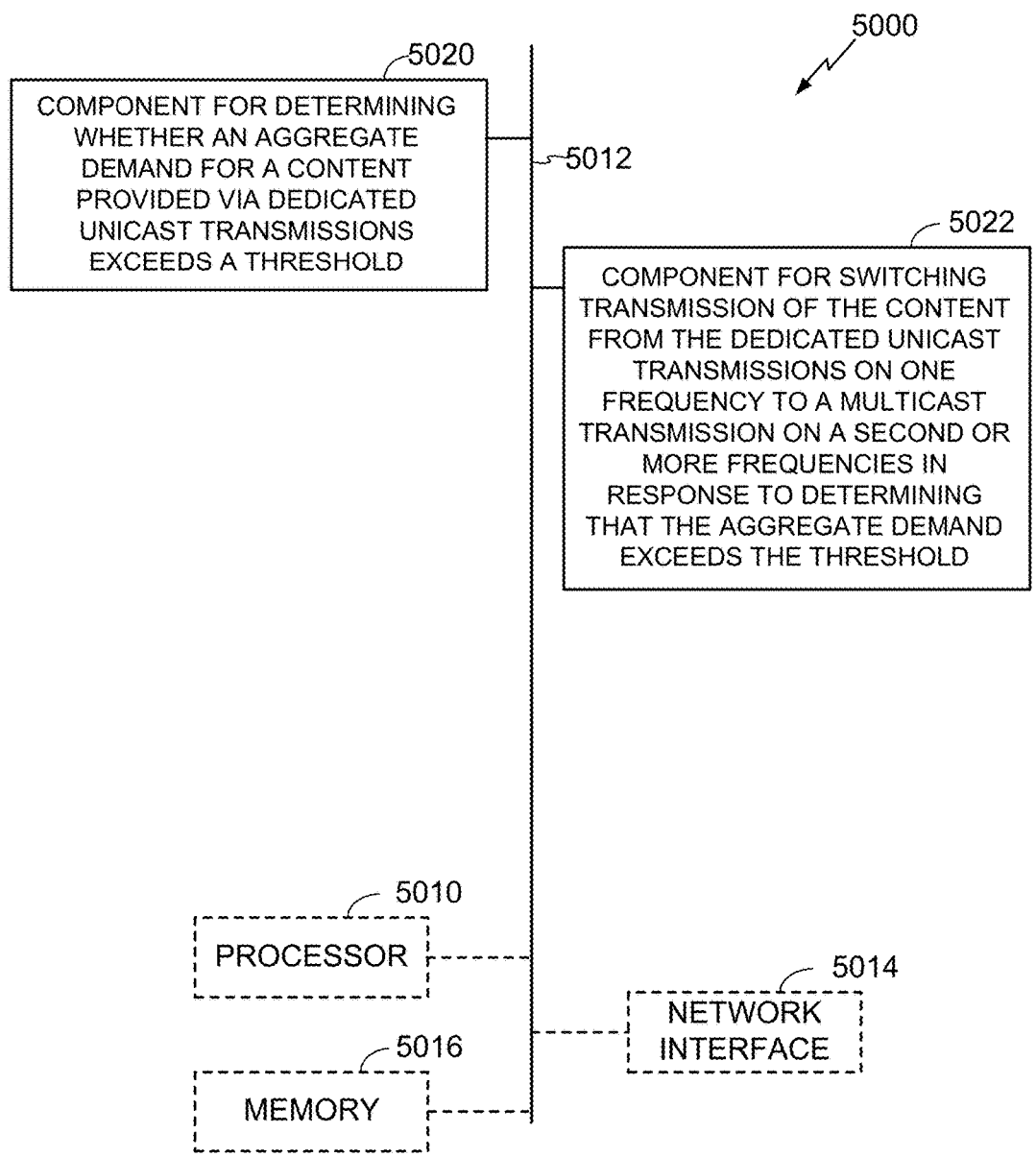
FIG. 50 illustrates an embodiment of an apparatus for implementing switching between UC and BC in a multi-band/multi-frequency wireless communication system, in accordance with the methodology of FIG. 45.

FIG. 50 shows an embodiment of an apparatus for implementing a demand-based multicast service in a wireless communication system, in accordance with the methodology of FIG. 45. With reference to FIG. 50, there is provided an exemplary apparatus 5000 that may be configured as a P-GW or BM-SC component, or as a processor or similar device/component for use within one of the devices. The apparatus 5000 may include functional blocks that can represent functions implemented by a processor, software, hardware, or combination thereof (e.g., firmware). For example, apparatus 5000 may include a component or module 5020 for determining whether an aggregate demand for a content provided via dedicated unicast transmissions exceeds a threshold. The apparatus 5000 may also include a component or module 5022 for switching transmission of the content from the dedicated unicast transmissions on one frequency to a multicast transmission on a second or more frequencies in response to determining that the aggregate demand exceeds the threshold.

In related aspects, the apparatus 5000 may optionally include a processor component 5010 having at least one processor, in the case of the apparatus 5000 configured as a P-GW or BM-SC, rather than as a processor. The processor 5010, in such case, may be in operative communication with the components 5020-5022 via a bus 5012 or similar communication coupling. The processor 5010 may effect initiation and scheduling of the processes or functions performed by electrical components 5020-5022.

In further related aspects, the apparatus 5000 may include a signaling component 5014. The apparatus 5000 may optionally include a component for storing information, such as, for example, a memory device/component 5016. The computer readable medium or the memory component 5016 may be operatively coupled to the other components of the apparatus 5000 via the bus 5012 or the like. The memory component 5016 may be adapted to store computer readable instructions and data for effecting the processes and behavior of the components 5020-5022, and subcomponents thereof, or the processor 5010, or the methods disclosed herein. The memory component 5016 may retain instructions for executing functions associated with the components 5020-5022. While shown as being external to the memory component 5016, it is to be understood that the components 5020-5022 can exist within the memory component 5016. It is further noted that the components in FIG. 50 may comprise processors, electronic devices, hardware devices, electronic sub-components, logical circuits, memories, software codes, firmware codes, etc., or any combination thereof.

Figure 51:
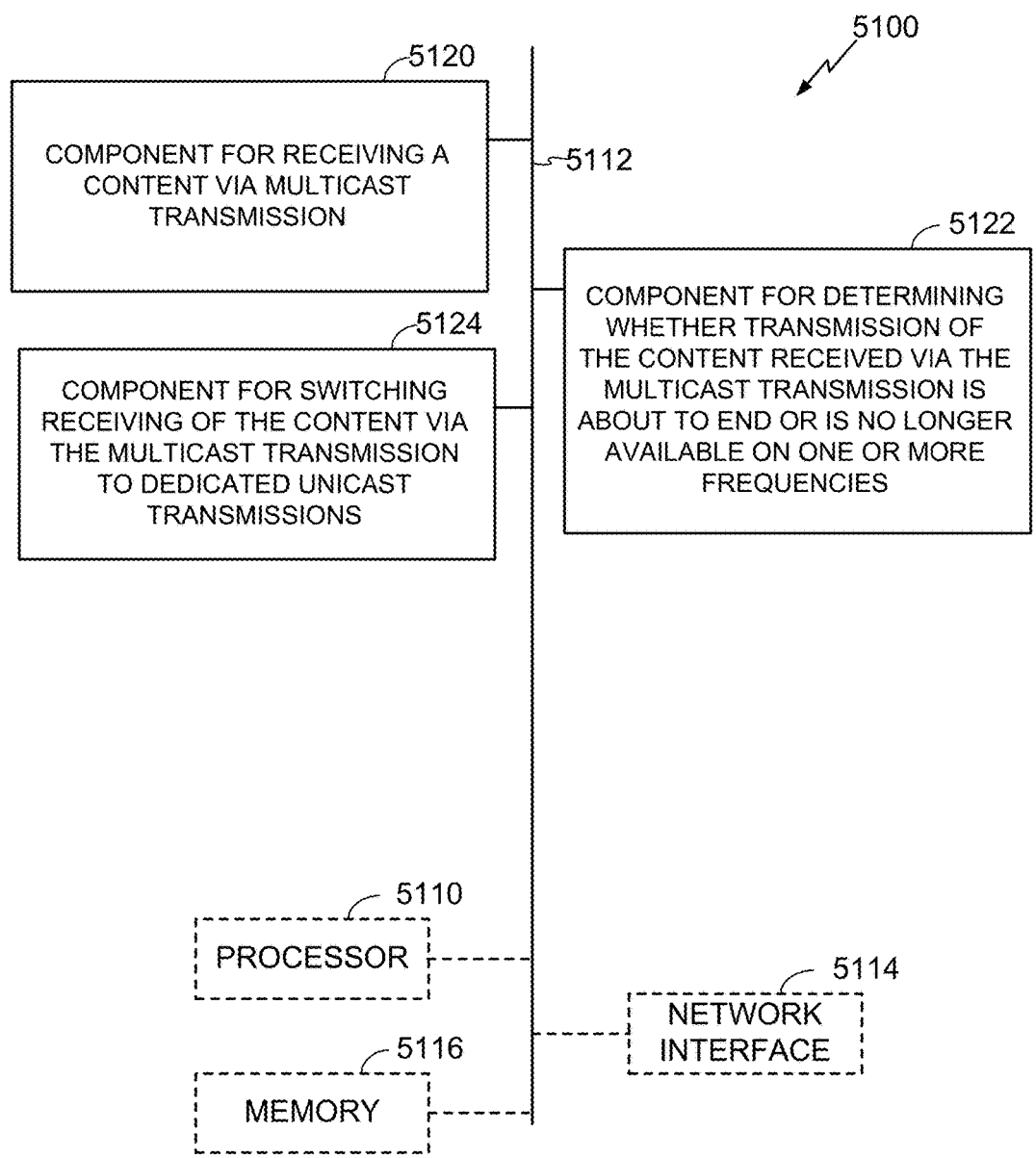
FIG. 51 illustrates an embodiment of an apparatus for implementing switching between UC and BC by a UE, in accordance with the methodology of FIG. 46.

FIG. 51 shows an embodiment of an apparatus for implementing a demand-based multicast service in a wireless communication system, in accordance with the methodology of FIG. 46. With reference to FIG. 51, there is provided an exemplary apparatus 5100 that may be configured as a UE, or as a processor or similar device/component for use within the device. The apparatus 5100 may include functional blocks that can represent functions implemented by a processor, software, hardware, or combination thereof (e.g., firmware). For example, apparatus 5100 may include a component or module 5120 for receiving a content via multicast transmission. The apparatus 5100 may also include a component or module 5122 for determining whether transmission of the content received via the multicast transmission is about to end or is no longer available on one or more frequencies. The apparatus 5100 may also include a component or module 5124 for switching receiving of the content via the multicast transmission to dedicated unicast transmissions.

In related aspects, the apparatus 5100 may optionally include a processor component 5110 having at least one processor, in the case of the apparatus 5100 configured as a P-GW or BM-SC, rather than as a processor. The processor 5110, in such case, may be in operative communication with the components 5120-5124 via a bus 5112 or similar communication coupling. The processor 5110 may effect initiation and scheduling of the processes or functions performed by electrical components 5120-5124.

In further related aspects, the apparatus 5100 may include a signaling component 5114. The apparatus 5100 may optionally include a component for storing information, such as, for example, a memory device/component 5116. The computer readable medium or the memory component 5116 may be operatively coupled to the other components of the apparatus 5100 via the bus 5112 or the like. The memory component 5116 may be adapted to store computer readable instructions and data for effecting the processes and behavior of the components 5120-5124, and subcomponents thereof, or the processor 5110, or the methods disclosed herein. The memory component 5116 may retain instructions for executing functions associated with the components 5120-5124. While shown as being external to the memory component 5116, it is to be understood that the components 5120-5124 can exist within the memory component 5116. It is further noted that the components in FIG. 51 may comprise processors, electronic devices, hardware devices, electronic sub-components, logical circuits, memories, software codes, firmware codes, etc., or any combination thereof.

Figure 52:
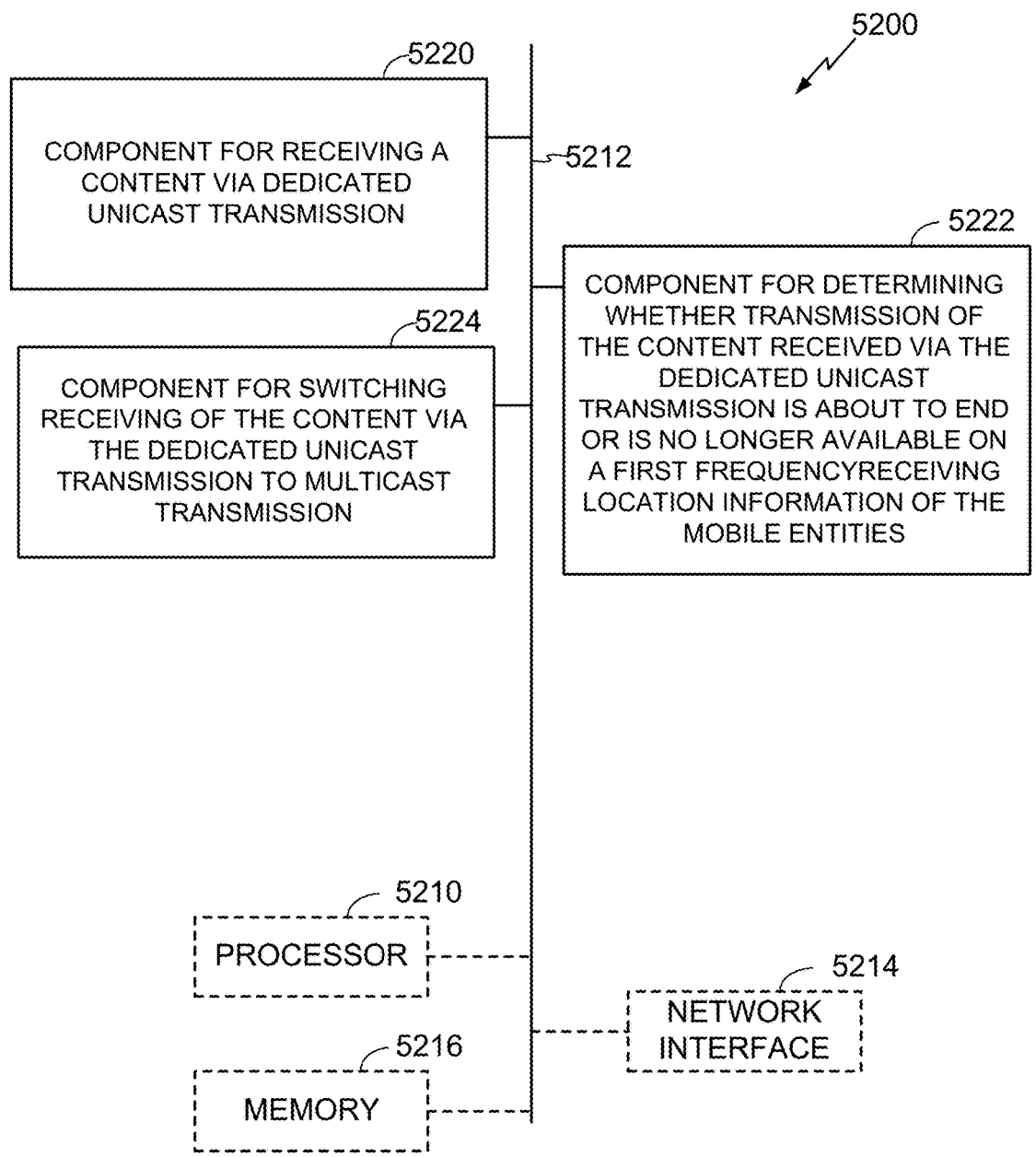
FIG. 52 illustrates another embodiment of an apparatus for implementing switching between UC and BC by a UE, in accordance with the methodology of FIG. 47.

FIG. 52 shows an embodiment of an apparatus for implementing a demand-based multicast service in a wireless communication system, in accordance with the methodology of FIG. 47. With reference to FIG. 52, there is provided an exemplary apparatus 5200 that may be configured as a UE, or as a processor or similar device/component for use within the UE. The apparatus 5200 may include functional blocks that can represent functions implemented by a processor, software, hardware, or combination thereof (e.g., firmware). For example, apparatus 5200 may include a component or module 5220 for receiving a content via dedicated unicast transmission. The apparatus 5200 may also include a component or module 5222 for determining whether transmission of the content received via the dedicated unicast transmission is about to end or is no longer available on a first frequency. The apparatus 5200 may also include a component or module 5224 for switching receiving of the content via the dedicated unicast transmission to multicast transmission.

In related aspects, the apparatus 5200 may optionally include a processor component 5210 having at least one processor, in the case of the apparatus 5200 configured as a UE, rather than as a processor. The processor 5210, in such case, may be in operative communication with the components 5220-5222 via a bus 5212 or similar communication coupling. The processor 5210 may effect initiation and scheduling of the processes or functions performed by electrical components 5220-5224.

In further related aspects, the apparatus 5200 may include a signaling component 5214. The apparatus 5200 may optionally include a component for storing information, such as, for example, a memory device/component 5216. The computer readable medium or the memory component 5216 may be operatively coupled to the other components of the apparatus 5200 via the bus 5212 or the like. The memory component 5216 may be adapted to store computer readable instructions and data for effecting the processes and behavior of the components 5220-5224, and subcomponents thereof, or the processor 5210, or the methods disclosed herein. The memory component 5216 may retain instructions for executing functions associated with the components 5220-5224. While shown as being external to the memory component 5216, it is to be understood that the components 5220-5224 can exist within the memory component 5216. It is further noted that the components in FIG. 52 may comprise processors, electronic devices, hardware devices, electronic sub-components, logical circuits, memories, software codes, firmware codes, etc., or any combination thereof.

Figure 53:
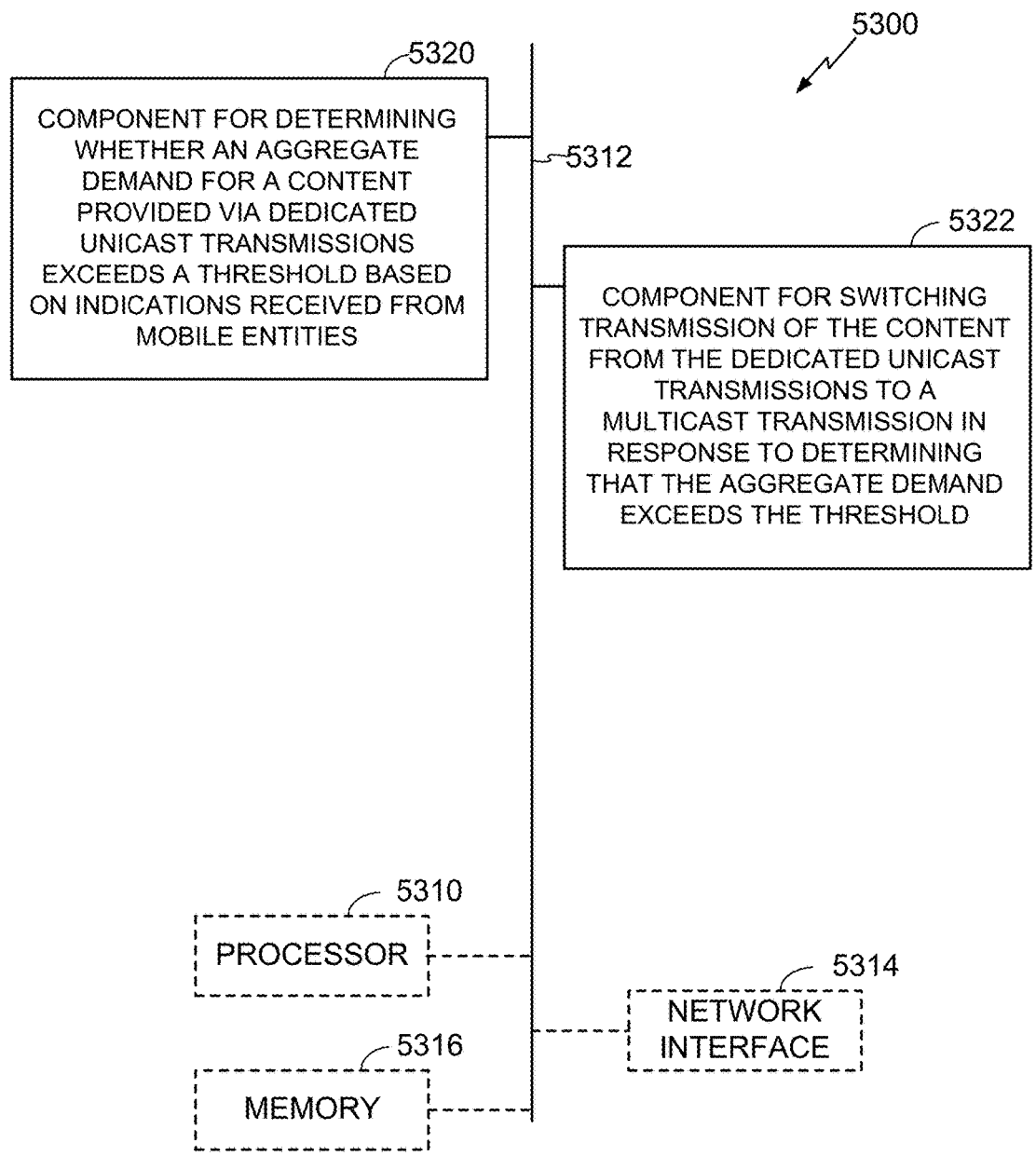
FIG. 53 illustrates an embodiment of an apparatus for signaling and network support for implementing switching between UC and BC, in accordance with the methodology of FIG. 48.

FIG. 53 shows an embodiment of an apparatus for implementing a demand-based multicast service in a wireless communication system, in accordance with the methodology of FIG. 48. With reference to FIG. 53, there is provided an exemplary apparatus 5300 that may be configured as a P-GW or BM-SC component, or as a processor or similar device/component for use within one of the devices. The apparatus 5300 may include functional blocks that can represent functions implemented by a processor, software, hardware, or combination thereof (e.g., firmware). For example, apparatus 5300 may include a component or module 5320 for determining whether an aggregate demand for a content provided via dedicated unicast transmissions exceeds a threshold based on indications received from mobile entities. The apparatus 5300 may also include a component or module 5322 for switching transmission of the content from the dedicated unicast transmissions to a multicast transmission in response to determining that the aggregate demand exceeds the threshold.

In related aspects, the apparatus 5300 may optionally include a processor component 5310 having at least one processor, in the case of the apparatus 5300 configured as a P-GW or BM-SC, rather than as a processor. The processor 5310, in such case, may be in operative communication with the components 5320-5322 via a bus 5312 or similar communication coupling. The processor 5310 may effect initiation and scheduling of the processes or functions performed by electrical components 5320-5322.

In further related aspects, the apparatus 5300 may include a signaling component 5314. The apparatus 5300 may optionally include a component for storing information, such as, for example, a memory device/component 5316. The computer readable medium or the memory component 5316 may be operatively coupled to the other components of the apparatus 5300 via the bus 5312 or the like. The memory component 5316 may be adapted to store computer readable instructions and data for effecting the processes and behavior of the components 5320-5322, and subcomponents thereof, or the processor 5310, or the methods disclosed herein. The memory component 5316 may retain instructions for executing functions associated with the components 5320-5322. While shown as being external to the memory component 5316, it is to be understood that the components 5320-5322 can exist within the memory component 5316. It is further noted that the components in FIG. 53 may comprise processors, electronic devices, hardware devices, electronic sub-components, logical circuits, memories, software codes, firmware codes, etc., or any combination thereof.

Figure 54:
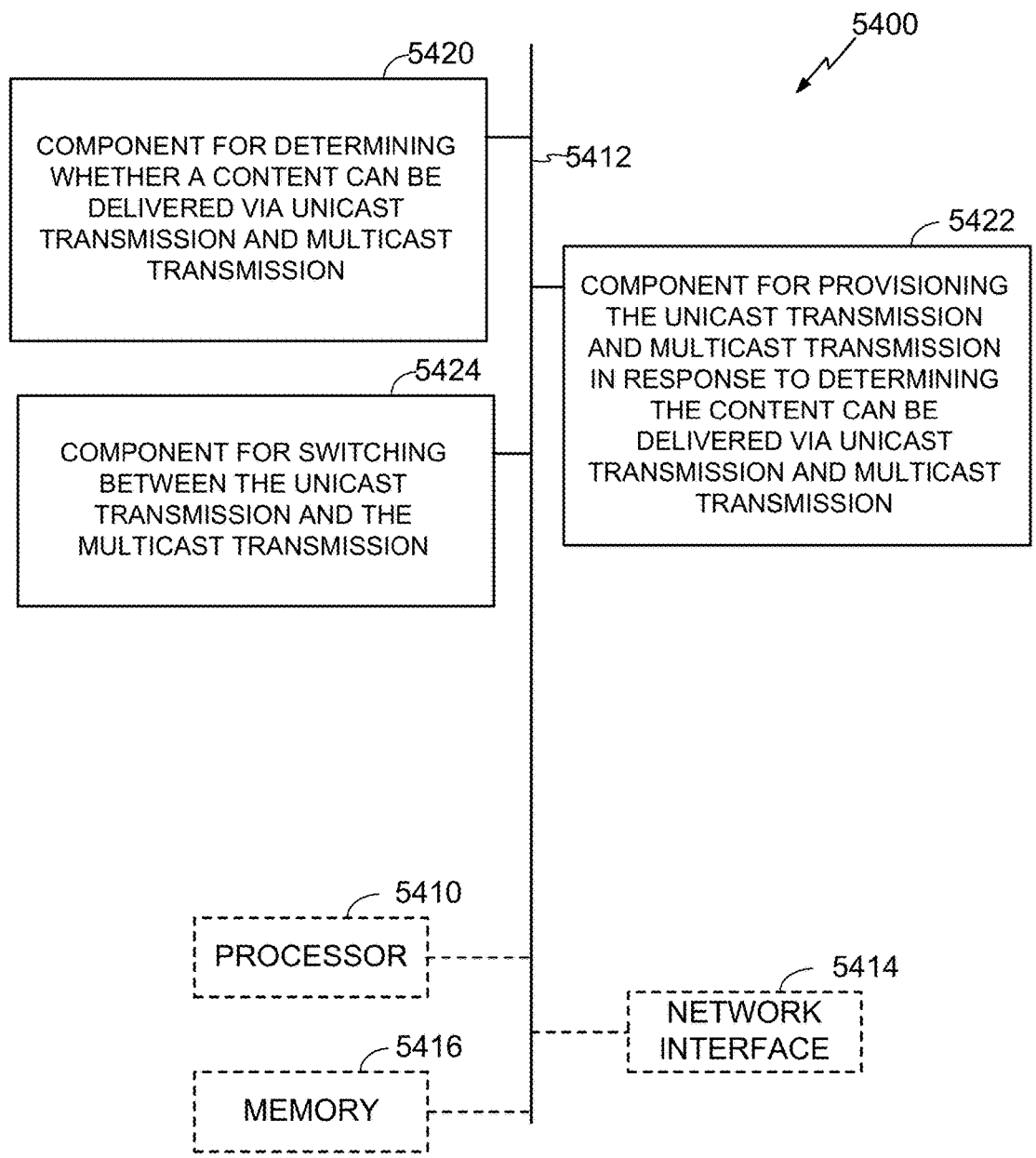
FIG. 54 illustrates an embodiment of an apparatus for provisioning BC and UC services, and switching between the BC and UC services, in accordance with the methodology of FIG. 49.

FIG. 54 shows an embodiment of an apparatus for implementing a demand-based multicast service in a wireless communication system, in accordance with the methodology of FIG. 49. With reference to FIG. 54, there is provided an exemplary apparatus 5400 that may be configured as a P-GW or BM-SC component, or as a processor or similar device/component for use within one of the devices. The apparatus 5400 may include functional blocks that can represent functions implemented by a processor, software, hardware, or combination thereof (e.g., firmware). For example, apparatus 5400 may include a component or module 5420 for determining whether a content can be delivered via unicast transmission and multicast transmission. The apparatus 5400 may also include a component or module 5422 for provisioning the unicast transmission and multicast transmission in response to determining the content can be delivered via unicast transmission and multicast transmission. The apparatus 5400 may also include a component or module 5424 for switching between the unicast transmission and the multicast transmission.

In related aspects, the apparatus 5400 may optionally include a processor component 5410 having at least one processor, in the case of the apparatus 5400 configured as a P-GW or BM-SC, rather than as a processor. The processor 5410, in such case, may be in operative communication with the components 5420-5422 via a bus 5412 or similar communication coupling. The processor 5410 may effect initiation and scheduling of the processes or functions performed by electrical components 5420-5424.

In further related aspects, the apparatus 5400 may include a signaling component 5414. The apparatus 5400 may optionally include a component for storing information, such as, for example, a memory device/component 5416. The computer readable medium or the memory component 5416 may be operatively coupled to the other components of the apparatus 5400 via the bus 5412 or the like. The memory component 5416 may be adapted to store computer readable instructions and data for effecting the processes and behavior of the components 5420-5424, and subcomponents thereof, or the processor 5410, or the methods disclosed herein. The memory component 5416 may retain instructions for executing functions associated with the components 5420-5424. While shown as being external to the memory component 5416, it is to be understood that the components 5420-5424 can exist within the memory component 5416. It is further noted that the components in FIG. 54 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection may be properly termed a computer-readable medium to the extent involving non-transitory storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transitory length of time. Disk and disc, as used herein, includes compact disc (CD), laser disc, optical disc, digital versatile disc (DVD), floppy disk and blu-ray disc where disks usually encode data magnetically, while discs hold data encoded optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for managing unicast and multicast services switching in a multi-band/multi-frequency wireless communications system (WCS) capable of both unicast and multicast signaling, the method comprising:
    determining whether an aggregate demand for a content provided via dedicated unicast transmissions exceeds a threshold, wherein the threshold is set based on at least a number of cells;
    switching transmission of the content from the dedicated unicast transmissions on one frequency to a multicast transmission on a second or more frequencies based on determining that the aggregate demand exceeds the threshold; and
    sending, to at least one mobile entity, an indication of switching the transmission of the content from the dedicated unicast transmissions to the multicast transmission.

2. The method of claim 1, wherein the one frequency and the second or more frequencies are a same frequency.

3. The method of claim 1, wherein sending the indication comprises sending a redirect message comprising the indication.

4. The method of claim 1,
    wherein sending the indication comprises sending at least one of a USD or a SIB comprising the indication, and
    wherein the indication identifies the second or more frequencies.

5. The method of claim 1, further comprising determining the second or more frequencies over which the content is sent via the multicast transmission.

6. An apparatus for managing unicast and multicast services switching in a multi-band/multi-frequency wireless communications system (WCS) capable of both unicast and multicast signaling, the apparatus comprising:
    at least one processor configured to determine whether an aggregate demand for a content provided via dedicated unicast transmissions exceeds a threshold, and switch transmission of the content from the dedicated unicast transmissions on one frequency to a multicast transmission on asecond or more frequencies based on determining that the aggregate demand exceeds the threshold, wherein the threshold is set based on at least a number of cells;
    a transceiver configured to send, to at least one mobile entity, an indication of switching the transmission of the content from the dedicated unicast transmissions to the multicast transmission; and
    a memory coupled to the at least one processor for storing data.

7. The apparatus of claim 6, wherein the transceiver, when sending the indication, is configured to send a redirect message comprising the indication.

8. The apparatus of claim 6, wherein the at least one processor is further configured to determine the second or more frequencies over which the content is sent via the multicast transmission.

9. An apparatus for managing unicast and multicast services switching in a multi-band/multi-frequency wireless communications system (WCS) capable of both unicast and multicast signaling, the apparatus comprising:
    means for determining whether an aggregate demand for a content provided via dedicated unicast transmissions exceeds a threshold, wherein the threshold is set based on at least a number of cells;
    means for switching transmission of the content from the dedicated unicast transmissions on one frequency to a multicast transmission on a second or more frequencies based on determining that the aggregate demand exceeds the threshold; and
    means for sending, to at least one mobile entity, an indication of switching the transmission of the content from the dedicated unicast transmissions to the multicast transmission.

10. The apparatus of claim 9, wherein the means for sending the indication comprise means for sending a redirect message comprising the indication.

11. The apparatus of claim 9, further comprising means for determining the second or more frequencies over which the content is sent via the multicast transmission.

12. A non-transitory computer-readable medium storing instructions, the instructions comprising:
    one or more instructions which, when executed by a processor, cause the processor to:

determine whether an aggregate demand for a content provided via dedicated unicast transmissions exceeds a threshold, wherein the threshold is set based on at least a number of cells:
  switch transmission of the content from the dedicated unicast transmissions on one frequency to a multicast transmission on a second or more frequencies based on determining that the aggregate demand exceeds the threshold; and
  send, to at least one mobile entity, an indication of switching the transmission of the content from the dedicated unicast transmissions to the multicast transmission.

13. The non-transitory computer-readable medium of claim 12, wherein the indication includes information identifying the second or more frequencies.

14. The non-transitory computer-readable medium of claim 12, wherein the instructions further comprise:
  one or more instructions which, when executed by the processor, cause the processor to:
    determine the second or more frequencies over which the content is sent via the multicast transmission.

15. A method for managing unicast and multicast services switching in a wireless mobile entity capable of both unicast and multicast signaling, the method comprising:
  receiving a content via dedicated unicast transmission;
  receiving an indication of whether a multicast transmission of the content is transmitted over a unicast channel or a broadcast channel;
  determining a network location from where the content is to be delivered via the multicast transmission;
  determining, based on the indication and the network location from where the content is to be delivered, to switch from receiving the content via the dedicated unicast transmission to receiving the content via the multicast transmission; and
  switching receiving the content via the dedicated unicast transmission to the multicast transmission based on determining to switch.

16. The method of claim 15, wherein determining the network location comprises autonomously determining at least one URL for the content to be delivered via the multicast transmission based on a user service description (USD), a received broadcast message from a new cell, or a prediction by a set of constructions rules.

17. The method of claim 16, wherein the set of construction rules defines a structure for building the at least one URL for the content.

18. The method of claim 17, wherein determining the network location further comprises selecting one of the at least one URL as the network location based on aparticular order or priority.

19. The method of claim 15, wherein determining to switch is based on a handover or a cell reselection.

20. The method of claim 15, further comprising determining a frequency on which that the multicast transmission is sent based on information received from at least one of a SIB or a USD.

21. An apparatus capable of both unicast and multicast signaling for managing unicast and multicast services switching, the apparatus comprising:
  at least one processor configured to receive a content via dedicated unicast transmission, receive an indication of whether a multicast transmission of the content is transmitted over a unicast channel or a broadcast channel, determine a network location from where the content is to be delivered via the multicast transmission, determine, based on the indication and the network location from where the content is to be delivered, to switch from receiving the content via the dedicated unicast transmission to receiving the content via the multicast transmission, and switch receiving the content via the dedicated unicast transmission to the multicast transmission based on determining to switch; and
  a memory coupled to the at least one processor for storing data.

22. An apparatus capable of both unicast and multicast signaling for managing unicast and multicast services switching, the apparatus comprising:
  means for receiving a content via dedicated unicast transmission;
  means for receiving an indication of whether a multicast transmission of the content is transmitted over a unicast channel or a broadcast channel;
  means for determining a network location from where the content is to be delivered via the multicast transmission;
  means for determining, based on the indication and the network location from where the content is to be delivered, to switch from receiving the content via the dedicated unicast transmission to receiving the content via the multicast transmission; and
  means for switching receiving the content via the dedicated unicast transmission to the multicast transmission based on determining to switch.

23. A non-transitory computer-readable medium storing instructions, the instructions comprising:
  one or more instructions which, when executed by a processor, cause the processor to:
    receive a content via dedicated unicast transmission;
    receive an indication of whether a multicast transmission of the content is transmitted over a unicast channel or a broadcast channel;
    determine a network location from where the content is to be delivered via the multicast transmission;
    determine, based on the indication and the network location from where the content is to be delivered, to switch from receiving the content via the dedicated unicast transmission to receiving the content via the multicast transmission; and
    switch receiving the content via the dedicated unicast transmission to the multicast transmission based on determining to switch.

24. A method for managing unicast and multicast services switching in a wireless communications system (WCS) capable of both unicast and multicast signaling, the method comprising:
  determining whether an aggregate demand for a content provided via dedicated unicast transmissions exceeds a threshold based on indications received from mobile entities, wherein the threshold is set based on at least a number of cells; and
  switching transmission of the content from the dedicated unicast transmissions to a multicast transmission based on determining that the aggregate demand exceeds the threshold.

25. The method of claim 24, further comprising sending, based on switching the transmission, to the mobile entities a signaling message including an MBMS service key.

26. The method of claim 24, wherein determining the aggregate demand is performed at a content provider or a wireless network of the WCS.

27. The method of claim 26, further comprising sending a message to initiate the multicast transmission from a PDN-GW, a TDF, or a standalone network entity.

28. The method of claim 24, wherein the indications comprise location information comprising at least one of a cell ID or a MBSFN area ID.

29. The method of claim 28, further comprising receiving the location information in a hypertext transfer protocol (HTTP) get message.

30. The method of claim 24, further comprising sending, to the mobile entities, a signaling message in one of an HTTP error message or an RTCP message.

31. The method of claim 24, further comprising determining the aggregate demand based on an MBSFN area or an MBMS service area.

32. The method of claim 24, wherein determining whether the aggregate demand exceeds the threshold comprises determining whether the aggregate demand exceeds the threshold based on protocol configure options (PCO).

33. The method of claim 24, further comprising transmitting a user service description (USD) to the mobile entities through unicast transmissions prior to switching the transmission of the content.

34. An apparatus for managing unicast and multicast services switching in a wireless communications system (WCS) capable of both unicast and multicast signaling, the apparatus comprising:
- at least one processor configured to determine whether an aggregate demand for a content provided via dedicated unicast transmissions exceeds a threshold based on indications received from mobile entities, and switch transmission of the content from the dedicated unicast transmissions to a multicast transmission based on determining that the aggregate demand exceeds the threshold, wherein the threshold is set based on at least a number of cells: and
- a memory coupled to the at least one processor for storing data.

35. The apparatus of claim 34, wherein the indications comprise location information comprising at least one of a cell ID or an MBSFN area ID.

36. The apparatus of claim 35, wherein the at least one processor is further configured to receive the location information in a hypertext transfer protocol (HTTP) get message.

37. The apparatus of claim 34, wherein the at least one processor is further configured to send, to the mobile entities, a signaling message in one of an HTTP error message or an RTCP message.

38. The apparatus of claim 34, wherein the at least one processor is further configured to determine the aggregate demand based on an MBSFN area or an MBMS service area.

39. The apparatus of claim 34, wherein, when determining whether the aggregate demand exceeds the threshold, the at least one processor is configured to determine whether the aggregate demand exceeds the threshold based on protocol configure options (PCO).

40. The apparatus of claim 34, wherein the at least one processor is further configured to transmit a user service description (USD) to the mobile entities through unicast prior to switching the transmission of the content.

41. An apparatus for managing unicast and multicast services switching in a wireless communications system (WCS) capable of both unicast and multicast signaling, the apparatus comprising:
- means for determining whether an aggregate demand for a content provided via dedicated unicast transmissions exceeds a threshold based on indications received from mobile entities, wherein the threshold is set based on at least a number of cells; and
- means for switching transmission of the content from the dedicated unicast transmissions to a multicast transmission based on determining that the aggregate demand exceeds the threshold.

42. The apparatus of claim 41, wherein the indications comprise location information comprising at least one of a cell ID or a MBSFN area ID.

43. The apparatus of claim 42, further comprising means for receiving the location information in a hypertext transfer protocol (HTTP) get message.

44. The apparatus of claim 41, further comprising means for sending, to the mobile entities, a signaling message in one of an HTTP error message or an RTCP message.

45. The apparatus of claim 41, further comprising means for determining the aggregate demand based on an MBSFN area or an MBMS service area.

46. The apparatus of claim 41, wherein the means for determining whether the aggregate demand exceeds the threshold comprises means for determining whether the aggregate demand exceeds the threshold based on protocol configure options (PCO).

47. The apparatus of claim 41, further comprising means for transmitting a user service description (USD) to the mobile entities through unicast prior to switching the transmission of the content.

48. A non-transitory computer-readable medium storing instructions, the instructions comprising:
- one or more instructions which, when executed by a processor, cause the processor to:
  - determine whether an aggregate demand for a content provided via dedicated unicast transmissions exceeds a threshold based on indications received from mobile entities, wherein the threshold is set based on at least a number of cells; and
  - switch transmission of the content from the dedicated unicast transmissions to a multicast transmission based on determining that the aggregate demand exceeds the threshold.

49. The non-transitory computer-readable medium of claim 48, wherein the indications comprise location information comprising at least one of a cell ID or aMBSFN area ID.

50. The non-transitory computer-readable medium of claim 49, wherein the instructions further comprise:
- one or more instructions which, when executed by the processor, cause the processor to:
  - receive the location information in a hypertext transfer protocol (HTTP) get message.

51. The non-transitory computer-readable medium of claim 48, wherein the instructions further comprise:
- one or more instructions which, when executed by the processor, cause the processor to:
  - send, to the mobile entities, a signaling message in one of an HTTP error message or an RTCP message.

52. The non-transitory computer-readable medium of claim 48, wherein the instructions further comprise:
- one or more instructions which, when executed by the processor, cause the processor to:
  - determine the aggregate demand based on an MBSFN area or an MBMS service area.

53. The non-transitory computer-readable medium of claim 48, wherein the one or more instructions to determine whether the aggregate demand exceeds the threshold comprise:

one or more instructions which, when executed by the processor, cause the processor to:
  determine whether the aggregate demand exceeds the threshold based on protocol configure options (PCO).

54. The non-transitory computer-readable medium of claim 48, wherein the instructions further comprise:
  one or more instructions which, when executed by the processor, cause the processor to:
    transmit a user service description (USD) to the mobile entities through unicast prior to switching the transmission of the content.

55. The method of claim 1, wherein the indication comprises a HTTP redirection message including information indicating whether a service announcement is to be received over a unicast channel or a broadcast channel.

56. The method of claim 55, wherein the HTTP redirection message further includes information for a URL of the content for the multicast transmission.

57. The method of claim 1, wherein the indication comprises a field in a HTTP reply message indicating whether a service announcement is to be received over a unicast channel or a broadcast channel.

58. The method of claim 1,
  wherein the one frequency, on which the content was being provided via the dedicated unicast transmissions, lacks support for the multicast transmission of the content, and wherein the indication indicates that a service announcement is to be sent on the second or more frequencies that are different than the one frequency.

* * * * *